United States Patent
Hwang et al.

(10) Patent No.: US 12,149,829 B2
(45) Date of Patent: Nov. 19, 2024

(54) CAMERA MODULE WITH A CAMERA HOUSING, A LENS ASSEMBLY AND AN OPTICAL IMAGE STABILIZER AND ELECTRONIC DEVICE INCLUDING THE SAME

(71) Applicant: SAMSUNG ELECTRONICS CO., LTD., Suwon-si (KR)

(72) Inventors: Youngjae Hwang, Suwon-si (KR); Jungsoo Kim, Suwon-si (KR); Chiyoung Park, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 131 days.

(21) Appl. No.: 17/946,904

(22) Filed: Sep. 16, 2022

(65) Prior Publication Data
US 2023/0086178 A1 Mar. 23, 2023

Related U.S. Application Data

(63) Continuation of application No. PCT/KR2022/013248, filed on Sep. 5, 2022.

(30) Foreign Application Priority Data

Sep. 17, 2021 (KR) .......................... 10-2021-0124775

(51) Int. Cl.
*H04N 5/335* (2011.01)
*H04N 23/51* (2023.01)
(Continued)

(52) U.S. Cl.
CPC ........... *H04N 23/687* (2023.01); *H04N 23/51* (2023.01); *H04N 23/54* (2023.01)

(58) Field of Classification Search
CPC ................................................... H04N 23/687
See application file for complete search history.

(56) References Cited

U.S. PATENT DOCUMENTS

| 8,531,775 B2 | 9/2013 | Tanaka et al. |
| 9,841,539 B2 | 12/2017 | Aschwanden et al. |

(Continued)

FOREIGN PATENT DOCUMENTS

| JP | H06148576 A | 5/1994 |
| JP | H09258014 A | 10/1997 |

(Continued)

OTHER PUBLICATIONS

International Search Report with Written Opinion issued in International Application No. PCT/KR2022/013248; International Filing Date Sep. 5, 2022; Date of Mailing Dec. 29, 2022 (9 pages).

*Primary Examiner* — Gary C Vieaux
(74) *Attorney, Agent, or Firm* — CANTOR COLBURN LLP

(57) ABSTRACT

A camera module according to an embodiment of the disclosure includes a camera housing, a lens assembly, and an optical image stabilizer assembly, at least a portion of which is fixed to the camera housing, which changes a path of light travelling toward the lens assembly. The optical image stabilizer assembly includes a fixed part fixed to the camera housing and including a first light transmitting member, a moving part rotatable relative to the fixed part and including a second light transmitting member, a sealing member disposed between and connecting the first and second light transmitting members, and an elastic member that elastically connects the moving part to at least one of the camera housing or the fixed part. The sealing member accommodates a liquid therein and is deformable responsive to moving part rotation.

20 Claims, 29 Drawing Sheets

(51) Int. Cl.
*H04N 23/54* (2023.01)
*H04N 23/68* (2023.01)

(56) References Cited

U.S. PATENT DOCUMENTS

| | | | |
|---|---|---|---|
| 10,690,815 B2 | 6/2020 | Aschwanden et al. | |
| 10,732,429 B2 | 8/2020 | Kang et al. | |
| 11,347,077 B2 | 5/2022 | Son et al. | |
| 11,500,132 B2 | 11/2022 | Aschwanden et al. | |
| 2009/0309982 A1 | 12/2009 | Rouvinen et al. | |
| 2011/0176221 A1 | 7/2011 | Tanaka et al. | |
| 2018/0109660 A1* | 4/2018 | Yoon | H04N 23/687 |
| 2018/0136372 A1* | 5/2018 | Patscheider | G02B 3/14 |
| 2020/0355910 A1 | 11/2020 | Smolka et al. | |
| 2021/0239999 A1 | 8/2021 | Son et al. | |
| 2021/0341728 A1 | 11/2021 | Kartashov et al. | |
| 2021/0377447 A1* | 12/2021 | Jeong | G03B 3/10 |
| 2022/0121036 A1 | 4/2022 | Kim et al. | |

FOREIGN PATENT DOCUMENTS

| | | |
|---|---|---|
| JP | 2009517707 A | 4/2009 |
| JP | 2010097200 A | 4/2010 |
| KR | 101634299 B1 | 6/2016 |
| KR | 20160068992 A | 6/2016 |
| KR | 20190108375 A | 9/2019 |
| KR | 20190139574 A | 12/2019 |
| KR | 20200020138 A | 2/2020 |
| KR | 20200131173 A | 11/2020 |
| KR | 20210013875 A | 2/2021 |
| KR | 20210041948 A | 4/2021 |
| KR | 20210076029 A | 6/2021 |
| KR | 20210100428 A | 8/2021 |
| KR | 20220028224 A | 3/2022 |

* cited by examiner

CAMERA MODULE WITH A CAMERA HOUSING, A LENS ASSEMBLY AND AN OPTICAL IMAGE STABILIZER AND ELECTRONIC DEVICE INCLUDING THE SAME

CROSS-REFERENCE TO RELATED APPLICATION(S)

This application is a continuation application, claiming priority under § 365(c), of an International Application No. PCT/KR2022/013248, filed on Sep. 5, 2022, which is based on and claims the benefit of a Korean patent application number 10-2021-0124775, filed on Sep. 17, 2021, in the Korean Intellectual Property Office, the disclosure of which is incorporated by reference herein in its entirety.

TECHNICAL FIELD

Various embodiments of the disclosure described herein relate to a camera module and an electronic device including the same.

BACKGROUND ART

A mobile electronic device, such as a smartphone, may include a camera module. The camera module may include lenses, a lens barrel surrounding the lenses, and an image sensor. The camera module may receive light reflected from an external object. The light reflected from the object may travel into the lens barrel, may pass through the lenses, and may travel to the image sensor. The image sensor may convert the received light signal into a related electrical signal.

The camera module may include an image stabilizer to compensate for a camera-shake. For example, the image stabilizer may be configured to move or rotate an optical member (e.g., a prism or a lens) to compensate for the camera-shake.

DISCLOSURE

Technical Problem

The camera module may provide an optical image stabilizer (OIS) function by moving the lenses, by moving the image sensor, and by moving the prism. A camera module capable of compensating for a camera-shake by changing the angle of a tunable prism (or a liquid prism), the shape of which can be changed, among the various methods may be provided. In the case of using the tunable prism, a moving part may be connected to a fixed part by a membrane having a liquid accommodated therein, and therefore the moving part may be unintentionally moved, or the position of the moving part may be unintentionally changed.

Various embodiments of the disclosure provide a camera module including a structure in which a moving part is elastically restrained to a relatively fixed part by an elastic member, such as a spring, in an optical image stabilizer assembly using a tunable prism.

The technical problems to be solved by the disclosure are not limited to the aforementioned problems, and any other technical problems not mentioned herein will be clearly understood from the following description by those skilled in the art to which the disclosure pertains.

Technical Solution

A camera module according to an embodiment of the disclosure includes a camera housing, a lens assembly disposed in the camera housing, and an optical image stabilizer assembly, at least a portion of which is fixed to the camera housing, which partially changes a path of light travelling toward the lens assembly. The optical image stabilizer assembly includes a fixed part fixed to the camera housing and including a first light transmitting member, a moving part rotatable relative to the fixed part and including a second light transmitting member, a sealing member disposed between and connecting the first and second light transmitting members, and an elastic member that elastically connects the moving part to at least one of the camera housing or the fixed part. The sealing member accommodates a liquid therein and is deformable responsive to moving part rotation.

An electronic device according to an embodiment of the disclosure includes a housing and a camera module disposed in the housing and receptive of light through a partial area of the housing. The camera module includes a camera housing, a lens assembly disposed in the camera housing, and an optical image stabilizer assembly, at least a portion of which is fixed to the camera housing, which partially changes a path of light travelling toward the lens assembly. The optical image stabilizer assembly includes a fixed part fixed to the camera housing and including a first light transmitting member, a moving part rotatable relative to the fixed part and including a second light transmitting member, a sealing member disposed between and connecting the first and second light transmitting members, and an elastic member that elastically connects the moving part to at least one of the camera housing or the fixed part. The sealing member accommodates a liquid therein and is deformable responsive to moving part rotation. The moving part is rotatable relative to the first part about perpendicular first and second axes. The first and second axes are perpendicular to a central axis of the first light transmitting member.

Advantageous Effects

The camera module according to the various embodiments of the disclosure may limit a change in the relative positions of the moving part and the fixed part depending on a posture of the camera module by connecting the moving part to the fixed part or the camera housing by using the elastic member.

Furthermore, the camera module according to the various embodiments of the disclosure may implement precise sensing or OIS control by reducing a position error depending on a posture change.

Moreover, the camera module according to the various embodiments of the disclosure may alleviate or absorb an external impact through the elastic member.

In addition, the disclosure may provide various effects that are directly or indirectly recognized.

DESCRIPTION OF DRAWINGS

With regard to description of the drawings, identical or similar reference numerals may be used to refer to identical or similar components.

MODE FOR INVENTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
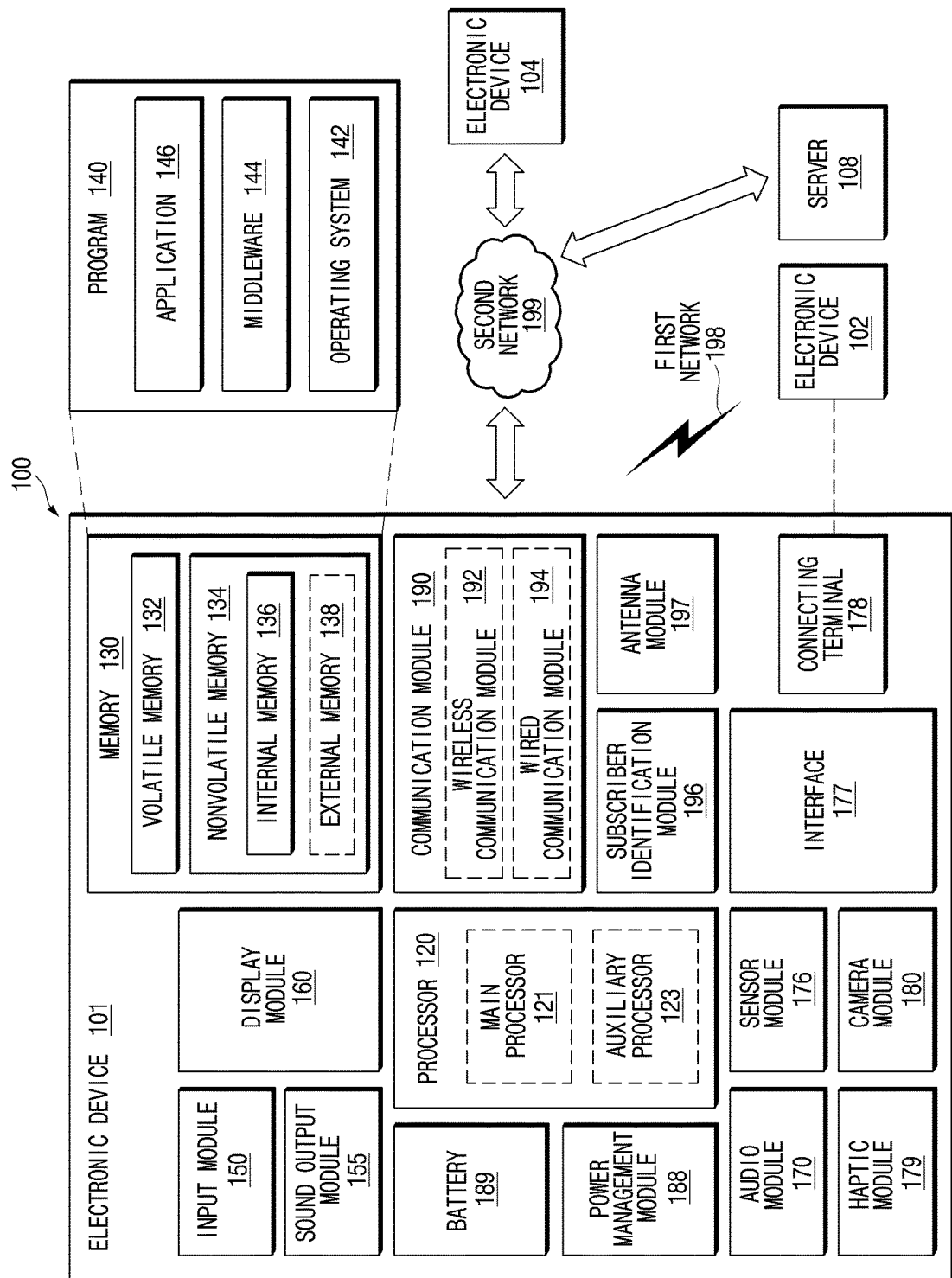
FIG. 1 is a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
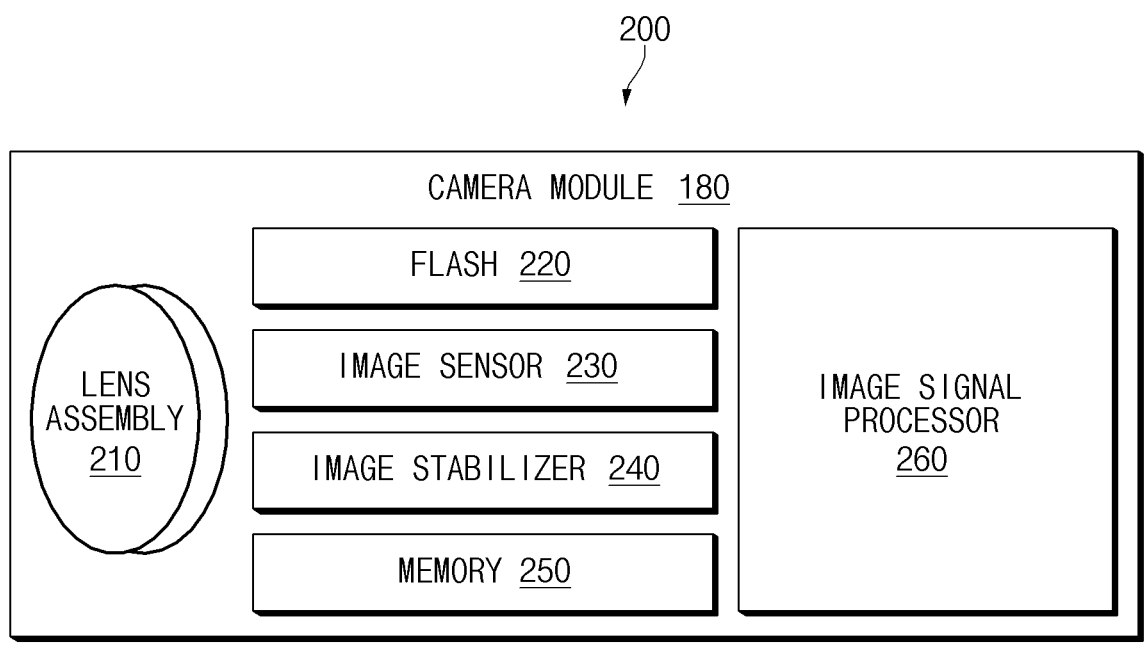
FIG. 2 is a block diagram illustrating a camera module according to various embodiments.

FIG. 2 is a block diagram illustrating the camera module 180 of FIG. 1 according to various embodiments.

Referring to FIG. 2, the camera module 180 may include a lens assembly 210, a flash 220, an image sensor 230, an image stabilizer 240, memory 250 (e.g., buffer memory), or an image signal processor 260.

The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180.

According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3A:
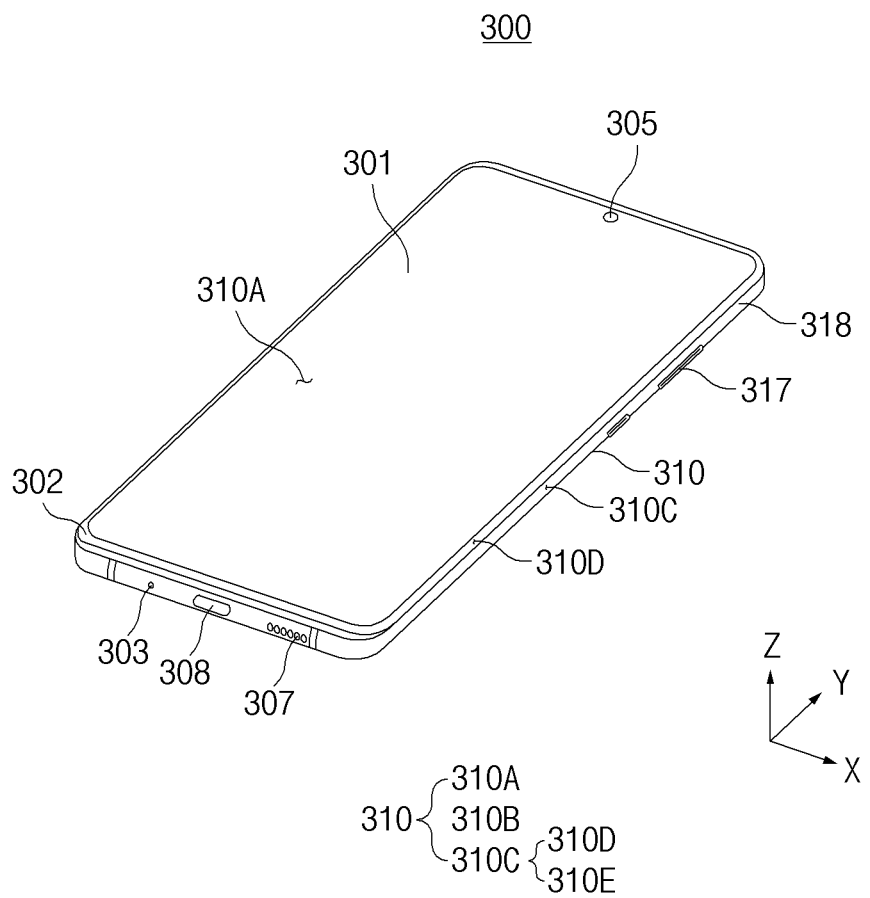
FIG. 3A is a front perspective view of an electronic device according to an embodiment.
Figure 3B:
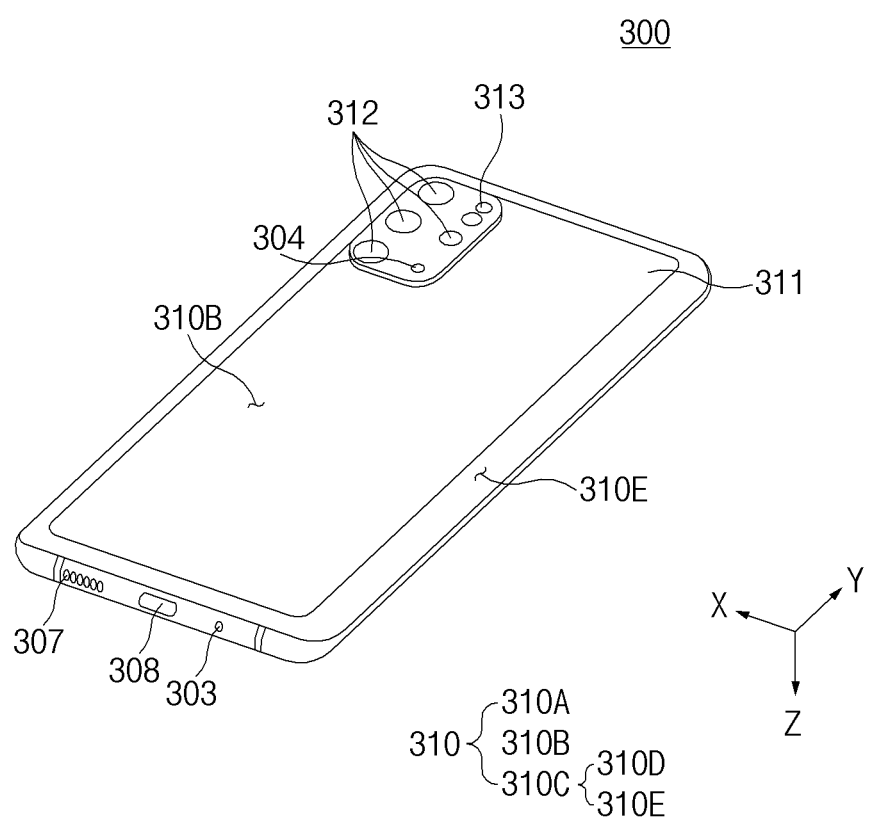
FIG. 3B is a rear perspective view of the electronic device according to an embodiment.
Figure 3C:
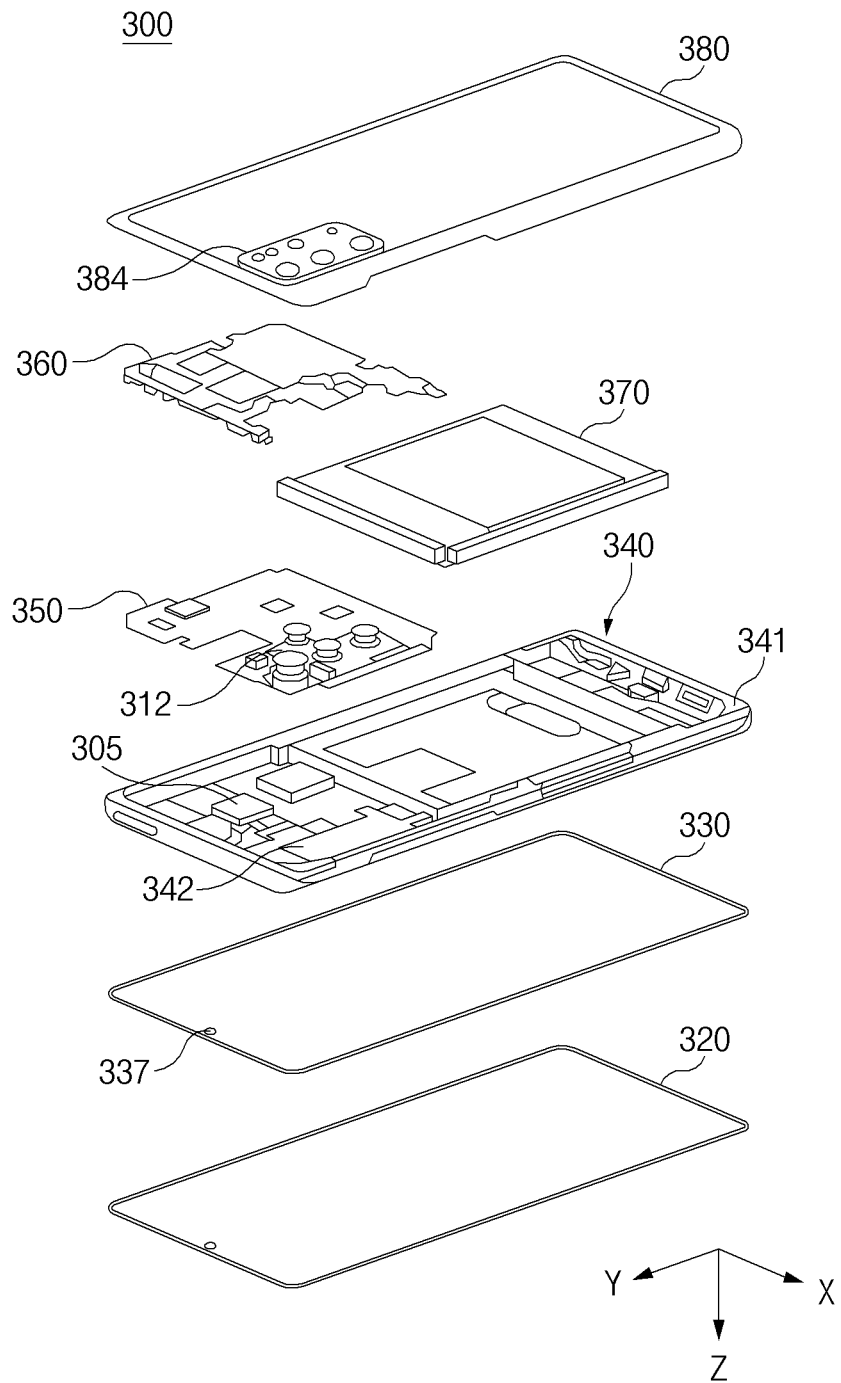
FIG. 3C is an exploded perspective view of the electronic device according to an embodiment.

FIG. 3A is a front perspective view of an electronic device according to an embodiment. FIG. 3B is a rear perspective view of the electronic device according to an embodiment. FIG. 3C is an exploded perspective view of the electronic device according to an embodiment.

Referring to FIGS. 3A and 3B, the electronic device 300 according to an embodiment (e.g., the electronic device 101 of FIG. 1) may include a housing 310 that includes a first surface (or a front surface) 310A, a second surface (or a rear surface) 310B, and a third surface (or a side surface) 310C surrounding a space between the first surface 310A and the second surface 310B.

In another embodiment, the housing 310 may refer to a structure that forms some of the first surface 310A, the second surface 310B, and the third surface 310C.

In an embodiment, the first surface 310A may be formed by a front plate 302, at least a portion of which is substantially transparent (e.g., a glass plate including various coating layers, or a polymer plate). The second surface 310B may be formed by a back plate 311 that is substantially opaque. The back plate 311 may be formed of, for example, coated or colored glass, ceramic, a polymer, metal (e.g., aluminum, stainless steel (STS), or magnesium), or a combination of at least two of the aforementioned materials. The third surface 310C may be formed by a side bezel structure (or a side member) 318 that is coupled with the front plate 302 and the back plate 311 and that contains metal and/or a polymer.

In another embodiment, the back plate 311 and the side bezel structure 318 may be integrally formed and may contain the same material (e.g., a metallic material such as aluminum).

In the illustrated embodiment, the front plate 302 may include two first areas 310D that curve and seamlessly extend from partial areas of the first surface 310A toward the back plate 311. The first areas 310D may be located at opposite long edges of the front plate 302.

In the illustrated embodiment, the back plate 311 may include two second areas 310E that curve and seamlessly extend from partial areas of the second surface 310B toward the front plate 302. The second areas 310E may be located at opposite long edges of the back plate 311.

In another embodiment, the front plate 302 (or the back plate 311) may include only one of the first areas 310D (or the second areas 310E). Furthermore, in another embodiment, the front plate 302 (or the back plate 311) may not include a part of the first areas 310D (or the second areas 310E).

In an embodiment, when viewed from a side of the electronic device 300, the side bezel structure 318 may have a first thickness (or width) at sides (e.g., short sides) not including the first areas 310D or the second areas 310E and may have a second thickness at sides (e.g., long sides) including the first areas 310D or the second areas 310E, the second thickness being smaller than the first thickness.

In an embodiment, the electronic device 300 may include at least one of a display 301 (e.g., the display module 160 of FIG. 1), audio modules 303, 304, 307 (e.g., the audio module 170 of FIG. 1), a sensor module (not illustrated) (e.g., the sensor module 176 of FIG. 1), camera modules 305, 312, and 313 (e.g., the camera module 180 of FIG. 1), key input devices 317 (e.g., the input device 150 of FIG. 1), a light emitting element (not illustrated), or a connector hole 308 (e.g., the connecting terminal 178 of FIG. 1). In another embodiment, at least one component (e.g., the key input devices 317 or the light emitting element (not illustrated)) among the aforementioned components may be omitted from the electronic device 300, or other component(s) may be additionally included in the electronic device 300.

In an embodiment, the display 301 may be visually exposed through most of the front plate 302. For example, at least a portion of the display 301 may be visually exposed through the front plate 302 that includes the first surface 310A and the first areas 310D of the third surface 310C. The display 301 may be disposed on the rear surface of the front plate 302.

In an embodiment, the periphery of the display 301 may be formed to be substantially the same as the shape of the adjacent outside edge of the front plate 302. In another embodiment, to expand the area by which the display 301 is visually exposed, the gap between the outside edge of the display 301 and the outside edge of the front plate 302 may be substantially constant.

In an embodiment, a surface of the housing 310 (or the front plate 302) may include a screen display area that is formed as the display 301 is visually exposed. For example, the screen display area may include the first surface 310A and the first areas 310D of the side surface 310C.

In another embodiment, the screen display area 310A and 310D may include a sensing area (not illustrated) that is configured to obtain biometric information of a user. When the screen display area 310A and 310D includes the sensing area, this may mean that at least a portion of the sensing area overlaps the screen display area 310A and 310D. For example, the sensing area (not illustrated) may refer to an area capable of displaying visual information by the display 301 like the other areas of the screen display area 310A and 310D and additionally obtaining biometric information (e.g., a fingerprint) of the user.

In an embodiment, the screen display area 310A and 310D of the display 301 may include an area through which the first camera module 305 (e.g., a punch hole camera) is visually exposed. For example, at least a portion of the periphery of the area through which the first camera module 305 is visually exposed may be surrounded by the screen display area 310A and 310D. In various embodiments, the first camera module 305 may include a plurality of camera modules (e.g., the camera module 180 of FIG. 1).

In various embodiments, the display 301 may be configured such that at least one of an audio module (not illustrated), a sensor module (not illustrated), a camera module (e.g., the first camera module 305), or a light emitting element (not illustrated) is disposed on the rear surface of the screen display area 310A and 310D. For example, the electronic device 300 may be configured such that the first camera module 305 (e.g., an under display camera (UDC)) is disposed on the rear side (e.g., the side facing the −z-axis direction) of the first surface 310A (e.g., the front surface) and/or the side surface 310C (e.g., at least one surface of the first areas 310D) so as to face toward the first surface 310A and/or the side surface 310C. For example, the first camera module 305 may be disposed under the display 301 and may not be visually exposed through the screen display area 310A and 310D.

In various embodiments, when the first camera module 305 is implemented with an under-display camera, the area of the display 301 that faces the first camera module 305 may be formed to be a transmissive area having a specified transmittance as a portion of the display area. For example, the transmissive area may be formed to have a transmittance of about 5% to about 50%. The transmissive area may include an area through which light for generating an image by being focused on an image sensor (e.g., the image sensor 230 of FIG. 2) passes and overlaps an effective area (e.g., a field of view (FOV) area) of the first camera module 305. For example, the transmissive area of the display 301 may include an area having a lower pixel density and/or wiring density than a surrounding area.

In another embodiment (not illustrated), the display 301 may be coupled with, or disposed adjacent to, touch detection circuitry, a pressure sensor capable of measuring the intensity (pressure) of a touch, and/or a digitizer that detects a stylus pen of a magnetic field type.

In an embodiment, the audio modules 303, 304, and 307 may include the microphone holes 303 and 304 and the speaker hole 307.

In an embodiment, the microphone holes 303 and 304 may include the first microphone hole 303 formed in a partial area of the third surface 310C and the second microphone hole 304 formed in a partial area of the second surface 310B. A microphone (not illustrated) for obtaining external sound may be disposed in the microphone holes 303 and 304. The microphone may include a plurality of microphones to sense the direction of sound.

In an embodiment, the second microphone hole 304 formed in the partial area of the second surface 310B may be disposed adjacent to the camera modules 305, 312, and 313. For example, the second microphone hole 304 may obtain sounds when the camera modules 305, 312, and 313 are executed, or may obtain sounds when other functions are executed.

In an embodiment, the speaker hole 307 may include an external speaker hole 307 and a receiver hole for telephone calls (not illustrated). The external speaker hole 307 may be formed in a portion of the third surface 310C of the electronic device 300. In another embodiment, the external speaker hole 307, together with the microphone hole 303, may be implemented as a single hole. Although not illustrated, the receiver hole for telephone calls (not illustrated) may be formed in another portion of the third surface 310C. For example, the receiver hole for telephone calls may be formed in another portion (e.g., a portion facing the +y-axis direction) of the third surface 310C that faces the portion (e.g., a portion facing the −y-axis direction) of the third surface 310C in which the external speaker hole 307 is formed. According to various embodiments, the receiver hole for telephone calls may not be formed in a portion of the third surface 310C and may be formed by a separation space between the front plate 302 (or the display 301) and the side bezel structure 318.

In an embodiment, the electronic device 300 may include at least one speaker (not illustrated) that is configured to output sound outside the housing 310 through the external speaker hole 307 or the receiver hole for telephone calls (not illustrated). According to various embodiments, the speaker may include a piezoelectric speaker from which the speaker hole 307 is omitted.

In an embodiment, the sensor module (not illustrated) may generate an electrical signal or a data value that corresponds to an operational state inside the electronic device 300 or an environmental state external to the electronic device 300. For example, the sensor module may include at least one of a proximity sensor, an HRM sensor, a fingerprint sensor, a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, or an illuminance sensor.

In an embodiment, the camera modules 305, 312, and 313 may include the first camera module 305 (e.g., a punch hole camera) exposed on the first surface 310A of the electronic device 300, the second camera module 312 exposed on the second surface 310B, and/or the flash 313.

In an embodiment, the first camera module 305 may be visually exposed through a portion of the screen display area 310A and 310D of the display 301. For example, the first camera module 305 may be visually exposed on a partial region of the screen display area 310A and 310D through an opening (not illustrated) that is formed in a portion of the display 301. In another example, the first camera module 305 (e.g., an under display camera) may be disposed on the rear surface of the display 301 and may not be visually exposed through the screen display area 310A and 310D.

In an embodiment, the second camera module 312 may include a plurality of cameras (e.g., a dual camera, a triple camera, or a quad camera). However, the second camera module 312 is not necessarily limited to including the plurality of cameras and may include one camera.

In an embodiment, the first camera module 305 and the second camera module 312 may include one or more lenses, an image sensor, and/or an image signal processor. The flash 313 may include, for example, a light emitting diode or a xenon lamp. In another embodiment, two or more lenses (an IR camera lens, a wide-angle lens, and a telephoto lens) and image sensors may be disposed on one surface of the electronic device 300.

In an embodiment, the key input devices 317 may be disposed on the third surface 310C of the housing 310 (e.g., the first areas 310D and/or the second areas 310E). In another embodiment, the electronic device 300 may not include all or some of the key input devices 317, and the key input devices 317 not included may be implemented in a different form, such as a soft key, on the display 301. In another embodiment, the key input devices 317 may include a sensor module (not illustrated) that forms the sensing area (not illustrated) that is included in the screen display area 310A and 310D.

In an embodiment, the connector hole 308 may accommodate a connector. The connector hole 308 may be disposed in the third surface 310C of the housing 310. For example, the connector hole 308 may be disposed in the third surface 310C adjacent to at least a part of the audio modules (e.g., the microphone hole 303 and the speaker hole 307). In another embodiment, the electronic device 300 may include the first connector hole 308 capable of accommodating a connector (e.g., a USB connector) for transmitting/receiving power and/or data with an external electronic device, and/or a second connector hole (not illustrated) capable of accommodating a connector (e.g., an earphone jack) for transmitting/receiving audio signals with an external electronic device.

In an embodiment, the electronic device 300 may include the light emitting element (not illustrated). For example, the light emitting element (not illustrated) may be disposed on the first surface 310A of the housing 310. The light emitting element (not illustrated) may provide state information of the electronic device 300 in the form of light. In another embodiment, the light emitting element (not illustrated) may provide a light source that operates in conjunction with operation of the first camera module 305. For example, the light emitting element (not illustrated) may include an LED, an IR LED, and/or a xenon lamp.

Referring to FIG. 3C, the electronic device 300 according to an embodiment may include a front plate 320 (e.g., the front plate 302 of FIG. 3A), a display 330 (e.g., the display 301 of FIG. 3A), a side member 340 (e.g., the side bezel structure 318 of FIG. 3A), a printed circuit board 350, a rear case 360, a battery 370, a back plate 380 (e.g., the back plate 311 of FIG. 3B), and an antenna (not illustrated).

In various embodiments, the electronic device 300 may not include at least one component (e.g., the rear case 360) among the aforementioned components, or may additionally include other component(s). Some of the components of the electronic device 300 illustrated in FIG. 3C may be identical or similar to some of the components of the electronic device 300 illustrated in FIG. 3B. Hereinafter, repetitive descriptions will be omitted.

In an embodiment, the front plate 320 and the display 330 may be coupled to the side member 340. For example, based on FIG. 3C, the front plate 320 and the display 330 may be disposed under the side member 340. The front plate 320 and the display 330 may be located in the +z-axis direction from the side member 340. For example, the display 330 may be coupled to a bottom of the side member 340, and the front plate 320 may be coupled to a bottom of the display 330. The front plate 320 may form a portion of the outer surface (or the exterior) of the electronic device 300. The display 330 may be disposed between the front plate 320 and the side member 340 to be located inside the electronic device 300.

In an embodiment, the side member 340 may be disposed between the display 330 and the back plate 380. For example, the side member 340 may be configured to surround a space between the back plate 380 and the display 330.

In an embodiment, the side member 340 may include a frame structure 341 that forms a portion of the side surface (e.g., the third surface 310C of FIG. 3A) of the electronic device 300 and a plate structure 342 extending inwardly from the frame structure 341.

In an embodiment, the plate structure 342 may be disposed inside the frame structure 341 to be surrounded by the frame structure 341. The plate structure 342 may be connected with or integrally formed with the frame structure 341. The plate structure 342 may be formed of a metallic material and/or a nonmetallic (e.g., polymer) material. In an embodiment, the plate structure 342 may support other components included in the electronic device 300. For example, at least one of the display 330, the printed circuit board 350, the rear case 360, or the battery 370 may be disposed on the plate structure 342. For example, the display 330 may be coupled to one surface (e.g., the surface facing the +z-axis direction) of the plate structure 342, and the printed circuit board 350 may be coupled to an opposite surface (e.g., the surface facing the −z-axis direction) that faces away from the one surface.

In an embodiment, the rear case 360 may be disposed between the back plate 380 and the plate structure 342. The rear case 360 may be coupled to the side member 340 to overlap with at least a portion of the printed circuit board 350. For example, the rear case 360 may face the plate structure 342 with the printed circuit board 350 interposed therebetween.

In an embodiment, a processor (e.g., the processor 120 of FIG. 1), memory (e.g., the memory 130 of FIG. 1), and/or an interface (e.g., the interface 177 of FIG. 1) may be mounted on the printed circuit board 350. The processor may include, for example, one or more of a central processing unit, an application processor, a graphic processing unit, an image signal processor, a sensor hub processor, or a communication processor. The memory may include, for example, volatile memory or nonvolatile memory. The interface may include, for example, a high definition multimedia interface (HDMI), a universal serial bus (USB) interface, an SD card interface, and/or an audio interface. The interface may electrically or physically connect the electronic device 300 with an external electronic device and may include a USB connector, an SD card/MMC connector, or an audio connector.

In an embodiment, the battery 370 (e.g., the battery 189 of FIG. 1) may supply power to at least one component of the electronic device 300. For example, the battery 370 may include a primary cell that is not rechargeable, a secondary cell that is rechargeable, or a fuel cell. At least a portion of the battery 370 may be disposed on substantially the same plane as the printed circuit board 350. The battery 370 may be integrally disposed inside the electronic device 300, or may be disposed to be detachable from the electronic device 300.

In an embodiment, the antenna (not illustrated) (e.g., the antenna module 197 of FIG. 1) may be disposed between the back plate 380 and the battery 370. The antenna (not illustrated) may include, for example, a near field communication (NFC) antenna, a wireless charging antenna, and/or a magnetic secure transmission (MST) antenna. For example, the antenna (not illustrated) may perform short-range communication with an external device, or may wirelessly transmit and receive power required for charging.

In an embodiment, the first camera module 305 may be disposed on at least a portion (e.g., the plate structure 342) of the side member 340 such that a lens receives external light through a partial area of the front plate 320 (e.g., the front surface 310A of FIG. 3A). For example, the lens of the first camera module 305 may be visually exposed through a partial area of the front plate 320. A camera area 337 (e.g., an opening area or a light transmitting area) corresponding to the first camera module 305 may be formed in the display 330.

In an embodiment, the second camera module 312 may be disposed on the printed circuit board 350 such that a lens receives external light through a camera area 384 of the back plate 380 (e.g., the rear surface 310B of FIG. 3B) of the electronic device 300. For example, the lens of the second camera module 312 may be visually exposed through the camera area 384. In an embodiment, the second camera module 312 may be disposed in at least a portion of an inner space formed in the housing of the electronic device 300 (e.g., the housing 310 of FIGS. 3A and 3B) and may be electrically connected to the printed circuit board 350 through a connecting member (e.g., a connector).

In an embodiment, the camera area 384 may be formed in a surface (e.g., the rear surface 310B of FIG. 3B) of the back plate 380. In an embodiment, the camera area 384 may be formed to be at least partially transparent such that external light is incident on the lens of the second camera module 312. In an embodiment, at least a portion of the camera area 384 may protrude to a predetermined height from the surface of the back plate 380. However, without being necessarily limited thereto, the camera area 384 may be formed in substantially a same plane as the surface of the back plate 380.

Figure 4:
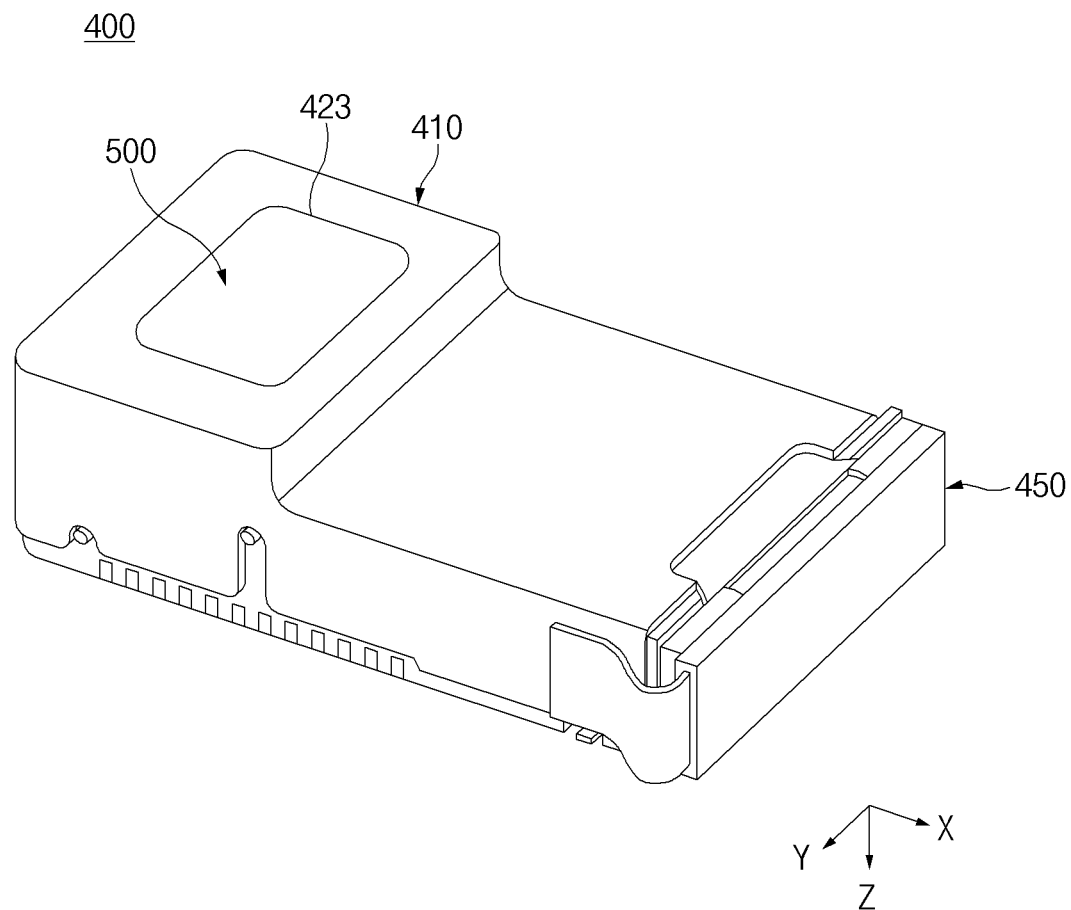
FIG. 4 is a perspective view of a camera module according to an embodiment.
Figure 5:
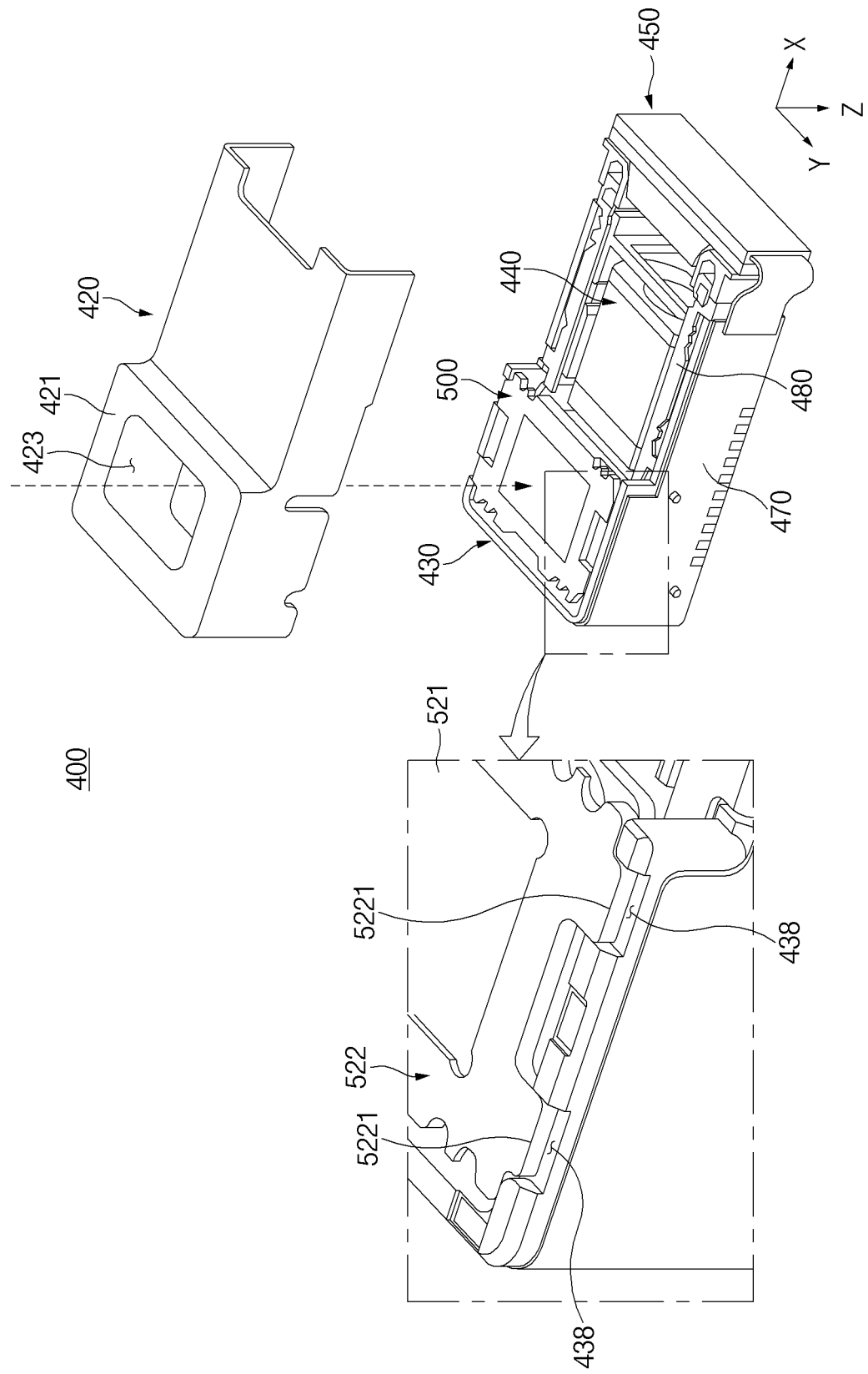
FIG. 5 is an exploded perspective view of the camera module according to an embodiment.
Figure 6:
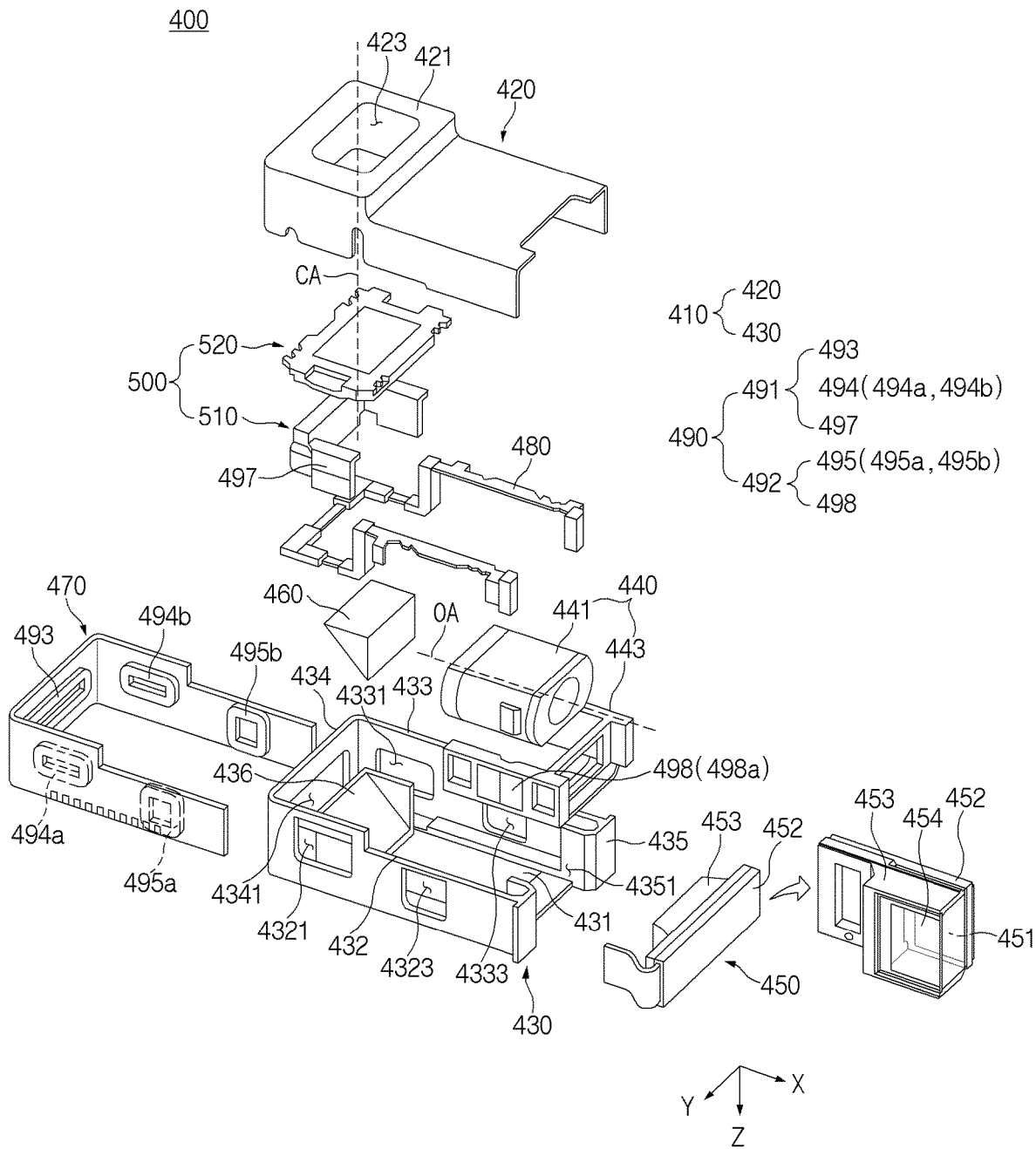
FIG. 6 is an exploded perspective view of the camera module according to an embodiment.

FIG. 4 is a perspective view of a camera module according to an embodiment. FIG. 5 is an exploded perspective view of the camera module according to an embodiment. FIG. 6 is an exploded perspective view of the camera module according to an embodiment.

Referring to FIGS. 4 to 6, the camera module 400 according to an embodiment (e.g., the second camera module 312 of FIG. 3C) may include a camera housing 410, a lens assembly 440, a sensor assembly 450, a reflective member 460, a circuit board 470, a stopper member 480, a drive member 490, and an optical image stabilizer assembly 500.

In an embodiment, the camera housing 410 may form at least a portion of the exterior of the camera module 400. The camera housing 410 may accommodate at least some of the components of the camera module 400.

In an embodiment, the camera housing 410 may include a frame 430 and a cover 420 that can be coupled to the frame 430. For example, the frame 430 may be formed as a lower housing, and the cover 420 may be formed as an upper housing. Through the coupling of the frame 430 and the cover 420, the camera housing 410 may provide a predetermined receiving space in which components of the camera module 400 can be accommodated. For example, the components of the camera module 400 may be accommodated in the frame 430, and the cover 420 may be coupled to the frame 430 to cover the frame 430 and at least some of the components. According to various embodiments, the cover 420 may be referred to as a shield can.

In an embodiment, the frame 430 may support the components of the camera module 400, or the components may be coupled to at least portions of the frame 430. For example, the lens assembly 440, the reflective member 460, the optical image stabilizer assembly 500, and/or the stopper member 480 may be disposed in the frame 430. The circuit board 470 may be disposed on outside surfaces (e.g., a first sidewall 432, a second sidewall 433, and a third sidewall 434) of the frame 430. The sensor assembly 450 may be disposed on one side (e.g., a fourth sidewall 435) of the frame 430.

In an embodiment, the frame 430 may include a plate 431 forming the bottom surface (e.g., the surface facing the +z-axis direction) of the frame 430 (or the camera housing 410) and the plurality of sidewalls 432, 433, 434, and 435 extend from edges of the plate 431 in a direction substantially perpendicular to the plate 431. For example, the plate 431 and the plurality of sidewalls 432, 433, 434, and 435 may form a space or an interior in which the lens assembly 440, the reflective member 460, the optical image stabilizer assembly 500, and/or the stopper member 480 are disposed.

In an embodiment, the lens assembly 440 may be disposed on the plate 431 to be movable in the direction of an optical axis OA. Although not illustrated, guide balls (not illustrated) for guiding a movement of a lens carrier 443 may be disposed between the lens assembly 440 (e.g., the lens carrier 443) and the plate 431. The plate 431 may have recesses (not illustrated) in which at least portions of the guide balls are accommodated, and the recesses may extend in the direction of the optical axis OA by a predetermined length. For example, when the lens carrier 443 moves in the frame 430 in the direction of the optical axis OA, the guide balls may perform a rolling motion or a rotary motion in the space between the plate 431 and the lens carrier 443.

In an embodiment, the reflective member 460 may be fixedly disposed on the plate 431. For example, a reflective member support portion 436 on which the reflective member 460 can be seated may be formed on the plate 431. The reflective member support portion 436 may extend from a partial area of the plate 431 and may be formed in a shape corresponding to the reflective member 460. The reflective member support portion 436 may be aligned with the lens assembly 440 in the direction of the optical axis OA.

In an embodiment, the plurality of sidewalls 432, 433, 434, and 435 may include the first sidewall 432 extending parallel to the optical axis OA, the second sidewall 433 facing the first sidewall 432, the third sidewall 434 connecting the first sidewall 432 and the second sidewall 433, and the fourth sidewall 435 facing the third sidewall 434. For example, the first sidewall 432 may face the +y-axis direction, the second sidewall 433 may face the −y-axis direction, the third sidewall 434 may face the −x-axis direction, and the fourth sidewall 435 may face the +x-axis direction.

In an embodiment, the circuit board 470 and a plurality of coils 493, 494, and 495 may be disposed on at least some of the plurality of sidewalls 432, 433, 434, and 435 of the frame 430. For example, the circuit board 470 may be coupled to the plurality of sidewalls 432, 433, 434, and 435 to surround at least some of the plurality of sidewalls 432, 433, 434, and 435, and the plurality of coils 493, 494, and 495 may be coupled to the circuit board 470.

In an embodiment, at least portions of the first sidewall 432, the second sidewall 433, and the third sidewall 434 among the plurality of sidewalls 432, 433, 434, and 435 may be surrounded by the circuit board 470. The first sidewall 432, the second sidewall 433, and the third sidewall 434 may have opening areas formed therein in which the plurality of coils 493, 494, and 495 are disposed to face toward the inside of the frame 430. The plurality of coils 493, 494, and 495 may be disposed to face a plurality of magnets 497 and 498 corresponding thereto through the opening areas. For example, a first opening area 4321 corresponding to the second coil 494 (e.g., a first sub coil 494a) and a second opening area 4323 corresponding to the third coil 495 (e.g., a third sub coil 495a) may be formed in the first sidewall 432. A third opening area 4331 corresponding to the second coil 494 (e.g., a second sub coil 494b) and a fourth opening area 4333 corresponding to the third coil 495 (e.g., a fourth sub coil 495b) may be formed in the second sidewall 433. A fifth opening area 4341 corresponding to the first coil 493 may be formed in the third sidewall 434.

In an embodiment, the sensor assembly 450 may be coupled to the fourth sidewall 435 of the frame 430. The fourth sidewall 435 may have a sixth opening area 4351 formed therein through which the sensor assembly 450 receives light passing through the lens assembly 440. For example, the lens assembly 440 and the sensor assembly 450 (e.g., an image sensor 451) may face each other through the sixth opening area 4351. For example, the sensor assembly 450 may be coupled to the fourth sidewall 435 such that at least a portion of the sensor assembly 450 is located in the sixth opening area 4351.

In an embodiment, the cover 420 may be coupled to an upper portion of the frame 430 (e.g., the −z axis direction). The cover 420 may be formed in a shape capable of covering at least a portion of the frame 430. According to the illustrated embodiment, the cover 420 may be open at one side (e.g., the +x-axis direction) such that the sensor assembly 450 is exposed outside the camera housing 410. However, the shape of the cover 420 is not limited to the illustrated embodiment, and the cover 420 may be formed in a shape capable of covering up to the sensor assembly 450.

In an embodiment, the cover 420 may have, in one surface 421 thereof (e.g., the surface facing the −z-axis direction), a light receiving area 423 through which an optical member 520 of the optical image stabilizer assembly 500 and/or the reflective member 460 receives external light. For example, the light receiving area 423 may be formed in a partial area of the one surface 421 of the cover 420. In various embodiments, the one surface 421 of the cover 420 may be a surface substantially parallel to the rear surface (e.g., the rear surface 310B of FIG. 3B) of the electronic device (e.g., the electronic device 300 of FIGS. 3A to 3C). The light receiving area 423 may include an opening area (or a through-hole), or may include a transparent area.

In an embodiment, the light receiving area 423 may overlap the optical member 520 such that external light is incident on a portion (e.g., the optical member 520) of the optical image stabilizer assembly 500. According to the illustrated embodiment, the optical member 520 of the optical image stabilizer assembly 500 may be visually exposed outside the camera housing 410 through the light receiving area 423. For example, when the one surface 421 of the cover 420 is viewed from above, at least a portion of the optical member 520 may overlap the light receiving area 423. However, the camera module 400 of the illustrated embodiment is illustrative, and according to various embodiments, the camera module 400 may be implemented in a structure in which the reflective member 460 is exposed through the light receiving area 423 (refer to a camera module 600 of FIGS. 17A and 17B).

In an embodiment, the lens assembly 440 may be disposed in the camera housing 410. The lens assembly 440 may be configured to move in the camera housing 410 in the direction of the optical axis OA of the lens. For example, the optical axis OA may refer to a straight line connecting the center points of a plurality of lenses included in the lens assembly 440. Based on FIG. 6, the optical axis OA of the lens may extend in a direction substantially parallel to the x-axis.

In an embodiment, the lens assembly 440 (e.g., the lens assembly 210 of FIG. 2) may include a lens unit 441 and the lens carrier 443 in which the lens unit 441 is accommodated.

In an embodiment, the lens unit 441 may include at least one lens. At least a portion of the lens unit 441 may be accommodated in the lens carrier 443. The lens unit 441 may move together with the lens carrier 443. For example, the lens unit 441 may be fixed (or coupled) to the lens carrier 443 to move together with the lens carrier 443. In various embodiments, the lens unit 441 may be understood as including a lens barrel and a plurality of lenses accommodated in the lens barrel.

In an embodiment, the lens carrier 443 may be disposed in the frame 430 so as to be movable in the direction of an optical axis OA. The lens carrier 443 may linearly move on the plate 431 by a specified distance in the direction of the optical axis OA. For example, the lens carrier 443 may move relative to the frame 430 in the +x-axis direction or the −x-axis direction. The third magnets 498 electromagnetically interacting with the third coils 495 may be disposed on side surfaces (e.g., the side surfaces facing the +y/−y-axis directions) of the lens carrier 443. For example, the lens carrier 443 may be moved in the direction of the optical axis OA by electro-magnetic forces generated between the third coils 495 and the third magnets 498.

In various embodiments, the camera module 400 may provide an auto focus (AF) function by moving the lens assembly 440 (in particular, the lens carrier 443) in the direction of the optical axis OA using a second drive member 492 (e.g., the third coils 495 and the third magnets 498).

In an embodiment, the reflective member 460 may be configured to change the path of light passing through the light receiving area 423 and/or the optical image stabilizer assembly 500. For example, the reflective member 460 may change the path of light incident on the reflective member 460 to a direction substantially perpendicular to the incident direction. The reflective member 460 may be configured to reflect or refract light incident through the light receiving area 423 and the optical member 520 of the optical image stabilizer assembly 500. For example, the reflective member 460 may include a prism or a mirror that has an inclined surface.

In an embodiment, the reflective member 460 may be disposed in the camera housing 410. For example, the reflective member 460 may be seated on the reflective member support portion 436 of the frame 430 and may be fixedly disposed in the frame 430 accordingly. The reflective member 460 may be aligned with the lens assembly 440 in the direction of the optical axis OA. For example, the reflective member 460 may be disposed to face the sensor assembly 450 with the lens assembly 440 therebetween. The reflective member 460 may be located in the −x-axis direction with respect to the lens assembly 440, and the sensor assembly 450 may be located in the +x-axis direction with respect to the lens assembly 440. According to the illustrated embodiment, external light may sequentially pass through the light receiving area 423 and the optical member 520 of the optical image stabilizer assembly 500 and may be incident on the reflective member 460. The light incident on the reflective member 460 may be redirected by being reflected and/or refracted by the reflective member 460 and may travel toward the lens assembly 440 and the sensor assembly 450.

In an embodiment, the sensor assembly 450 may be coupled to the fourth sidewall 435 of the frame 430. The sensor assembly 450 may include the image sensor 451, a sensor substrate 452, a filter holder 453, and an IR filter 454.

In an embodiment, the image sensor 451 may be electrically connected to the sensor substrate 452. The image sensor 451 may be aligned with the lens assembly 440 in the direction of the optical axis OA to receive light passing through the lens unit 441. For example, the image sensor 451 may be located in the sixth opening area 4351 formed in the fourth sidewall 435 of the frame 430, or may be aligned with the sixth opening area 4351. The image sensor 451 may be configured to receive light passing through the lens unit 441 and generate an electrical signal based on the received light signal. The sensor substrate 452 may be electrically connected to the main board of the electronic device 300 (e.g., the printed circuit board 350 of FIG. 3C). Although not illustrated, the sensor substrate 452 may be electrically connected to the main board 350 through a connecting member (not illustrated).

In an embodiment, the filter holder 453 may be disposed to cover the sensor substrate 452 on which the image sensor 451 is disposed. The IR filter 454 may be disposed in the filter holder 453. The IR filter 454 may be coupled to the filter holder 453 to face a portion of the image sensor 451. For example, the IR filter 454 may be aligned with the image sensor 451 and the lens unit 441 in the direction of the optical axis OA. The IR filter 454 may be configured to block light in the infrared range that is incident on the image sensor 451. For example, the IR filter 454 may include a reflection type IR filter that reflects infrared light and an absorption type IR filter that absorbs infrared light.

In an embodiment, the optical image stabilizer assembly 500 may be configured to change the path of light incident on the camera module 400 in response to a movement of the camera module 400 or the electronic device 300 including the same. For example, light incident on the optical image stabilizer assembly 500 through the light receiving area 423 may be refracted in a predetermined range in response to a rotary motion (e.g., a tilt motion) of a component (e.g., the optical member 520) of the optical image stabilizer assembly 500 and thereafter may be output toward the reflective member 460, and thus the path of the light may be changed.

In an embodiment, the optical image stabilizer assembly 500 may include the optical member 520 configured to refract light and a holder 510 to which the optical member 520 is coupled. The optical image stabilizer assembly 500 may be configured such that the optical member 520 is located between the reflective member 460 and the light receiving area 423. For example, the optical member 520 may be disposed to face one surface (e.g., the surface facing the −z-axis direction) of the reflective member 460 that faces toward the light receiving area 423.

In an embodiment, at least a portion of the optical member 520 may be coupled to the holder 510, and the optical member 520 may partially move together with the holder 510. The optical member 520 may include glass parts (e.g., light transmitting members 521 and 523 of FIGS. 7A to 7C) that allow transmission of light, and although not illustrated in FIGS. 4 to 6, the optical member 520 may include an optical liquid part (e.g., a sealing member 525 of FIGS. 7A to 7C) disposed between the glass parts to refract light. For example, the optical member 520 may change the path of light as the optical liquid part is deformed. The optical liquid part may be elastically deformed as the angle between the glass parts is adjusted by driving the holder 510. According to various embodiments, the optical member 520 may be referred to as a tunable prism or a liquid prism.

In an embodiment, the holder 510 may be connected to at least a portion of the optical member 520 and may support a part (e.g., the magnets 497) of a first drive member 491 for moving the holder 510. For example, a first magnet (not illustrated) (e.g., a first magnet 496 of FIG. 8B) and the second magnets 497 of the first drive member 491 may be fixedly disposed on the holder 510. The holder 510 may be rotated (e.g., tilted) about at least one axis of rotation (e.g., the x-axis or the y-axis) by the first drive member 491. For example, when the holder 510 rotates, a portion of the optical member 520 connected to the holder 510 may rotate together. According to various embodiments, the holder 510 may be referred to as a magnet holder or a prism holder.

In an embodiment, the optical image stabilizer assembly 500 may be configured such that a portion of the optical member 520 is fixed to the camera housing 410 and the rest is movable in the camera housing 410. For example, the optical member 520 may include a fixed support member 522 (e.g., a first support member 522 of FIGS. 7A to 7C) that is one of support members fixing or supporting glass 521 (e.g., the first light transmitting member 521 of FIGS. 7A to 7C) and that is fixed to the frame 430. Fixed protrusions 5221 fixed to the frame 430 may be formed on the fixed support member 522, and fixing recesses 438 in which the fixed protrusions 5221 are accommodated may be formed on the first sidewall 432 and the second sidewall 433 of the frame 430. The fixed protrusions 5221 may be accommodated in the fixing recesses 438 and may be coupled or bonded to the fixing recesses 438. For example, the optical image stabilizer assembly 500 may be configured such that the fixed support member 522 included in the optical member 520 is fixed to the frame 430 and the remaining components (e.g., the holder 510) of the optical member 520 relatively move in the camera housing 410 (or the frame 430) in the state of being connected to the fixed support member 522. However, the structure in which the fixed support member 522 is fixed to the camera housing 410 is not limited to the illustrated embodiment. In another embodiment, the fixed support member 522 may be attached to the rear surface (e.g., the surface facing the +z-axis direction) of the cover 420 to overlap the light receiving area 423 and may be fixed to the camera housing 410 accordingly.

In various embodiments, the camera module 400 may provide an optical image stabilizer (OIS) function by rotating a portion of the optical image stabilizer assembly 500 about two axes of rotation substantially perpendicular to the central axis CA of the optical member 520 using the first drive member 491. For example, the camera module 400 may compensate for an image shake by changing the path of light travelling toward the reflective member 460 by rotating at least a portion of the optical member 520 in a predetermined range in response to external noise (e.g., a shaking movement of a hand or vibration) applied to the camera module 400. The structure of the optical image stabilizer assembly 500 will be described below in detail with reference to FIGS. 7A to 8B.

In an embodiment, the drive member 490 may provide a driving force to move the optical image stabilizer assembly 500 and the lens assembly 440. For example, the drive member 490 may include the first drive member 491 that provides a driving force to move the optical image stabilizer assembly 500 and the second drive member 492 that provides a driving force to move the sensor assembly 450. According to an embodiment, the first drive member 491 and the second drive member 492 may include a voice coil motor (VCM). However, the types of the first drive member 491 and the second drive member 492 are not limited thereto, and the first drive member 491 and the second drive member 492 may include various types of actuators (e.g., a piezoelectric motor or a step motor).

In an embodiment, the first drive member 491 may be configured to rotate the optical image stabilizer assembly 500 about at least one axis of rotation perpendicular to the central axis CA of the optical member 520 (e.g., an axis parallel to the z-axis based on FIG. 6). The first drive member 491 may include the first coil 493, the first magnet (e.g., the first magnet 496 of FIG. 8B), the second coils 494, and the second magnets 497. For example, the first coil 493 and the first magnet 496 may electromagnetically interact with each other to rotate the optical image stabilizer assembly 500 about the y-axis perpendicular to the central axis CA (e.g., pitching or pitch tilt). The second coils 494 and the second magnets 497 may electromagnetically interact with each other to rotate the optical image stabilizer assembly 500 about the x-axis perpendicular to the central axis CA (e.g., yawing or yaw tilt).

According to the illustrated embodiment, as the optical member 520 is located between the light receiving area 423 and the reflective member 460, the central axis CA of the optical member 520 may be perpendicular to the optical axis OA, and the axis of rotation (e.g., the x-axis) of the yaw tilt may be parallel to the optical axis OA. However, this is illustrative, and the relationship between the axis of rotation of the tilt motion and the optical axis OA may be changed depending on the position of the optical member 520. For example, when the optical member 520 is disposed between the reflective member 460 and the lens assembly 440 (e.g., refer to the camera module 600 of FIGS. 17A and 17B), the central axis CA of the optical member 520 may be substantially parallel to the optical axis OA, and the axis of rotation of the tilt motion of the optical member 520 may be substantially perpendicular to the optical axis OA.

In an embodiment, the first drive member 491 may be configured such that the first coil 493 and the second coils 494 are disposed on the first sidewall 432, the second sidewall 433, and the third sidewall 434 of the frame 430 and the first magnet (not illustrated) (e.g., the first magnet 496 of FIG. 8B) and the second magnets 497 are disposed on the holder 510 of the optical image stabilizer assembly 500 to face the first coil 493 and the second coils 494. The arrangement structure and shape of the magnets included in the second drive member 492 will be described below in detail with reference to FIGS. 8A and 8B.

In an embodiment, the second coils 494 may include two coils, and the second magnets 497 may include two magnets. For example, the second coils 494 may include the first sub coil 494a located in the first opening 4321 of the first sidewall 432 and the coil 2-2 494b located in the third opening area 4331 of the second sidewall 433. The second magnets 497 may include a first sub magnet 497a corresponding to the first sub coil 494a and a magnet (e.g., a second sub magnet 497b of FIG. 8B) corresponding to the second sub coil 494b. However, the number of second coils 494 and the number of second magnets 497 are not limited to the illustrated embodiment.

According to the embodiment illustrated in FIG. 6, the first drive member 491 may be configured such that as the first coil 493 and the second coils 494 are fixed to the frame 430 and the first magnet 496 and the second magnets 497 are disposed on the holder 510 to face the coils 493 and 494, the first magnet 496 and the second magnets 497 move relative to the first coil 493 and the second coils 494 by electromagnetic interaction. However, the position of the first drive member 491 is not limited to the illustrated embodiment. In another embodiment, the first coil 493 and the second coils 494 may be disposed on the holder 510, and the first magnet 496 and the second magnets 497 may be disposed on the frame 430.

In an embodiment, the camera module 400 may be configured such that at least a portion of the optical image stabilizer assembly 500 rotates about at least one axis of rotation perpendicular to the central axis CA of the optical member 520 through control of currents applied to the first coil 493 and/or the second coils 494. A motion (e.g., tilting) in which the optical image stabilizer assembly 500 moves by interaction of the coils and the magnets included in the first drive member 491 will be described below in detail with reference to FIGS. 13A to 14B.

In an embodiment, the second drive member 492 may be configured to move the lens assembly 440 in a direction parallel to the optical axis OA of the lens. The second drive member 492 may include the third coils 495 and the third magnets 498. The second drive member 492 may be configured such that the third coils 495 are disposed on the first sidewall 432 and the second sidewall 433 of the frame 430 and the third magnets 498 are disposed on the lens carrier 443 to face the third coils 495. For example, the third magnets 498 may be disposed on sidewalls (e.g., the surfaces facing the +y/−y-axis directions) of the lens carrier 443 that face the first sidewall 432 and the second sidewall 433 of the frame 430.

In an embodiment, the third magnets 498 may be formed to be polarized in the direction of the optical axis OA. For example, each of the third magnets 498 may be formed such that an N-pole portion and an S-pole portion are arranged in the direction of the optical axis OA. For example, the boundary line between the N-pole portion and the S-pole portion of the third magnet 498 may be substantially perpendicular to the optical axis OA.

In an embodiment, the third coils 495 may include two coils, and the third magnets 498 may include two magnets. For example, the third coils 495 may include the third sub coil 495a located in the second opening 4323 of the first sidewall 432 and the fourth sub coil 495b located in the fourth opening area 4333 of the second sidewall 433. The third magnets 498 may include a third sub magnet 498a corresponding to the third sub coil 495a and a fourth sub magnet (not illustrated) corresponding to the fourth sub coil 495b. However, the number of third coils 495 and the number of third magnets 498 are not limited to the illustrated embodiment.

According to the embodiment illustrated in FIG. 6, the second drive member 492 may be configured such that as the third coils 495 are fixedly disposed on the frame 430 and the third magnets 498 are disposed on the lens carrier 443 to face the third coils 495, the third magnets 498 move relative to the third coils 495 by electromagnetic interaction. However, the position of the second drive member 492 is not limited to the illustrated embodiment. In another embodiment, the third coils 495 may be disposed on the lens carrier 443, and the third magnets 498 may be disposed on the frame 430.

In an embodiment, the camera module 400 may be configured such that the lens assembly 440 moves in the direction of the optical axis OA through control of currents applied to the third coils 495. The third coils 495 and the third magnets 498 may electromagnetically interact with each other. For example, the third coils 495 may be located in magnetic fields formed by the third magnets 498. The processor (e.g., the processor 120 of FIG. 1) may control the direction and/or strength of the currents passing through the third coils 495. Electromagnetic forces (e.g., Lorentz forces) may be applied to the third magnets 498 in a predetermined direction (e.g., a direction parallel to the optical axis OA) to correspond to the direction of the currents passing through the third coils 495. The lens assembly 440 may move in the direction of the optical axis OA by the Lorentz forces. The lens assembly 440 may move between the reflective member 460 and the image sensor 451 in the direction of the optical axis OA, and the distance between the lens assembly 440 and the image sensor 451 may vary accordingly. The camera module 400 may provide an auto focus function by adjusting the distance between the lens assembly 440 and the image sensor 451.

In an embodiment, the circuit board 470 may be coupled to the frame 430 to surround at least some of the plurality of sidewalls 432, 433, 434, and 435 of the frame 430. For example, the circuit board 470 may surround the first sidewall 432, the second sidewall 433, and the third sidewall 434 of the frame 430. The plurality of coils 493, 494, and 495 may be disposed on partial areas of the circuit board 470, and the circuit board 470 may be configured to transfer electrical signals to the plurality of coils 493, 494, and 495.

In an embodiment, the circuit board 470 may extend while surrounding at least portions of the first sidewall 432, the third sidewall 434, and the second sidewall 433 of the frame 430 such that the second coils 494 and the third coils 495 are located in the first sidewall 432 (e.g., the first opening area 4321 and the second opening area 4323) and the second sidewall 433 (e.g., the third opening area 4331 and the fourth opening area 4333) and the first coil 493 is located in the third sidewall 434 (e.g., the fifth opening area 4341).

In an embodiment, the circuit board 470 may be electrically connected with the main board 350 of the electronic device 300. For example, the circuit board 470 may be directly connected to the main board 350 of the electronic device 300, or may be indirectly connected to the main board 350 through other circuit boards. The circuit board 470 may include a flexible printed circuit board (FPCB) or a rigid-flexible printed circuit board (RFPCB).

In an embodiment, the stopper member 480 may limit a movement range of the lens assembly 440 in the direction of the optical axis OA. For example, when the lens assembly 440 moves a predetermined distance or more, at least a portion of the stopper member 480 may make contact with the lens carrier 443 to limit the movement of the lens assembly 440 in the direction of the optical axis OA. Furthermore, at least a portion of the stopper member 480 may be formed of an elastic material to absorb and/or alleviate an impact when the lens assembly 440 makes contact with the stopper member 480. The stopper member 480 may be coupled to a sidewall of the frame 430. The portion of the stopper member 480 that makes contact with the lens carrier 443 may be formed of an elastic material, a flexible material, or an injection-molded material to absorb/alleviate an impact or prevent noise.

Figure 7A:
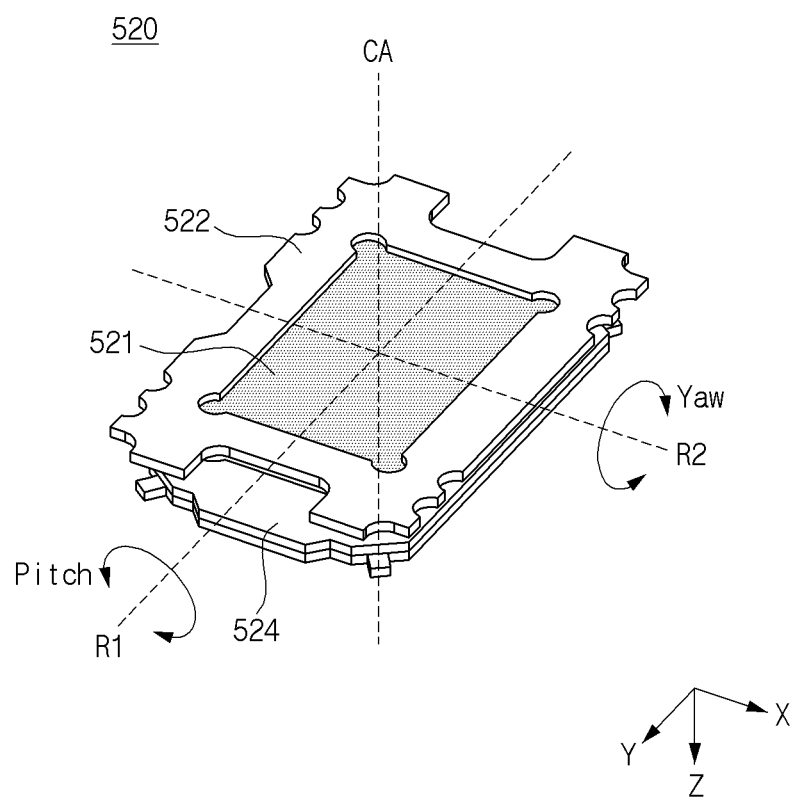
FIG. 7A is a perspective view illustrating an optical member of an optical image stabilizer assembly according to an embodiment.
Figure 7B:
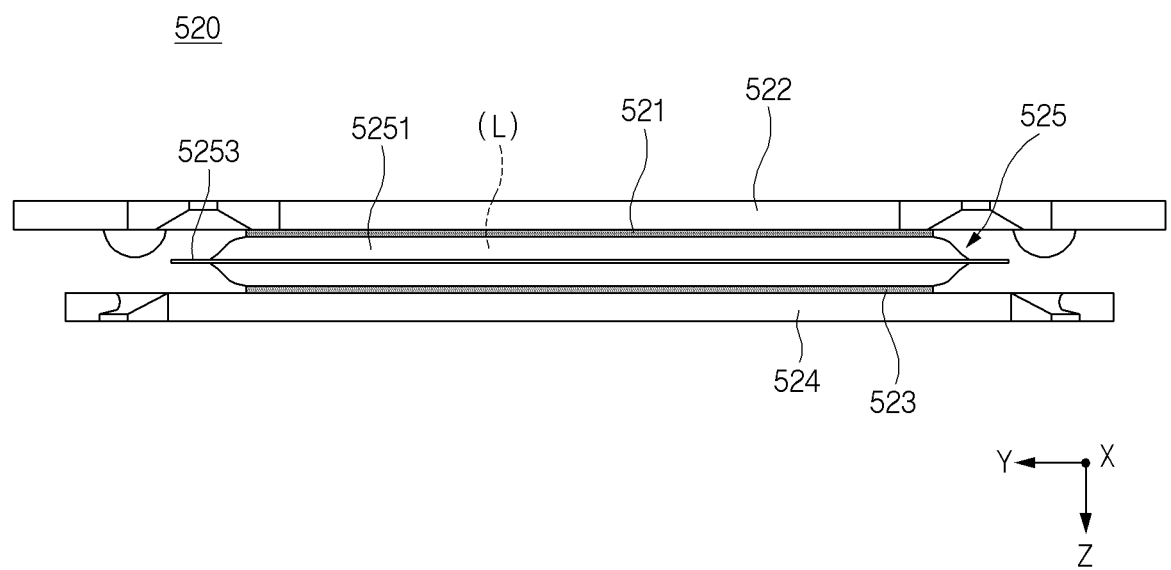
FIG. 7B is a plan view illustrating the optical member of the optical image stabilizer assembly according to an embodiment.
Figure 7C:
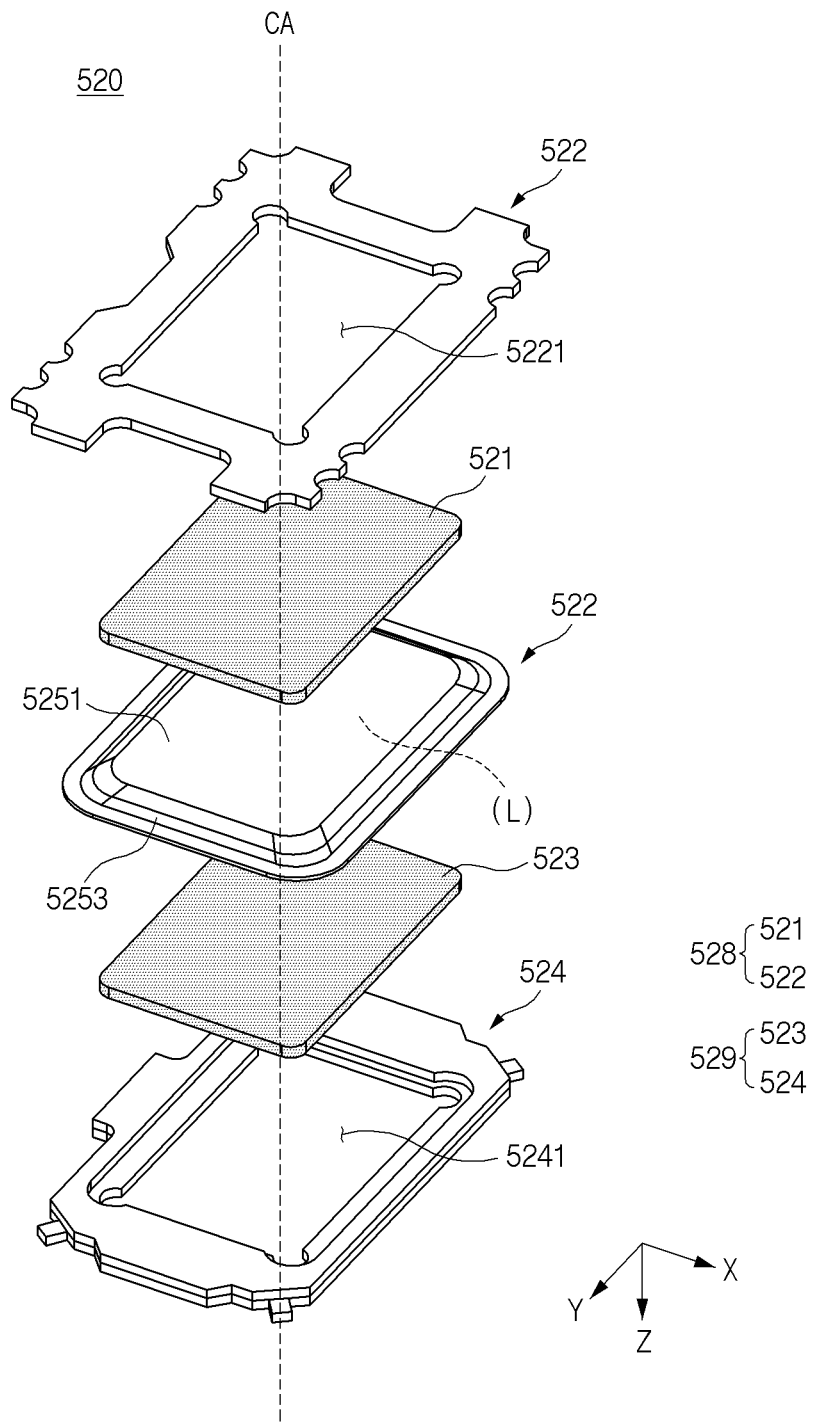
FIG. 7C is a perspective view illustrating the optical member of the optical image stabilizer assembly according to an embodiment.

FIG. 7A illustrates the optical member of the optical image stabilizer assembly according to an embodiment. FIG. 7B illustrates the optical member of the optical image stabilizer assembly according to an embodiment. FIG. 7C illustrates the optical member of the optical image stabilizer assembly according to an embodiment.

FIG. 7A is a perspective view of the optical member, FIG. 7B is a front view of the optical member, and FIG. 7C is an exploded perspective view of the optical member.

Referring to FIGS. 7A to 7C, the optical member 520 according to an embodiment may include the first light transmitting member 521, the second light transmitting member 523, the first support member 522, a second support member 524, and the sealing member 525.

In an embodiment, the first light transmitting member 521 and the second light transmitting member 523 may be substantially transparent plates through which light passes. For example, the first light transmitting member 521 and the second light transmitting member 523 may be flat transparent glass plates. However, the first light transmitting member 521 and the second light transmitting member 523 are not limited to the above-described example and may be formed of various materials capable of transmitting light.

In an embodiment, the first light transmitting member 521 and the second light transmitting member 523 may be disposed to face each other with the sealing member 525 therebetween. For example, external light incident on the first light transmitting member 521 may pass through the sealing member 525 and thereafter may be output from the second light transmitting member 523. The first light transmitting member 521 and the second light transmitting member 523 may be connected through the sealing member 525 and may be implemented to be movable relative to each other accordingly. For example, the optical member 520 may have a structure in which the second light transmitting member 523 moves relative to the relatively fixed first light transmitting member 521.

In an embodiment, the first support member 522 may support the first light transmitting member 521. For example, the first support member 522 may be formed to surround the periphery of the first light transmitting member 521, and the first light transmitting member 521 may be fixedly coupled (or attached) to a partial area of the first support member 522. The first support member 522 may have a first through-hole 5221 formed therein through which light is incident on the first light transmitting member 521. For example, the first light transmitting member 521 may overlap the first through-hole 5221, and when the optical member 520 is viewed in one direction (e.g., the −z-axis direction based on the drawings), at least a portion of the first light transmitting member 521 may be visually exposed through the first through-hole 5221. The first support member 522 may be fixed to the camera housing 410 (e.g., the frame 430 of FIG. 6). According to various embodiments, the first support member 522 may be referred to as a fixed support member, a fixed frame, a fixed bracket, or a fixed shaper.

In an embodiment, the second support member 524 may support the second light transmitting member 523. For example, the second support member 524 may be formed to surround the periphery of the second light transmitting member 523, and the second light transmitting member 523 may be fixedly coupled (or attached) to a partial area of the second support member 524. The second support member 524 may have a second through-hole 5241 formed therein through which light is incident on the second light transmitting member 523. For example, the second light transmitting member 523 may overlap the second through-hole 5241, and when the optical member 520 is viewed in an opposite direction (e.g., the +z-axis direction based on the drawings), at least a portion of the second light transmitting member 523 may be visually exposed through the second through-hole 5241. The second support member 524 may be movable in the camera housing 410. According to various embodiments, the second support member 524 may be referred to as a moving support member, a tilting support member, a moving frame, a tilting frame, a moving bracket, a tilting bracket, a moving shaper, or a tilting shaper.

According to various embodiments, the first light transmitting member 521 and the first support member 522 may be integrally formed with each other. For example, the first light transmitting member 521 and the first support member 522 may be implemented with one fixed light transmitting plate 528. The second light transmitting member 523 and the second support member 524 may be integrally formed with each other. For example, the second light transmitting member 523 and the second support member 524 may be implemented with one moving light transmitting plate 529.

In an embodiment, the sealing member 525 may be disposed between the first light transmitting member 521 and the second light transmitting member 523 and may have a liquid L accommodated therein. For example, the sealing member 525 may be formed in a form in which a liquid is contained in a flexible membrane. However, the material of the sealing member 525 is not limited to the above-described example.

In an embodiment, the sealing member 525 may include a liquid receiving portion 5251 forming a space in which the liquid L is accommodated and a peripheral portion 5253 surrounding the liquid receiving portion 5251. For example, the sealing member 525 may be formed to have the liquid receiving portion 5251 and the peripheral portion 5253 by fusing or pressing the periphery of a membrane filled with a liquid. The peripheral portion 5253 may be formed at the periphery of the liquid receiving portion 5251.

In an embodiment, opposite surfaces of the sealing member 525 may be attached to the first light transmitting member 521 and the second light transmitting member 523. For example, at least a portion of one surface (e.g., the surface facing the −z-axis direction) of the liquid receiving portion 5251 may be attached to the first light transmitting member 521, and at least a portion of an opposite surface (e.g., the surface facing the +z-axis direction) of the liquid receiving portion 5251 may be attached to the second light transmitting member 523. The peripheral portion 5253 of the sealing member 525 may be spaced apart from the first light transmitting member 521 and the second light transmitting member 523 by a predetermined gap.

In an embodiment, the sealing member 525 may be formed of an elastic member having a specified magnitude of elastic force and/or restoring force. The sealing member 525 may elastically connect the first light transmitting member 521 and the second light transmitting member 523. For example, the second light transmitting member 523 may move relative to the first light transmitting member 521 as the sealing member 525 is deformed. In various embodiments, the structure in which the light transmitting members 521 and 523 are connected through the sealing member 525 may be understood as being substantially the same as, or similar to, the structure in which the first light transmitting member 521 and the second light transmitting member 523 are connected by a member (e.g., a spring) having an elastic force/a restoring force. For example, the sealing member 525 may be formed to have a predetermined spring constant. The spring constant refers to a constant expressing a proportional relationship (e.g., Hooke's law) between force acting on an elastic body, such as a spring, and deformation of the elastic body caused by the force. For example, when a spring is deformed (compressed or stretched) by x from the original length, a restoring force F proportional to the length x may be generated. Here, the ratio of F to x (k=F/x) is a spring constant.

In an embodiment, the sealing member 525 may be deformed by an external force. For example, the sealing member 525 may be deformed in response to a relative movement between the first light transmitting member 521 and the second light transmitting member 523 and thus may provide a function of changing the path of light. When the external force is removed, the sealing member 525 may be restored to the shape before the application of the external force by an elastic force/a restoring force. The sealing member 525 may be formed of a transparent material to allow light to pass through the sealing member 525, and the liquid L accommodated in the sealing member 525 may be a liquid capable of transmitting light.

According to an embodiment, the optical member 520 may be implemented in the form of liquid optics (e.g., a liquid prism or a tunable prism) through the first light transmitting member 521, the second light transmitting member 523, and an optical liquid layer (e.g., the sealing member 525) disposed therebetween.

In an embodiment, the first support member 522 may be fixed to the camera housing (e.g., the camera housing 410 of FIGS. 4 to 6). The second support member 524 may be coupled to the holder (e.g., the holder 510 of FIG. 6) and may move together with the holder 510. For example, the first support member 522 and the first light transmitting member 521 may be in a state of being fixed to the camera housing 410. The second support member 524 and the second light transmitting member 523 may move together with the holder 510 relative to the first support member 522 and the first light transmitting member 521 in a state of being elastically connected with the first light transmitting member 521 by the sealing member 525.

In an embodiment, the optical member 520 may be configured such that the second light transmitting member 523 rotates about a first axis of rotation R1 and a second axis of rotation R2 perpendicular to the first axis of rotation R1 relative to the first light transmitting member 521 in a predetermined range. For example, the first light transmitting member 521 may be fixed glass that is fixed so as not to move, and the second light transmitting member 523 may be tilting glass or moving glass that rotates relative to the first light transmitting member 521.

In an embodiment, the first axis of rotation R1 and the second axis of rotation R2 may be substantially perpendicular to each other and may be substantially perpendicular to the central axis CA of the optical member 520. The central axis CA of the optical member 520 may refer to the central axis of the relatively fixed first light transmitting member 521. For example, the central axis CA of the optical member 520 may be defined as a normal line that passes through the center of the first light transmitting member 521 and is perpendicular to the first light transmitting member 521. The central axis CA of the optical member 520 may be understood as an optical axis of the optical member 520. For example, the optical member 520 for refracting light incident on the first light transmitting member 521 and outputting the light from the second light transmitting member 523 may be provided in a structure that rotates the second light transmitting member 523 in a specified range about the first axis of rotation R1 (e.g., the y-axis based on the drawings) and the second axis of rotation R2 (e.g., the x-axis based on the drawings) that are perpendicular to the normal line (e.g., the z-axis based on the drawings) of the first light transmitting member 521.

In an embodiment, rotation of the second light transmitting member 523 about the first axis of rotation R1 relative to the first light transmitting member 521 may be understood as a pitch tilt or pitching motion. Rotation of the second light transmitting member 523 about the second axis of rotation R2 relative to the first light transmitting member 521 may be understood as a yaw tilt or yawing motion.

In an embodiment, the optical member 520 may change the path of light incident on the optical member 520 through rotation (or tilting) of the second light transmitting member 523 relative to the first light transmitting member 521. The sealing member 525 may elastically support or connect the first light transmitting member 521 and the second light transmitting member 523 to allow the second light transmitting member 523 to be tilted relative to the first light transmitting member 521 and may be deformed as the second light transmitting member 523 is tilted at a predetermined angle. Accordingly, the path of the light may be changed while the angle of the surface through which the light passes is changed.

Figure 8A:
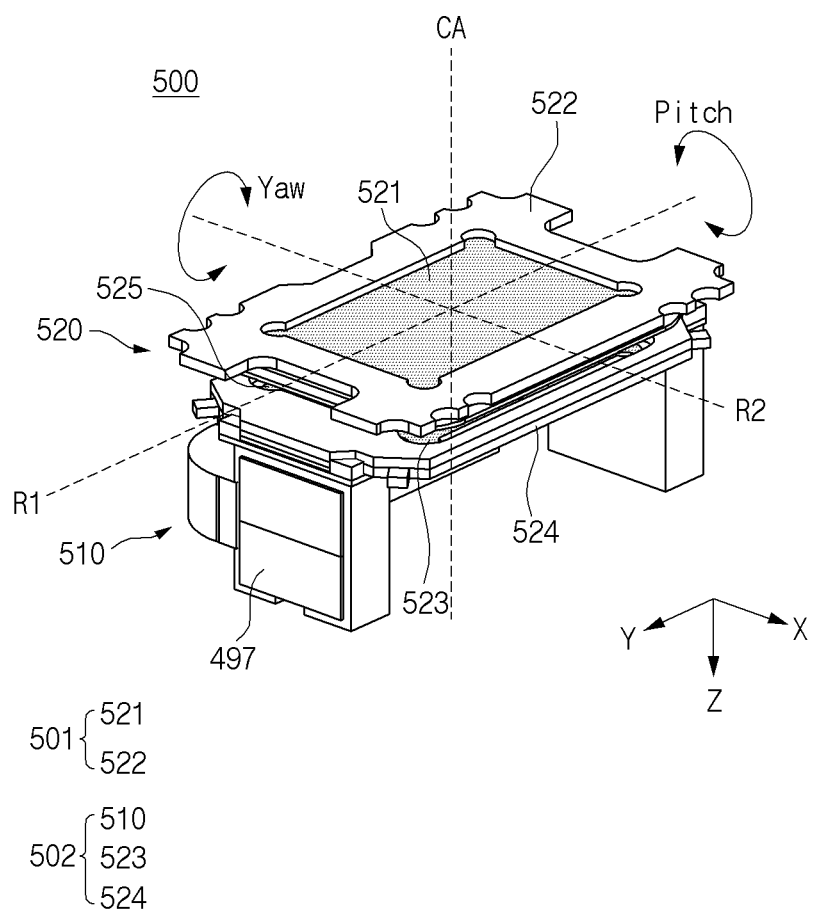
FIG. 8A is a perspective view illustrating the optical image stabilizer assembly of the camera module according to an embodiment.
Figure 8B:
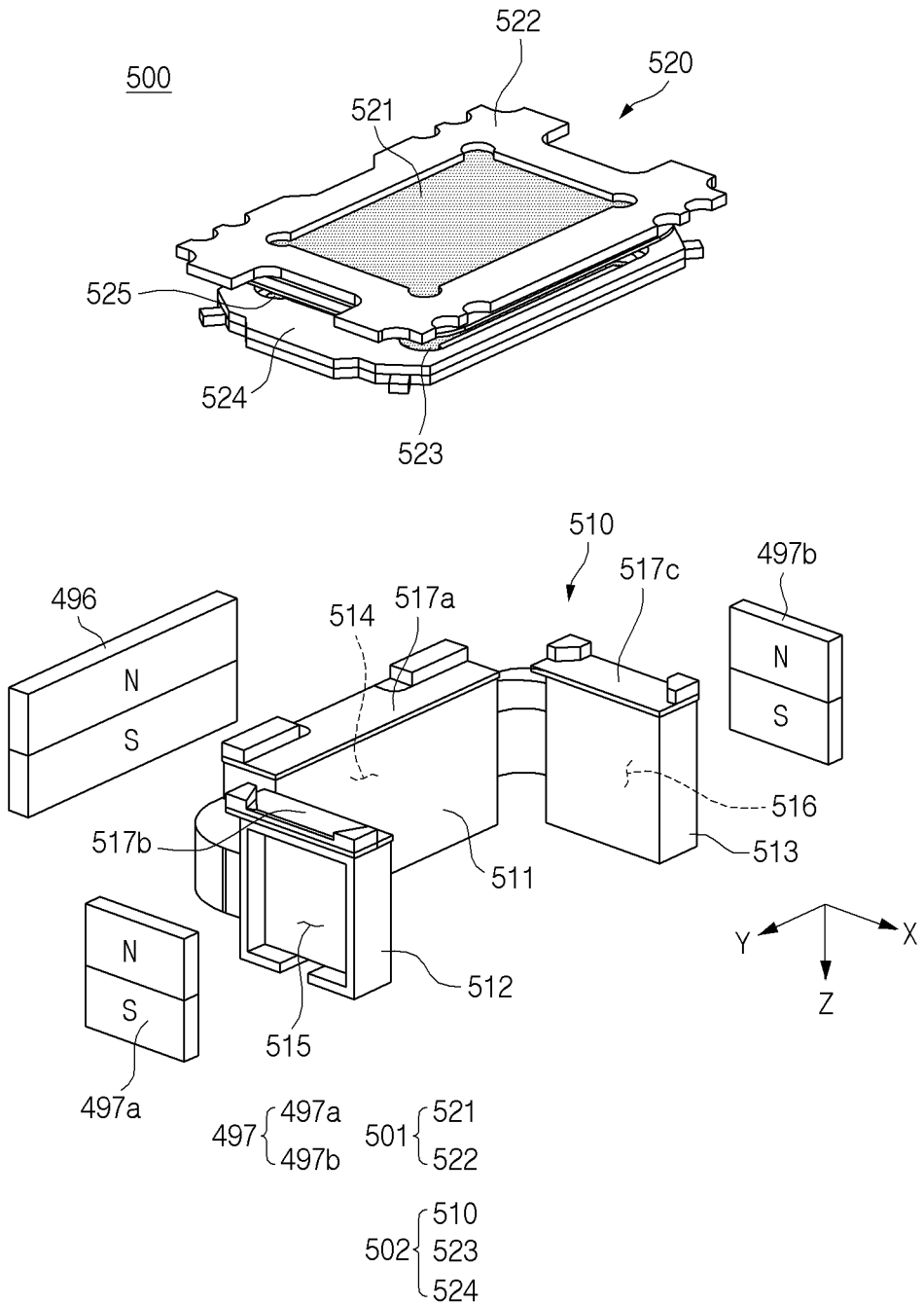
FIG. 8B is a perspective view illustrating the optical image stabilizer assembly of the camera module according to an embodiment.

FIG. 8A illustrates the optical image stabilizer assembly of the camera module according to an embodiment. FIG. 8B illustrates the optical image stabilizer assembly of the camera module according to an embodiment.

FIG. 8A is a perspective view of the optical image stabilizer assembly, and FIG. 8B is an exploded perspective view of the optical image stabilizer assembly.

Referring to FIGS. 8A and 8B, the optical image stabilizer assembly 500 according to an embodiment may include the optical member 520 and the holder 510 connected to some components of the optical member 520. For example, the optical member 520 and the holder 510 illustrated in FIGS. 8A and 8B may be identical or similar to the optical member 520 and the holder 510 of the camera module 400 illustrated in FIG. 6, 7A, 7B, or 7C. Hereinafter, repetitive descriptions will be omitted.

In an embodiment, the optical member 520 may include the fixed light transmitting plate 521 and 522, the moving light transmitting plate 523 and 524, and the sealing member 525 elastically connecting the fixed light transmitting plate 521 and 522 and the moving light transmitting plate 523 and 524. For example, the fixed light transmitting plate 521 and 522, which is fixed to the camera housing 410, may include the first support member 522 and the first light transmitting member 521 coupled to the first support member 522. The moving light transmitting plate 523 and 524, which is connected to the fixed light transmitting plate 521 and 522 by the sealing member 525 so as to be rotatable relative to the fixed light transmitting plate 521 and 522, may include the second support member 524 and the second light transmitting member 523 coupled to the second support member 524.

In an embodiment, the holder 510 may support the magnets 496 and 497 of the first drive member (e.g., the first drive member 491 of FIG. 6) that provides a driving force to move the holder 510 and the moving light transmitting plate 523 and 524. For example, the first magnet 496 and the second magnets 497 may be disposed on the holder 510. As described above, the first magnet 496 and the second magnets 497 may be fixedly disposed on the holder 510 to face the first coil (e.g., the first coil 493 of FIG. 6) and the second coils (e.g., the second coils 494 of FIG. 6) fixedly disposed on the frame (e.g., the frame 430 of FIG. 6).

In an embodiment, the holder 510 may include a first portion 511 on which the first magnet 496 is disposed, a second portion 512 extending from one end portion (e.g., the end portion facing the +y-axis direction) of the first portion 511, and a third portion 513 extending from an opposite end portion (e.g., the end portion facing the −y-axis direction) of the first portion 511. For example, the second portion 512 and the third portion 513 may extend from the opposite end portions of the first portion 511 so as to be substantially perpendicular to the first portion 511. The second portion 512 and the third portion 513 may be substantially parallel to each other and may face each other. For example, the second portion 512 and the third portion 513 may be symmetrical to each other with respect to the first portion 511. The first portion 511 may extend in a direction substantially parallel to the y-axis. The second portion 512 and the third portion 513 may extend in a direction substantially parallel to the x-axis.

In an embodiment, the first magnet 496 may be disposed on the first portion 511, and the second magnets 497 may be disposed on the second portion 512 and the third portion 513. For example, a first magnet receiving portion 514 in which the first magnet 496 is accommodated may be formed on the first portion 511. A second magnet receiving portion 515 in which the first sub magnet 497a is accommodated may be formed on the second portion 512. A third magnet receiving portion 516 in which the second sub magnet 497b is accommodated may be formed on the third portion 513.

The first magnet receiving portion 514 may be open in the −x-axis direction, the second magnet receiving portion 515 may be open in the +y-axis direction, and the third magnet receiving portion 516 may be open in the −y-axis direction.

In an embodiment, the holder 510 may be rotated about the first axis of rotation R1 perpendicular to the central axis CA by electromagnetic interaction between the first magnet 496 and the first coil 493. The holder 510 may be rotated about the second axis of rotation R2 perpendicular to the central axis CA and the first axis of rotation R1 by electromagnetic interaction between the first sub magnet 497a and the first sub coil (e.g., the first sub coil 494a of FIG. 6) and/or electromagnetic interaction between the second sub magnet 497b and the second sub coil (e.g., the second sub coil 494b of FIG. 6).

In an embodiment, the first magnet 496 and the second magnets 497 may be formed to be polarized in a direction parallel to the central axis CA. For example, each of the first magnet 496 and the second magnets 497 may be formed such that an N-pole portion and an S-pole portion are arranged in the direction of the central axis CA. For example, the boundary line between the N-pole portion and the S-pole portion of the first magnet 496 may be substantially perpendicular to the first axis of rotation R1. The boundary lines between the N-pole portions and the S-pole portions of the second magnets 497 may be substantially parallel to the second axis of rotation R2.

In an embodiment, the holder 510 may be connected to the second support member 524. For example, the holder 510 may be attached to a partial area of the second support member 524, but is not limited thereto. The holder 510 may be fixed to the second support member 524 using various methods (e.g., screw coupling). In another embodiment, the holder 510 and the second support member 524 may be integrally formed with each other. The optical image stabilizer 500 may be configured such that as the second support member 524 is fixed to the holder 510, the second support member 524 and the second light transmitting member 523 move together when the holder 510 is moved by the driving force of the first drive member 491.

In an embodiment, the holder 510 may include seating surfaces 517a, 517b, and 517c on which the second support member 524 is seated. For example, the seating surfaces 517a, 517b, and 517c, on which portions of the second support member 524 are seated, may be formed on the first portion 511, the second portion 512, and the third portion 513 of the holder 510. The seating surfaces 517a, 517b, and 517c may face the second support member 524. The seating surfaces 517a, 517b, and 517c may face a direction parallel to the central axis CA of the optical member 520.

Referring to FIG. 6 together, in the optical image stabilizer assembly 500 according to the illustrated embodiment, the optical member 520 may be coupled to the holder 510 in a direction (e.g., the z-axis direction) perpendicular to the optical axis OA of the lens so as to be located between the reflective member 460 and the light receiving area 423. For example, to change the path of light travelling toward the reflective member 460, the optical member 520 may be located over the reflective member 460 (e.g., the −z-axis direction) based on FIG. 6. However, this is illustrative, and in another embodiment, the optical image stabilizer assembly 500 may be configured such that the optical member 520 is located between the reflective member 460 and the lens assembly 440 and changes the path of light that is output from the reflective member 460 and travels toward the lens unit 441. In the other embodiment, the optical member 520 may be coupled to the holder 510 in a direction (e.g., the x-axis direction) parallel to the optical axis OA.

The optical image stabilizer assembly 500 according to embodiments of the disclosure may have a structure that includes a fixed part 501 fixed inside the camera housing 410, a moving part 502 movable relative to the fixed part 501, and the sealing member 525 elastically connecting the fixed part 501 and the moving part 502. For example, the moving part 502 may rotate about the first axis of rotation R1 and/or the second axis of rotation R2 in the clockwise or counterclockwise direction relative to the fixed part 501. The fixed part 501 may include the first support member 522 and the first light transmitting member 521. The moving part 502 may include the second support member 524, the second light transmitting member 523, and the holder 510. For example, the fixed part 501 may be referred to as a structure in which the first support member 522 and the first light transmitting member 521 are coupled, and the moving part 502 may be referred to as a structure in which the second support member 524, the second light transmitting member 523, and the holder 510 are coupled. The camera module 400 may provide optical image stabilization (OIS) through a tilt motion of the moving part 502 relative to the fixed part 501.

The optical image stabilizer assembly 500 according to embodiments of the disclosure may further include a structure in which the moving part 502 is connected to the camera housing 410 or the fixed part 501 through a spring, in addition to the structure in which the moving part 502 and the fixed part 501 are connected through the sealing member 525. For example, the moving part 502 may be elastically connected to at least one of the camera housing 410 or the fixed part 501 through the spring. Hereinafter, a structure in which the moving part 502 is elastically restrained by a spring will be described with reference to FIGS. 9A to 12C.

Figure 9A:
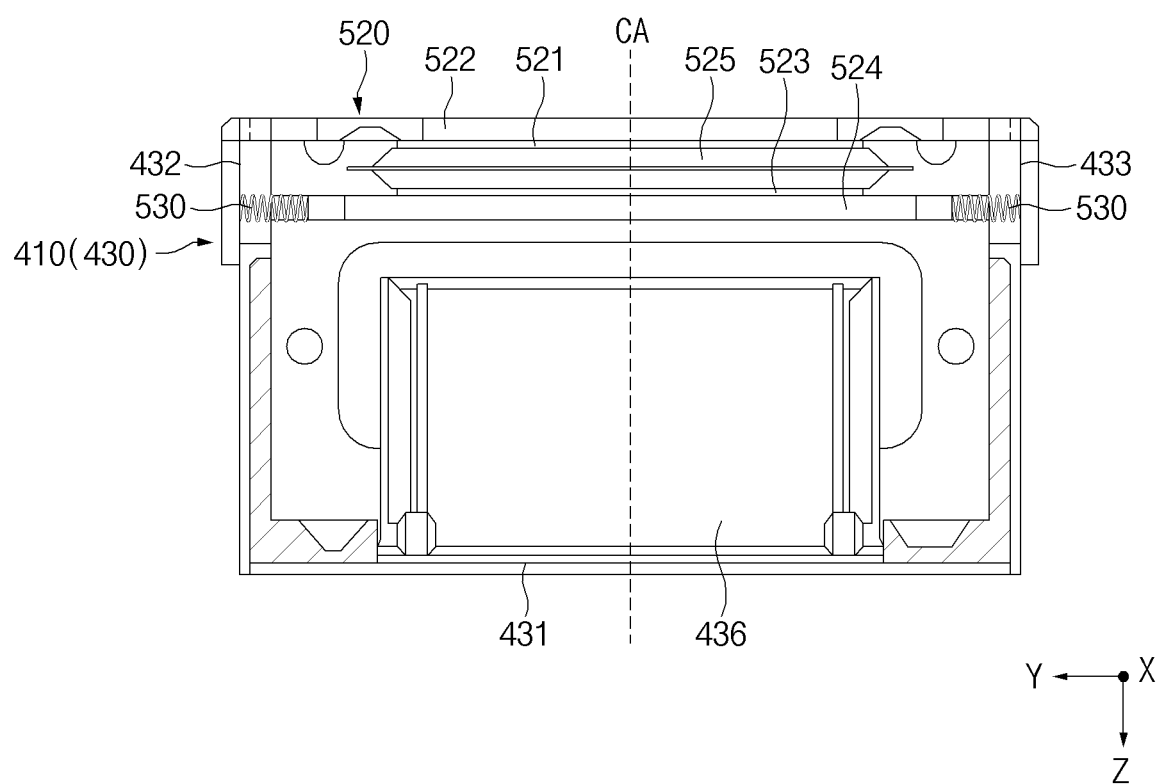
FIG. 9A is a plan view illustrating a camera housing and the optical image stabilizer assembly of the camera module according to an embodiment.
Figure 9B:
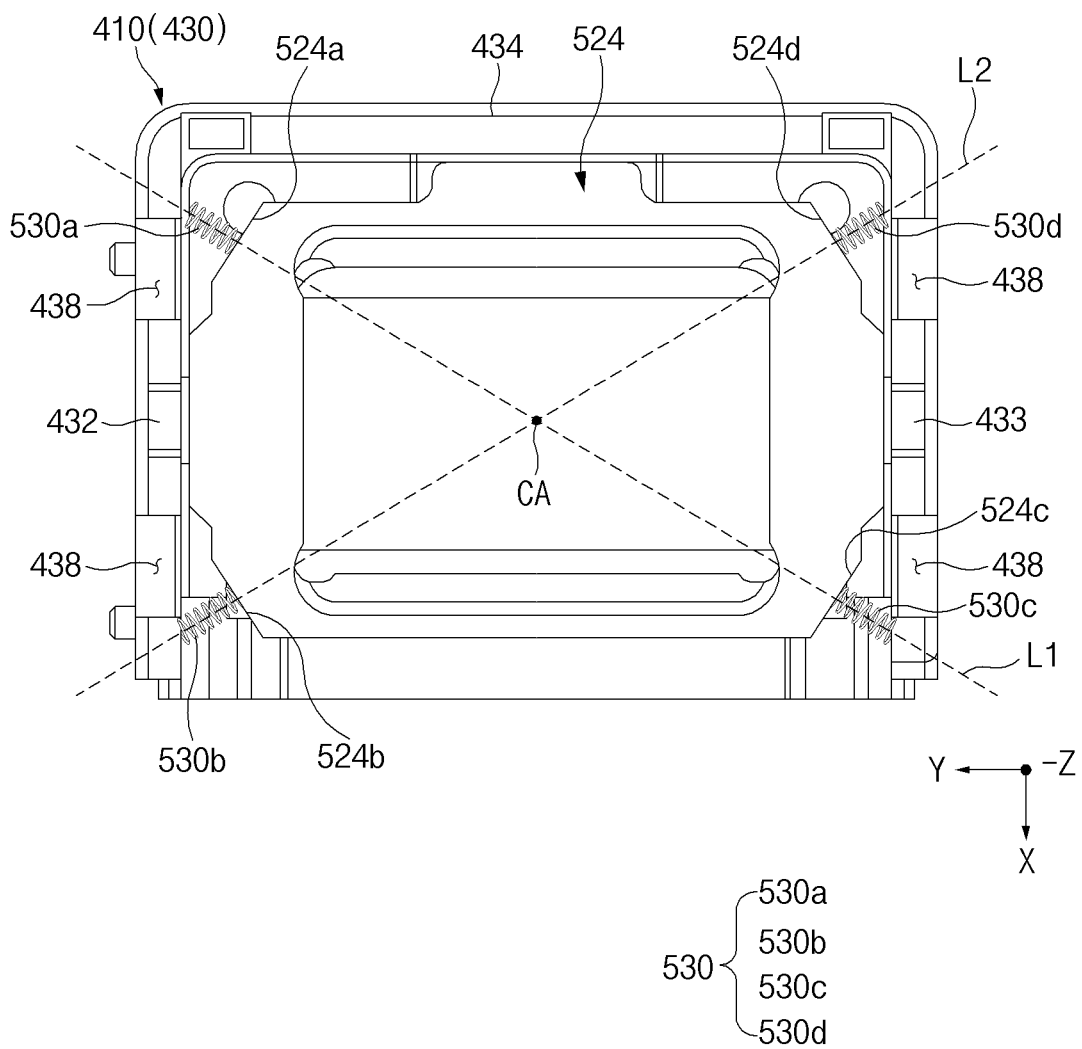
FIG. 9B is a plan view illustrating the camera housing and the optical image stabilizer assembly of the camera module according to an embodiment.

FIG. 9A illustrates the camera housing and the optical image stabilizer assembly of the camera module according to an embodiment. FIG. 9B illustrates the camera housing and the optical image stabilizer assembly of the camera module according to an embodiment.

FIG. 9A may be a view in which the holder 510 of the optical image stabilizer assembly 500 is omitted. FIG. 9B may be a view in which the holder 510, the first support member 522, the light transmitting members 521 and 523, and the sealing member 525 of the optical image stabilizer assembly 500 are omitted.

FIG. 9A may be a view of the camera housing 410 and the optical image stabilizer assembly 500 illustrated in FIGS. 5 and 6 as viewed in the −x-axis direction. FIG. 9B may be a view of the camera housing 410 and the optical image stabilizer assembly 500 illustrated in FIG. 9A as viewed in the +z-axis direction.

Referring to FIGS. 9A and 9B, the camera module 400 according to an embodiment may include the camera housing 410 and the optical image stabilizer assembly 500. For example, the camera housing 410 of FIGS. 9A and 9B may be referred to as the frame 430 (e.g., the frame 430 of FIG. 6).

In an embodiment, the optical image stabilizer assembly 500 may include the optical member 520 and a plurality of first elastic members 530 elastically connecting components included in the moving part (e.g., the moving part 502 of FIGS. 8A and 8B) of the optical member 520 to the camera housing 410. For example, the optical member 520 may include the first support member 522, the first light transmitting member 521, the second support member 524, the second light transmitting member 523, and the sealing member 525.

In an embodiment, the first elastic members 530 may provide a function of elastically restraining a relatively moving part of the optical member 520 to the camera housing 410. For example, the first elastic members 530 may elastically connect the second support member 524 of the optical member 520 and the camera housing 410. The first elastic members 530 may be connected, at opposite ends thereof, to edges of the second support member 524 and the sidewalls 432, 433, and 434 of the frame 430. The first elastic members 530 may be elastically deformed while being partially compressed and/or uncompressed in response to a movement of the second support member 524. For example, the first elastic members 530 may be deformed to correspond to the angle formed by the second support member 524 and the second light transmitting member 523 with respect to the first support member 522 and the first light transmitting member 521.

In an embodiment, the first elastic members 530 may be formed of an elastic material having a specified magnitude of elastic force and/or restoring force. For example, the first elastic members 530 may include a spring or an elastic band (e.g., a rubber band). The first elastic members 530 may be formed of a metallic material or a non-metallic material. The first elastic members 530 may be formed to have a predetermined spring constant. In various embodiments, the spring constant of the first elastic members 530 may be substantially the same as the spring constant of the sealing member 525, but is not limited thereto. The type of the first elastic members 530 is not limited to the above-described example, and the first elastic members 530 may be implemented by using various materials capable of generating an elastic force/a restoring force in response to an external force.

In an embodiment, the first elastic members 530 may restrain the second support member 524 to the camera housing 410 in a predetermined range by providing elastic forces and/or restoring forces in response to an external force. For example, the first elastic members 530 may be elastically deformed such that the second support member 524 is moved by the driving force of the first drive member 491 in an optical image stabilization operation, and when the driving force is removed, the first elastic members 530 may return the second support member 524 to the initial position by the elastic forces/the restoring forces. In another example, when an external force (e.g., the gravity, vibration, or an impact) other than the driving force is applied to the optical image stabilizer assembly 500, the first elastic members 530 may limit or restrain a movement of the second support member 524 within a predetermined range.

In an embodiment, the first elastic members 530 may include a plurality of elastic members (e.g., a plurality of springs). For example, the first elastic members 530 may include a first sub elastic member 530a connected to a first corner 524a of the second support member 524 and the first sidewall 432 of the frame 430, a second sub elastic member 530b connected to a second corner 524b of the second support member 524 and the first sidewall 432 of the frame 430, a third sub elastic member 530c connected to a third corner 524c of the second support member 524 and the second sidewall 433 of the frame 430, and a fourth sub elastic member 530d connected to a fourth corner 524d of the second support member 524 and the second sidewall 433 of the frame 430. However, the number of first elastic members 530 is not limited to the illustrated embodiment.

For example, two, three, five or more first elastic members 530 may be provided. In various embodiments, the plurality of first elastic members 530 may be formed to have substantially the same spring constant, but are not limited thereto.

In an embodiment, the first elastic members 530 may connect the second support member 524 and the camera housing 410 in directions substantially perpendicular to the central axis CA of the optical member 520. For example, the central axis CA of the optical member 520 may be a straight line that passes through the center of the first light transmitting member 521 and is perpendicular to the first light transmitting member 521. As illustrated in FIG. 9A, in the state in which the first support member 522 (or the first light transmitting member 521) and the second support member 524 (or the second light transmitting member 523) are parallel to each other, the first elastic members 530 may extend from the second support member 524 toward the sidewalls 432, 433, and 434 of the frame 430 in the directions perpendicular to the central axis CA. When the second support member 524 is inclined with respect to the first support member 522 based on FIG. 9A, some of the first elastic members 530 may be compressed, and the other first elastic members 530 may be uncompressed. However, FIG. 9A is illustrative, and the first elastic members 530 may connect the second support member 524 and the frame 430 in a direction parallel to the central axis CA.

In an embodiment, the first elastic members 530 may be configured such that the vector sum of the elastic forces (or the restoring forces) of the first elastic members 530 on a plane perpendicular to the central axis CA is substantially equal to 0. For example, the first elastic members 530 may be disposed such that in the state in which the first support member 522 and the second support member 524 are parallel to each other, the vector sum of the elastic force of the first sub elastic member 530a, the elastic force of the second sub elastic member 530b, the elastic force of the elastic member 1-3 530c, and the elastic force of the fourth sub elastic member 530d on a plane having the central axis CA as a normal vector is 0.

In an embodiment, the first elastic members 530 may be disposed such that a first virtual line L1 passes through the centers of the first sub elastic member 530a and the third sub elastic member 530c and a second virtual line L2 passes through the centers of the second sub elastic member 530b and the fourth sub elastic member 530d. The first elastic members 530 may be disposed such that the first virtual line L1 and the second virtual line L2 intersect each other at one point on the central axis CA. For example, the first virtual line L1 and the second virtual line L2 may be substantially perpendicular to the central axis CA of the optical member 520 and may intersect the central axis CA at one point. FIG. 9B illustrates one example of an arrangement structure in which the vector sum of the elastic forces of the plurality of first elastic members 530 is 0 on the plane perpendicular to the central axis CA. However, without being limited thereto, the plurality of elastic members 530 may include various numbers of elastic members and may be changed to various arrangement structures in which the vector sum of elastic forces is 0.

In another embodiment (not illustrated), the optical image stabilizer assembly 500 may include three first elastic members 530. The first elastic members 530 may include a first sub elastic member, a second sub elastic member, and a third sub elastic member. For example, when the optical image stabilizer assembly 500 includes the three first elastic members 530, a first virtual line passing through the center of the first sub elastic member, a second virtual line passing through the center of the second sub elastic member, and a third virtual line passing through the center of the third sub elastic member may each form an angle of 120 degrees with a line adjacent thereto, and the first virtual line, the second virtual line, and the third virtual line may each intersect the central axis CA of the optical member 520 at a right angle.

Figure 10:
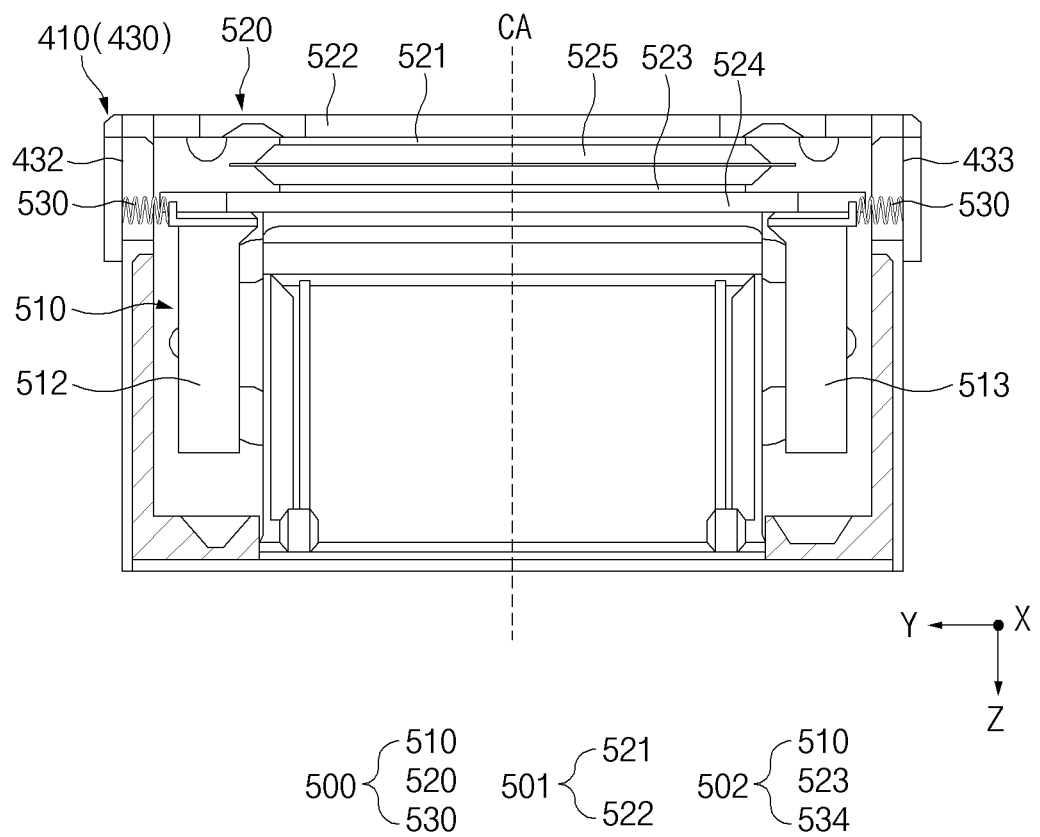
FIG. 10 is a plan view illustrating the camera housing and the optical image stabilizer assembly of the camera module according to an embodiment.

FIG. 10 illustrates the camera housing and the optical image stabilizer assembly of the camera module according to an embodiment.

FIG. 10 may be a view related to an embodiment in which the positions to which the first elastic members 530 are connected in the embodiment of FIGS. 9A and 9B are changed. Hereinafter, repetitive descriptions will be omitted, and the following description will be focused on the changed contents.

Referring to FIG. 10, the optical image stabilizer assembly 500 according to an embodiment may include the fixed part 501, the moving part 502, and the plurality of first elastic members 530 elastically connecting the moving part 502 to the camera housing 410. For example, the plurality of first elastic members 530 may be substantially the same as, or similar to, the first elastic members 530 described above with reference to FIGS. 9A and 9B.

In an embodiment, the holder 510 may be fixed to the second support member 524 of the optical member 520. The holder 510, together with the second support member 524 and the second light transmitting member 523, may form the moving part 502 that rotates relative to the fixed part 501. For example, the holder 510, the second support member 524, and the second light transmitting member 523 may be connected to the first light transmitting member 521 through the sealing member 525 so as to be tiltable.

In an embodiment, the first elastic members 530 may provide a function of elastically restraining the holder 510 to the camera housing 410. For example, the first elastic members 530 may elastically connect the holder 510 and the camera housing 410. The first elastic members 530 may be connected, at the opposite ends thereof, to the holder 510 and the sidewalls 432 and 433 of the frame 430. The first elastic members 530 may be elastically deformed while being partially compressed and/or uncompressed in response to a movement of the holder 510. For example, the first elastic members 530 may restrain the holder 510 to the camera housing 410 in a predetermined range by providing elastic forces and/or restoring forces in response to an external force.

In an embodiment, the first elastic members 530 may connect the holder 510 and the camera housing 410 in directions substantially perpendicular to the central axis CA of the optical member 520. For example, the first elastic members 530 may connect the second portion 512 of the holder 510 and the first sidewall 432 of the frame 430 in a direction perpendicular to the central axis CA. The first elastic members 530 may connect the third portion 513 of the holder 513 and the second sidewall 433 of the frame 430 in a direction perpendicular to the central axis CA. As illustrated in FIG. 10, in the state in which the first support member 522 (or the first light transmitting member 521) and the second support member 524 (or the second light transmitting member 523) are parallel to each other, the first elastic members 530 may extend from the holder 510 toward the sidewalls 432 and 433 of the frame 430 in the directions perpendicular to the central axis CA. When the second support member 524 is inclined with respect to the first support member 522 by a movement of the holder 510 based on FIG. 10, some of the first elastic members 530 may be compressed, and the other first elastic members 530 may be uncompressed.

In an embodiment, the first elastic members 530 may be configured such that the vector sum of the elastic forces (or the restoring forces) of the first elastic members 530 on a plane perpendicular to the central axis CA is substantially equal to 0. For example, the first elastic members 530 may be disposed such that in the state in which the first support member 522 and the second support member 524 are parallel to each other, the vector sum of the elastic forces of the plurality of first elastic members 530 on a plane having the central axis CA as a normal vector is 0.

Figure 11:
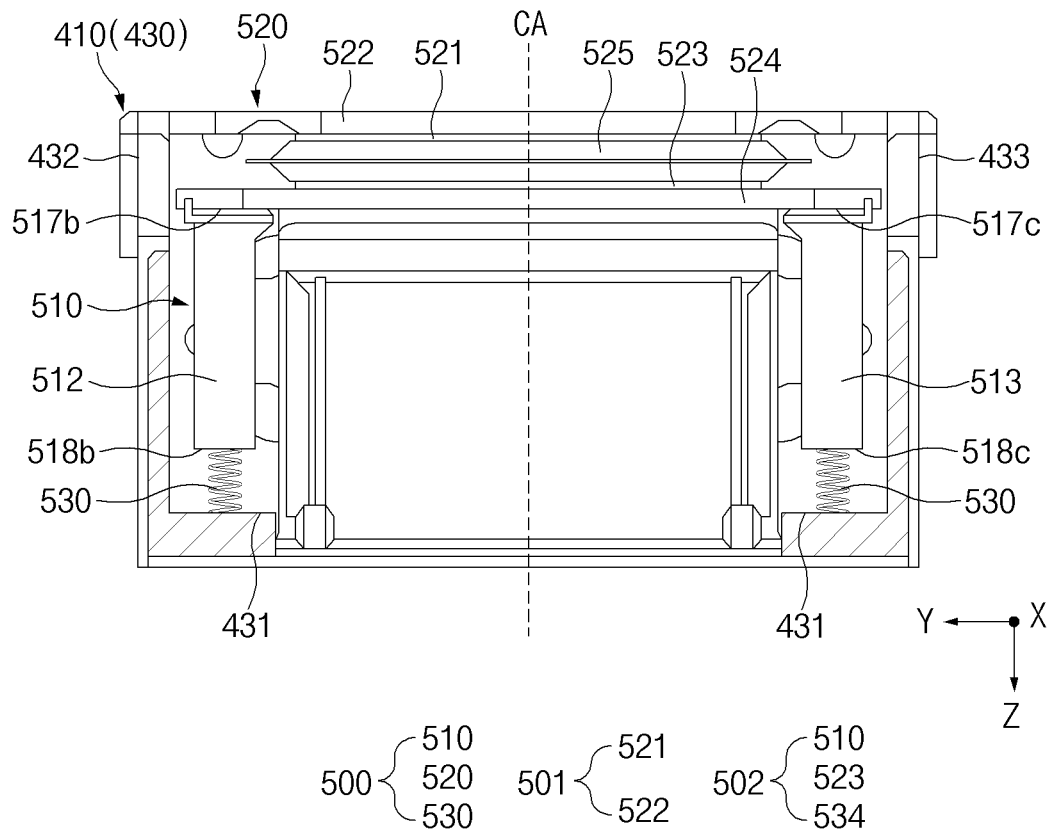
FIG. 11 is a plan view illustrating the camera housing and the optical image stabilizer assembly of the camera module according to an embodiment.

FIG. 11 illustrates the camera housing and the optical image stabilizer assembly of the camera module according to an embodiment.

FIG. 11 may be a view related to an embodiment in which the positions to which the first elastic members 530 are connected in the embodiment of FIG. 10 are changed. Hereinafter, repetitive descriptions will be omitted, and the following description will be focused on the changed contents.

Referring to FIG. 11, the optical image stabilizer assembly 500 according to an embodiment may include the holder 510, the optical member 520, and the plurality of first elastic members 530. For example, the plurality of first elastic members 530 may be substantially the same as, or similar to, the first elastic members 530 described above with reference to FIGS. 9A, 9B, and 10.

In an embodiment, the first elastic members 530 may provide a function of elastically restraining the holder 510 to the camera housing 410. For example, the first elastic members 530 may elastically connect the holder 510 and the camera housing 410. The first elastic members 530 may be connected, at the opposite ends thereof, to the holder 510 and the plate 431 of the frame 430.

In an embodiment, the holder 510 may include connecting surfaces 518b and 518c to which the first elastic members 530 are connected. For example, the first connecting surface 518b facing away from the first seating surface 517b, to which the second support member 524 is attached, may be formed on the second portion 512 of the holder 510. The second connecting surface 518c facing away from the second seating surface 517c, to which the second support member 524 is attached, may be formed on the third portion 513 of the holder 510. The first elastic members 530 may be connected, at the opposite ends thereof, to the first connecting surface 518b and the plate 431 and/or the second connecting surface 518c and the plate 431.

In an embodiment, the first elastic members 530 may connect the holder 510 and the camera housing 410 in a direction substantially parallel to the central axis CA of the optical member 520. For example, the first elastic members 530 may connect the second portion 512 of the holder 510 and the plate 431 of the frame 430 in the direction parallel to the central axis CA. The first elastic members 530 may connect the third portion 513 of the holder 513 and the plate 431 of the frame 430 in the direction parallel to the central axis CA. As illustrated in FIG. 11, in the state in which the first support member 522 (or the first light transmitting member 521) and the second support member 524 (or the second light transmitting member 523) are parallel to each other, the first elastic members 530 may extend from the holder 510 toward the plate 431 of the frame 430 in the direction parallel to the central axis CA. When the second support member 524 is inclined with respect to the first support member 522 by a movement of the holder 510 based on FIG. 10, some of the first elastic members 530 may be compressed, and the other first elastic members 530 may be uncompressed.

According to the illustrated embodiment, the first elastic members 530 may extend in the direction parallel to the central axis CA in the state in which the first support member 522 and the second support member 524 are parallel to each other. However, the disclosure is not particularly limited thereto. In another embodiment (not illustrated), the first elastic members 530 may be disposed between the connecting surfaces 518b and 518c and the plate 431 to form a specified angle (e.g., exceeding 0 degrees) with the central axis CA in the state in which the first support member 522 and the second support member 524 are parallel to each other.

The embodiments described with reference to FIGS. 9A, 9B, 10, and 11 may relate to a structure in which springs (e.g., the first elastic members 530) elastically connect the moving part 502 of the optical image stabilizer assembly 500 and the camera housing 410 (in particular, the frame 430). Hereinafter, a structure in which springs elastically connect the moving part 502 and the fixed part 501 of the optical image stabilizer assembly 500 will be described with reference to FIGS. 12A to 12C.

Figure 12A:
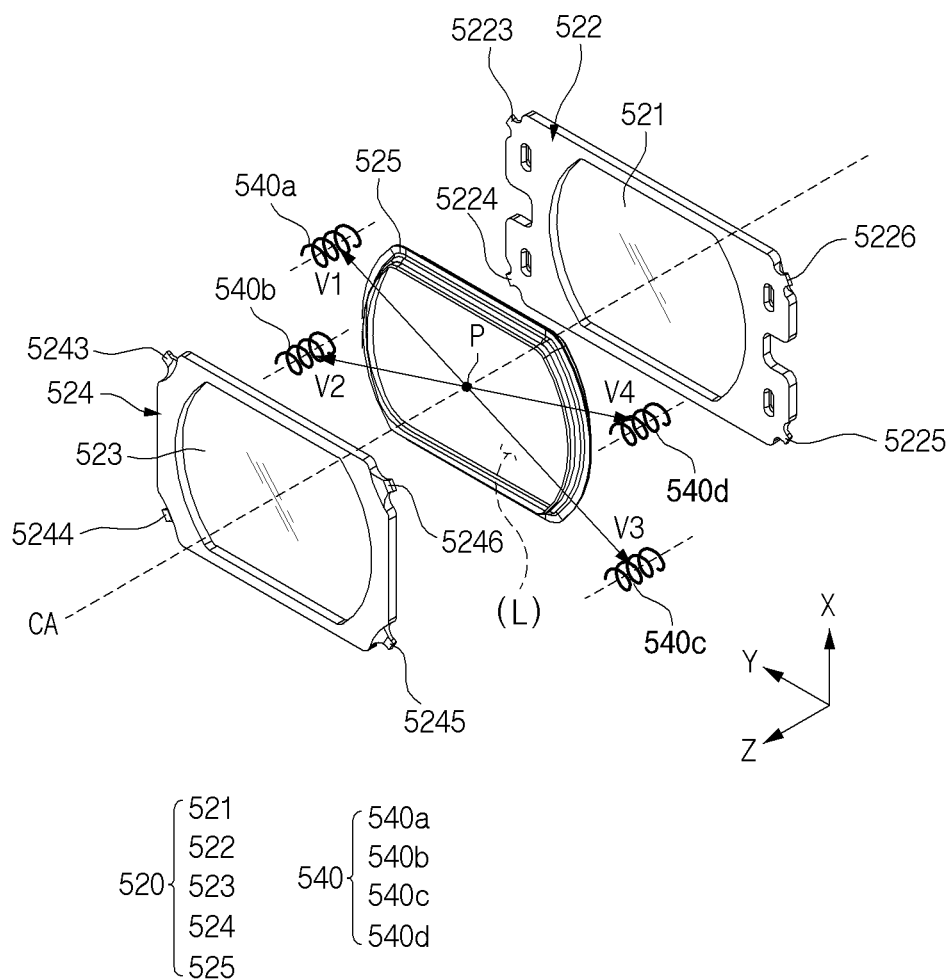
FIG. 12A is an exploded perspective view illustrating the optical member and elastic members of the optical image stabilizer assembly according to an embodiment.
Figure 12B:
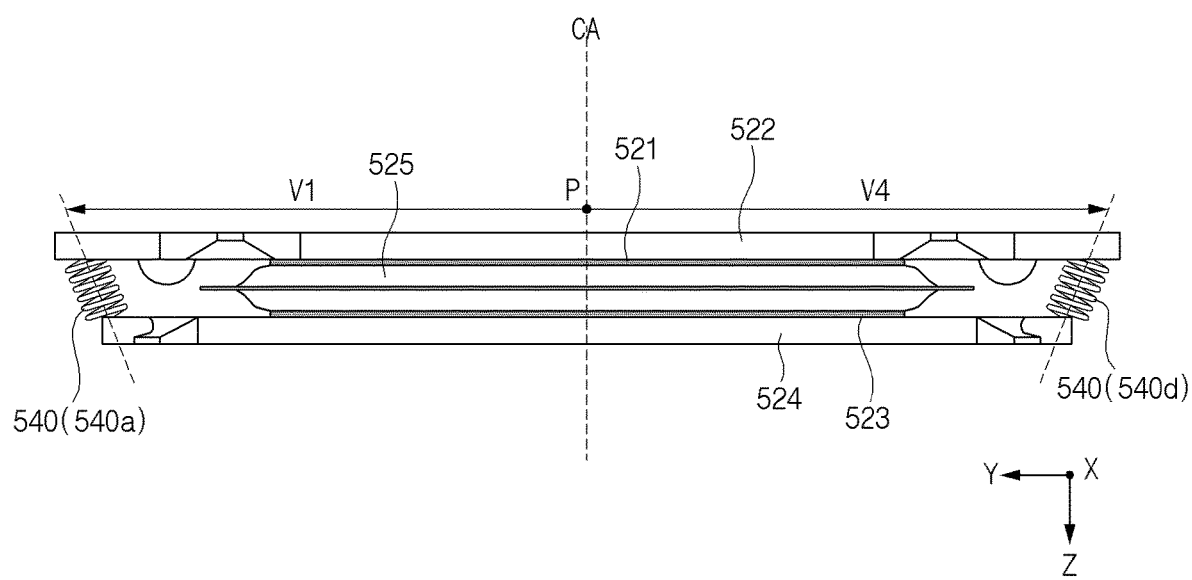
FIG. 12B is a plan view illustrating the optical member and the elastic members of the optical image stabilizer assembly.
Figure 12C:
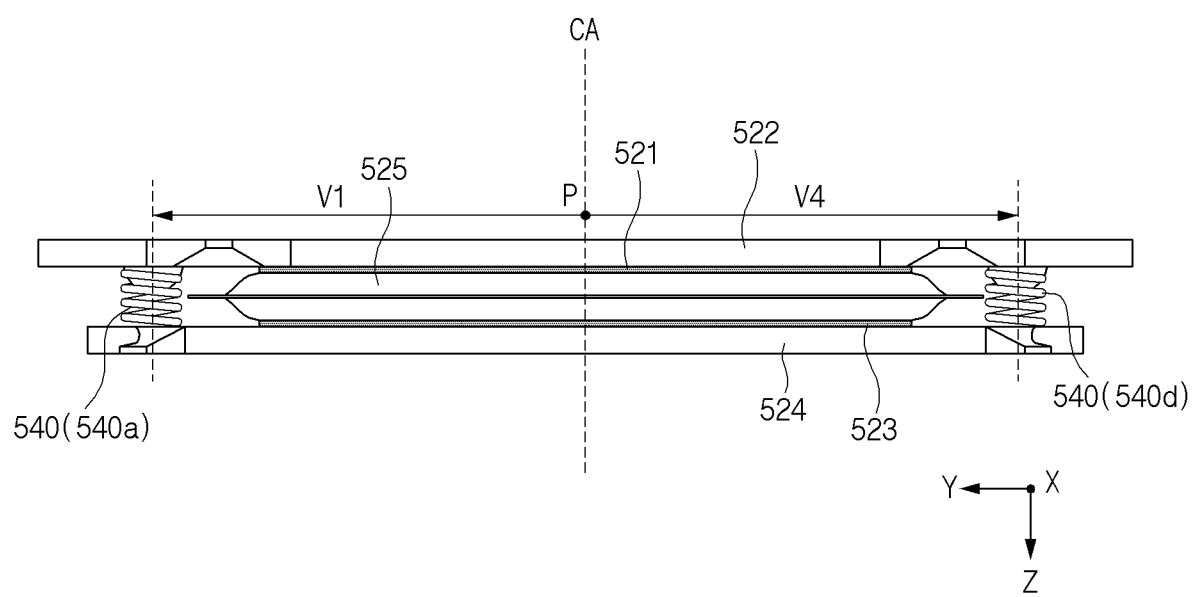
FIG. 12C is a plan view illustrating the optical member and the elastic members of the optical image stabilizer assembly.

FIG. 12A illustrates the optical member and second elastic members of the optical image stabilizer assembly according to an embodiment. FIG. 12B illustrates the optical member and the second elastic members of the optical image stabilizer assembly. FIG. 12C illustrates the optical member and the second elastic members of the optical image stabilizer assembly.

Referring to FIGS. 12A and 12B, the optical image stabilizer assembly 500 according to an embodiment may include the optical member 520 and the plurality of second elastic members 540 connecting one part and another part of the optical member 520. For example, the optical image stabilizer assembly 500 according to the illustrated embodiment may be configured such that the moving part (e.g., the moving part 502 of FIGS. 8A and 8B) is elastically supported on or restrained to the fixed part (e.g., the fixed part 501 of FIGS. 8A and 8B) through the second elastic members 540 separately from the sealing member 525. The second elastic members 540 may be substantially the same as, or similar to, the first elastic members 530 of FIGS. 9A, 9B, 10, and 11. Hereinafter, repetitive descriptions will be omitted.

In an embodiment, the optical member 520 may include the first light transmitting member 521, the first support member 522, the second light transmitting member 523, the second support member 524, and the sealing member 525. For example, the first light transmitting member 521 may be fixed to or otherwise supported by the first support member 522, the second light transmitting member 523 may be fixed to or otherwise supported by the second support member 524, and the sealing member 525 may elastically connect the first light transmitting member 521 and the second light transmitting member 523.

In an embodiment, the second elastic members 540 may elastically connect the first support member 522 and the second support member 524. For example, the second elastic members 540 may be connected, at opposite ends thereof, to the second support member 524 included in the moving part 502 of the optical image stabilizer assembly 500 and the first support member 522 included in the fixed part 501 of the optical image stabilizer assembly 500. Accordingly, the second elastic members 540 may elastically restrain the moving part 502 to the fixed part 501.

In an embodiment, the second elastic members 540 may restrain the second support member 524 to the first support member 522 in a predetermined range by providing elastic forces and/or restoring forces in response to an external force. For example, the second elastic members 540 may be elastically deformed such that the second support member 524 is moved by the driving force of the first drive member 491 in an optical image stabilization operation, and when the driving force is removed, the second elastic members 540 may return the second support member 524 to the initial position by the elastic forces and/or the restoring forces.

In an embodiment, the second elastic members 540 may be configured such that one end portion thereof is connected to the first support member 522 and an opposite end portion thereof is connected to the second support member 524. The first support member 522 may include a plurality of first connecting protrusions 5223, 5224, 5225, and 5226, to each of which one end portion of a corresponding one of the second elastic members 540 is connected. The second support member 524 may include a plurality of second connecting protrusions 5243, 5244, 5245, and 5246, to each of which an opposite end portion of a corresponding one of the second elastic members 540 is connected. For example, the first connecting protrusions 5223, 5224, 5225, and 5226 may be formed at the corners of the first support member 522, and the second connecting protrusions 5243, 5244, 5245, and 5246 may be formed at the corners of the second support member 524 to correspond to the first connecting protrusions 5223, 5224, 5225, and 5226. The second elastic members 540 may be fixed, at the respective opposite ends thereof, to the first connecting protrusions 5223, 5224, 5225, and 5226 and to the second connecting protrusions 5243, 5244, 5245, and 5246.

In an embodiment, the second elastic members 540 may include a plurality of elastic members (e.g., a plurality of springs). The second elastic members 540 may be disposed to surround the peripheral area of the sealing member 525. For example, the second elastic members 540 may include a fifth sub elastic member 540a connected at opposite ends thereof to a first protrusion 5223 and a fifth protrusion 5243, a sixth sub elastic member 540b connected at opposite ends thereof to a second protrusion 5224 and a sixth protrusion 5244, a seventh sub elastic member 540c connected at opposite ends thereof to a third protrusion 5225 and a seventh protrusion 5245, and an eighth sub elastic member 540d connected at opposite ends thereof to a fourth protrusion 5226 and an eighth protrusion 5246. According to the illustrated embodiment, the second elastic members 540 may include the four elastic members, but it is not limited thereto. For example, the second elastic members 540 may include two, three, five or more elastic members. In various embodiments, the plurality of second elastic members 540 may be formed to have substantially the same spring constant, but are not limited thereto.

In an embodiment, the second elastic members 540 may be disposed such that the sum of vectors extending from the central axis CA of the optical member 520 toward the fifth sub elastic member 540a, the sixth sub elastic member 540b, the seventh sub elastic member 540c, and the eighth sub elastic member 540d at right angles is 0. For example, the vectors may be represented by arrows V1, V2, V3, and V4 extending from one point P on the central axis CA to the center lines of the second elastic members 540 in directions perpendicular to the central axis CA. The center lines of the second elastic members 540 may refer to virtual lines that pass through the centers of the second elastic members 540 and extend in the lengthwise direction of the second elastic members 540.

In an embodiment, the first vector V1 extending perpendicular to the central axis CA from the one point P on the central axis CA to the center line of the fifth sub elastic member 540*a*, the second vector V1 extending perpendicular to the central axis CA from the one point P to the center line of the sixth sub elastic member 540*b*, the third vector V3 extending perpendicular to the central axis CA from the one point P to the center line of the seventh sub elastic member 540*c*, and the fourth vector V4 extending perpendicular to the central axis CA from the one point P on the central axis CA to the center line of the eighth sub elastic member 540*d* may be defined. The second elastic members 540 may be disposed such that the sum of the first vector V1, the second vector V2, the third vector V3, and the fourth vector V4 is substantially equal to 0 in the state in which the first support member 522 and the second support member 524 are parallel to each other.

In an embodiment, the second elastic members 540 may form a specified angle with the central axis CA, or may be disposed parallel to the central axis CA, in the state in which the first support member 522 and the second support member 524 are parallel to each other.

According to the embodiment illustrated in FIG. 12B, the second elastic members 540 may be disposed to form the specified angle (e.g., exceeding 0 degrees) with the central axis CA in the state in which the first support member 522 and the second support member 524 are parallel to each other. For example, the second elastic members 540 may be connected, at the opposite ends thereof, to the first support member 522 and the second support member 524 such that respective center lines of each of the second elastic members 540 form the specified angle with the central axis CA.

According to the embodiment illustrated in FIG. 12C, the second elastic members 540 may connect the first support member 522 and the second support member 524 in a direction substantially parallel to the central axis CA of the optical member 520. For example, the second elastic members 540 may be connected, at the opposite ends thereof, to the first support member 522 and the second support member 524 such that respective center lines of each of the second elastic members 540 are parallel to the central axis CA.

Figure 13A:
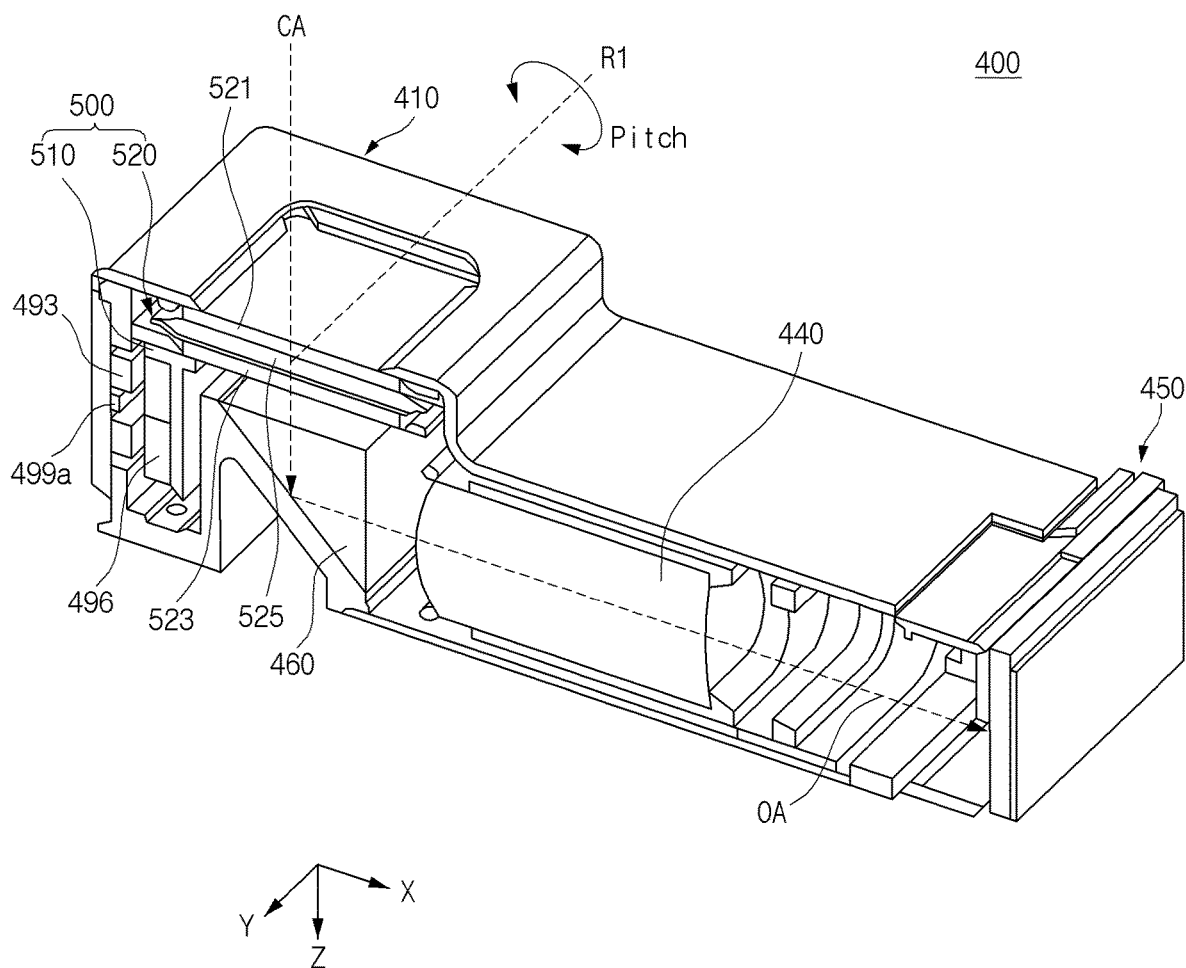
FIG. 13A is a sectional perspective view of the camera module according to an embodiment.
Figure 13B:
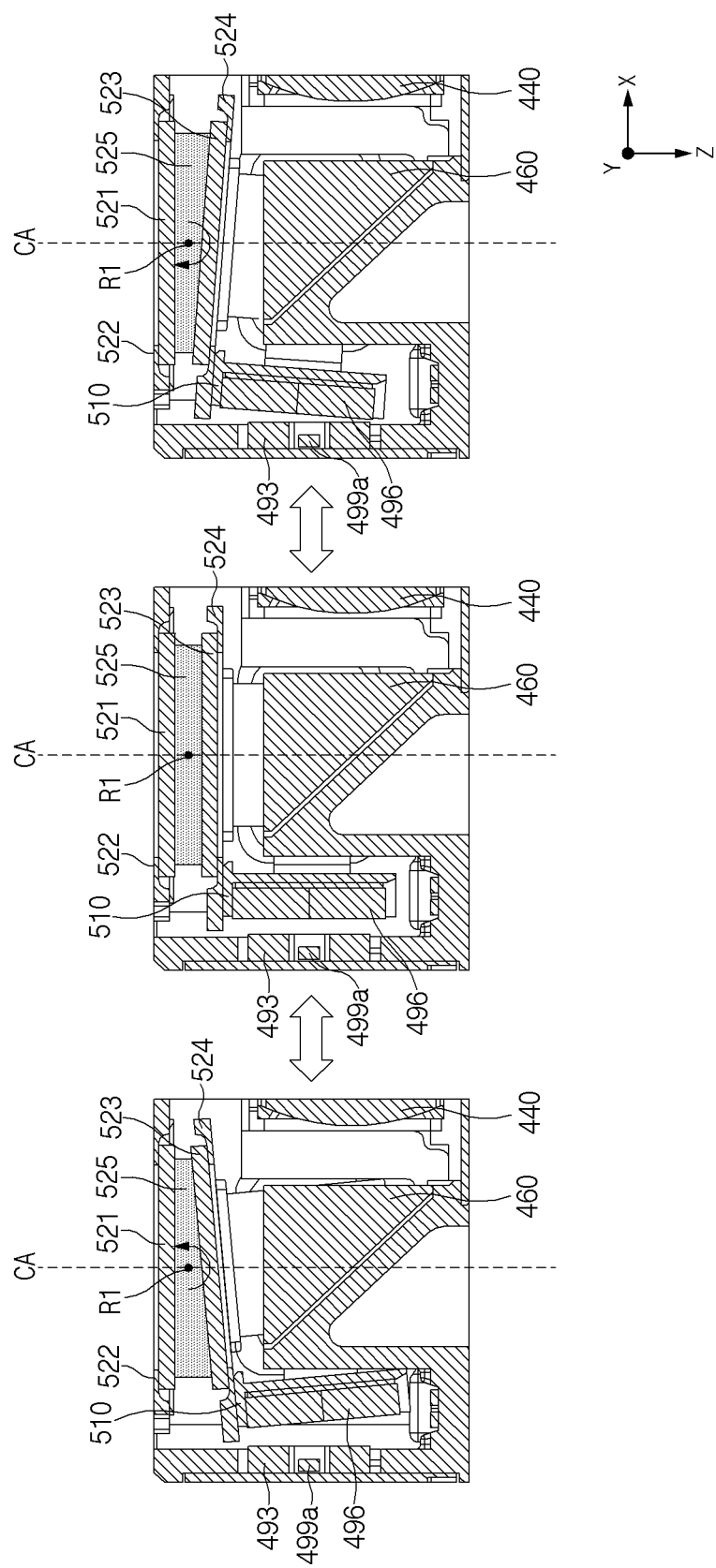
FIG. 13B are views illustrating a pitch tilt motion of the optical image stabilizer assembly of the camera module according to an embodiment.

FIG. 13A is a sectional perspective view of the camera module according to an embodiment. FIG. 13B illustrates a pitch tilt motion of the optical image stabilizer assembly of the camera module according to an embodiment.

FIGS. 13A and 13B may be views illustrating an x-z cross-section of the camera module 400 illustrated in FIG. 4.

Referring to FIGS. 13A and 13B, the camera module 400 according to an embodiment may include the camera housing 410, the lens assembly 440, the sensor assembly 450, the reflective member 460, the first magnet 496, the first coil 493, and the optical image stabilizer assembly 500.

In an embodiment, the optical image stabilizer assembly 500 may be configured to change the path of external light travelling toward the reflective member 460 as the second light transmitting member 523 rotates about the first axis of rotation R1 relative to the first light transmitting member 521. The first axis of rotation R1 may be perpendicular to the central axis CA of the optical member 520. For example, after the external light is redirected by the pitch tilt motion of the optical image stabilizer assembly 500, the external light may be incident on the reflective member 460, may be reflected in a direction substantially perpendicular to the incident direction by the reflective member 460, and may travel toward the lens assembly 440 and the sensor assembly 450 (e.g., the image sensor).

In an embodiment, the first magnet 496 and the first coil 493 may be configured to rotate the moving part (e.g., the holder 510, the second light transmitting member 523, and the second support member 524) of the optical image stabilizer assembly 500 about the first axis of rotation R1. For example, the first magnet 496 may be coupled to the holder 510, and the holder 510 may rotate about the first axis of rotation R1 together with the second support member 524 (or the second light transmitting member 523) as the first magnet 496 is moved by interaction with the first coil 493.

In an embodiment, the camera module 400 may rotate the holder 510 about the first axis of rotation R1 through control of a current applied to the first coil 493. The first coil 493 and the first magnet 496 may electromagnetically interact with each other. For example, the first coil 493 may be located in a magnetic field formed by the first magnet 496. The processor (e.g., the processor 120 of FIG. 1) may control the direction and/or strength of the current passing through the first coil 493. An electromagnetic force (e.g., Lorentz force) may be applied to the first magnet 496 in a predetermined direction (e.g., a direction parallel to the central axis CA) to correspond to the direction of the current passing through the first coils 493.

In an embodiment, the holder 510 may be rotated about the first axis of rotation R1 by the Lorentz force applied to the first magnet 496. For example, the first magnet 496 may be moved upward by the Lorentz force facing upward (e.g., the −z-axis direction) based on FIG. 13B. When the first magnet 496 is moved upward, the holder 510 may rotate about the first axis of rotation R1 in the clockwise direction. In contrast, the first magnet 496 may be moved downward by the Lorentz force facing downward (e.g., the +z-axis direction) based on FIG. 13B. When the first magnet 496 is moved downward, the holder 510 may rotate about the first axis of rotation R1 in the counterclockwise direction.

In an embodiment, the optical member 520 may be configured such that the second light transmitting member 523 (or the second support member 524) is inclined at a predetermined angle with respect to the first light transmitting member 521 (or the first support member 522) as the holder 510 rotates about the first axis of rotation R1. The sealing member 525 may elastically support the second light transmitting member 523 with respect to the first light transmitting member 521 during the pitch tilt of the second light transmitting member 523.

In an embodiment, the sealing member 525 may be disposed between the first light transmitting member 521 and the second light transmitting member 523 and may be deformed depending on the angle formed by the first light transmitting member 521 and the second light transmitting member 523. For example, as the second light transmitting member 523 rotates about the first axis of rotation R1 in the clockwise direction together with the holder 510 as illustrated in FIG. 13B, a left portion of the sealing member 525 with respect to the central axis CA may be compressed, and a right portion of the sealing member 525 with respect to the central axis CA may be expanded. Furthermore, as the second light transmitting member 523 rotates about the first axis of rotation R1 in the counterclockwise direction together with the holder 510, the left portion of the sealing member 525 with respect to the central axis CA may be expanded, and the right portion of the sealing member 525 with respect to the central axis CA may be compressed. The sealing member 525 may be deformed while the second light transmitting member 523 is pitch-tilted at a predetermined angle with respect to the first light transmitting member 521, and the optical member 520 may change a light path accordingly.

In an embodiment, the camera module 400 may include a first sensor 499a for sensing the relative positions of the first magnet 496 and the first coil 493. The first sensor 499a may include or be provided as a Hall sensor that senses the intensity and/or direction of a magnetic field. The first sensor 499a may be located in or proximate to the first coil 493 to face the first magnet 496. Although not illustrated, the first sensor 499a may be disposed on the circuit board (e.g., the circuit board 470 of FIG. 6) together with the first coil 493 and may be electrically connected with the circuit board 470.

In an embodiment, the reference position of the first magnet 496 may be stored in memory (e.g., the memory 130 of FIG. 1). When the position of the first magnet 496 sensed by the first sensor 499a differs from the reference position, the current applied to the first coil 493 (e.g., the amount of the current and the direction of the current) may be controlled such that the sensed position coincides with the reference position. For example, when a current is applied again in the state in which no current is applied to the first coil 493, the above-described control may be performed to locate or re-locate the holder 510 in a correct position.

Figure 14A:
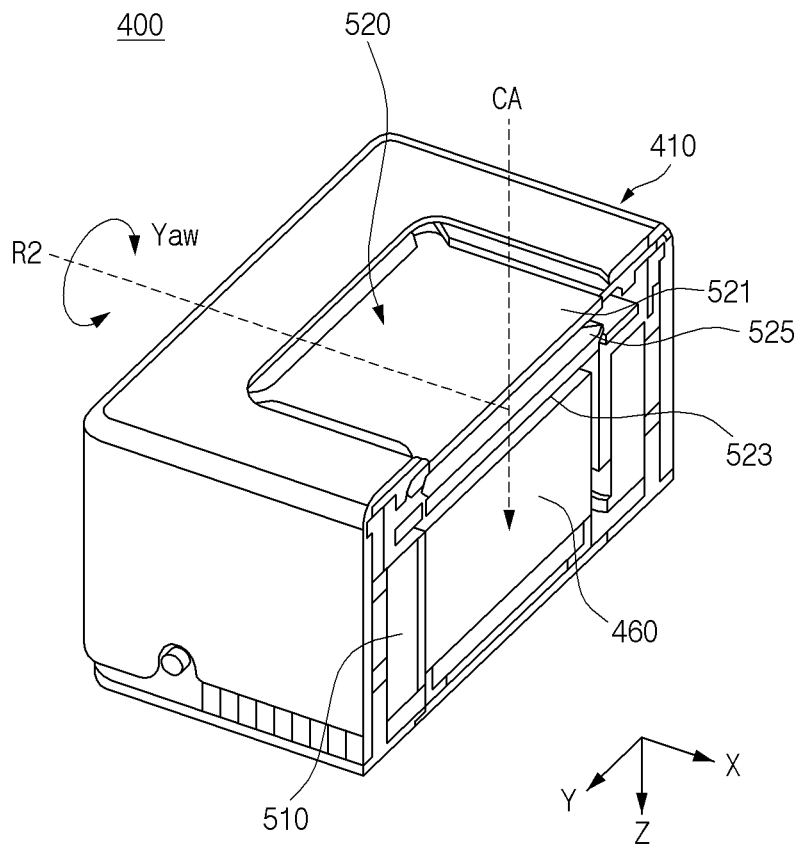
FIG. 14A is a sectional perspective view of the camera module according to an embodiment.
Figure 14B:
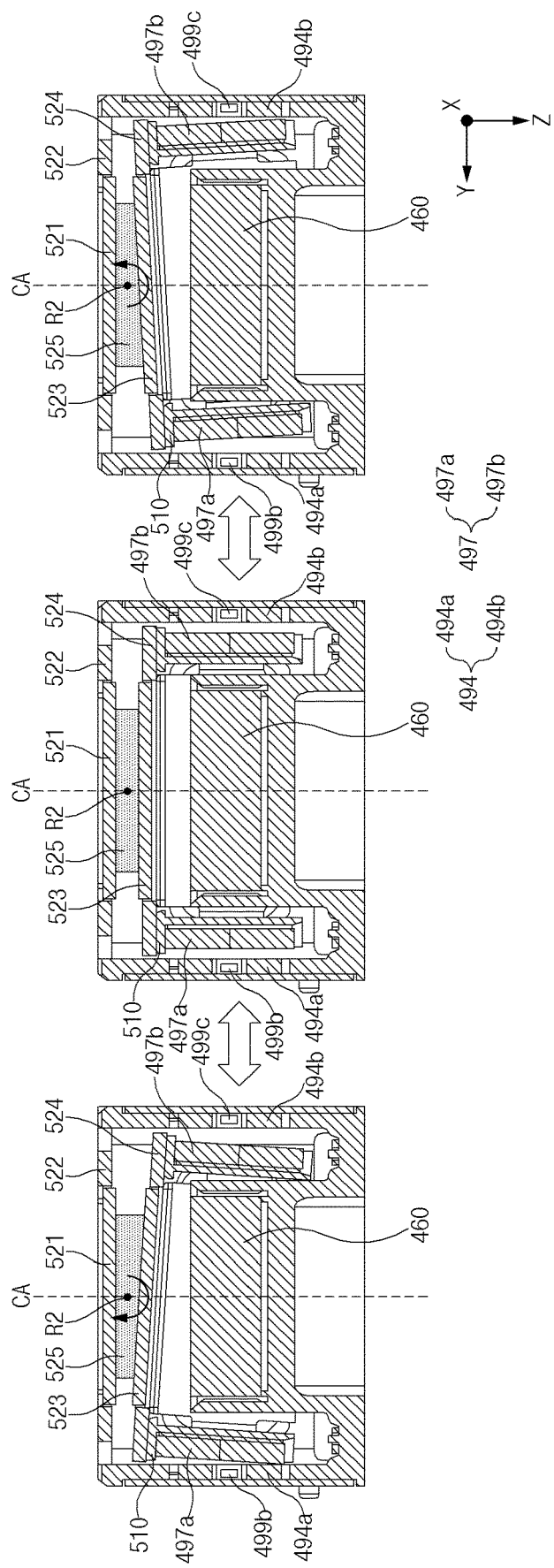
FIG. 14B are views illustrating a yaw tilt motion of the optical image stabilizer assembly of the camera module according to an embodiment.

FIG. 14A is a sectional perspective view of the camera module according to an embodiment. FIG. 14B illustrates a yaw tilt motion of the optical image stabilizer assembly of the camera module according to an embodiment.

FIGS. 14A and 14B may be views illustrating a y-z cross-section of the camera module 400 illustrated in FIG. 4.

Referring to FIGS. 14A and 14B, the camera module 400 according to an embodiment may include the camera housing 410, the lens assembly 440, the sensor assembly 450, the reflective member 460, the second magnets 497, the second coils 494, and the optical image stabilizer assembly 500.

In an embodiment, the optical image stabilizer assembly 500 may be disposed and configured to change the path of external light travelling toward the reflective member 460 as the second light transmitting member 523 rotates about the second axis of rotation R2 relative to the first light transmitting member 521. The second axis of rotation R2 may be perpendicular to the central axis CA of the optical member 520. For example, the external light may be incident on the reflective member 460 after being redirected by the yaw tilt motion of the optical image stabilizer assembly 500.

In an embodiment, the second magnets 497 and the second coils 494 may be configured to rotate the moving part (e.g., the holder 510, the second light transmitting member 523, and the second support member 524) of the optical image stabilizer assembly 500 about the second axis of rotation R2. For example, the second magnets 497 may be coupled to the holder 510, and the holder 510 may rotate about the second axis of rotation R2 together with the second support member 524 (or the second light transmitting member 523) as the second magnets 497 are moved by interaction with the second coils 494.

In an embodiment, the second magnets 497 may include the first sub magnet 497a located on one side (e.g., in the +y-axis direction) with respect to the central axis CA and the second sub magnet 497b located on an opposite side (e.g., in the −y-axis direction) with respect to the central axis CA. The second coils 494 may include the first sub coil 494a facing the first sub magnet 497a and the second sub coil 494b facing the second sub magnet 497b.

In an embodiment, the camera module 400 may rotate the holder 510 about the second axis of rotation R2 through control of currents applied to the second coils 494. The second coils 494 and the second magnets 497 may electromagnetically interact with each other. For example, the second coils 494 may be located in or proximate to magnetic fields formed by the second magnets 497. The processor (e.g., the processor 120 of FIG. 1) may control the directions and/or strengths of the currents passing through the second coils 494. Electromagnetic forces (e.g., Lorentz forces) may be applied to the second magnets 497 in predetermined directions (e.g., directions parallel to the central axis CA) to correspond to the directions of the currents passing through the second coils 494.

In an embodiment, the holder 510 may be rotated about the second axis of rotation R2 by the Lorentz forces applied to the second magnets 497. For example, the first sub magnet 497a may be moved downward by the Lorentz force facing downward (e.g., the +z-axis direction) based on FIG. 14B, and the second sub magnet 497b may be moved upward by the Lorentz force facing upward (e.g., the −z-axis direction) based on FIG. 14B. When the first sub magnet 497a is moved downward and the second sub magnet 497b is moved upward, the holder 510 may be rotated about the second axis of rotation R2 in the counterclockwise direction. Furthermore, the first sub magnet 497a may be moved upward by the Lorentz force facing upward (e.g., the −z-axis direction) based on FIG. 14B, and the second sub magnet 497b may be moved downward by the Lorentz force facing downward (e.g., the +z-axis direction) based on FIG. 14B. When the first sub magnet 497a is moved upward and the second sub magnet 497b is moved downward, the holder 510 may be rotated about the second axis of rotation R2 in the clockwise direction.

In an embodiment, the optical member 520 may be configured such that the second light transmitting member 523 (or the second support member 524) is inclined at a predetermined angle with respect to the first light transmitting member 521 (or the first support member 522) as the holder 510 rotates about the second axis of rotation R2. The sealing member 525 may elastically support the second light transmitting member 523 with respect to the first light transmitting member 521 during the yaw tilt of the second light transmitting member 523.

In an embodiment, the sealing member 525 may be disposed between the first light transmitting member 521 and the second light transmitting member 523 and may be deformed depending on the angle formed by the first light transmitting member 521 and the second light transmitting member 523. For example, as the second light transmitting member 523 rotates about the second axis of rotation R2 in the clockwise direction together with the holder 510 as illustrated in FIG. 14B, the left portion of the sealing member 525 with respect to the central axis CA may be compressed, and the right portion of the sealing member 525 with respect to the central axis CA may be expanded. In contrast, as the second light transmitting member 523 rotates about the second axis of rotation R2 in the counterclockwise direction together with the holder 510, the left portion of the sealing member 525 with respect to the central axis CA may be expanded, and the right portion of the sealing member 525 with respect to the central axis CA may be compressed. The sealing member 525 may be deformed while the second light transmitting member 523 is yaw-tilted at a predetermined angle with respect to the first light transmitting member 521, and the optical member 520 may change a light path accordingly.

In an embodiment, the camera module 400 may include second sensors 499b and 499c for sensing the relative positions of the second magnets 497 and the second coils 494. The second sensors 499b and 499c may include or be provided as a Hall sensor that senses the intensity and/or direction of a magnetic field. The second sensors 499b and 499c may be located in or proximate to the second coils 494 to face the second magnets 497. Although not illustrated, the second sensors 499b and 499c may be disposed on the circuit board (e.g., the circuit board 470 of FIG. 6) together with the second coils 494 and may be electrically connected with the circuit board 470.

In an embodiment, as many second sensors 499b and 499c as the second magnets 497 or the second coils 494 may be provided. The second sensors 499b and 499c may include a first sub sensor 499b corresponding to the first sub magnet 497a and the first sub coil 494a and a second sub sensor 499c corresponding to the second sub magnet 497b and the second sub coil 494b. For example, the first sub sensor 499b may sense a change in position between the first sub magnet 497a and the first sub coil 494a, and the second sub sensor 499c may sense a change in position between the second sub magnet 497b and the second sub coil 494b. According to various embodiments, sensing values sensed by the first sub sensor 499b and the second sub sensor 499c may be summed or added up for accurate position detection and/or precise control.

In an embodiment, the reference positions of the second magnets 497 may be stored in memory (e.g., the memory 130 of FIG. 1). When the positions of the second magnets 497 sensed by the second sensors 499b and 499c differ from the reference positions, the currents applied to the second coils 494 (e.g., the amounts of the currents and the directions of the currents) may be controlled such that the sensed positions coincide with the reference positions. For example, when currents are applied again in the state in which no currents are applied to the second coils 494, the above-described control may be performed to locate or re-locate the holder 510 in a correct position.

Figure 15:
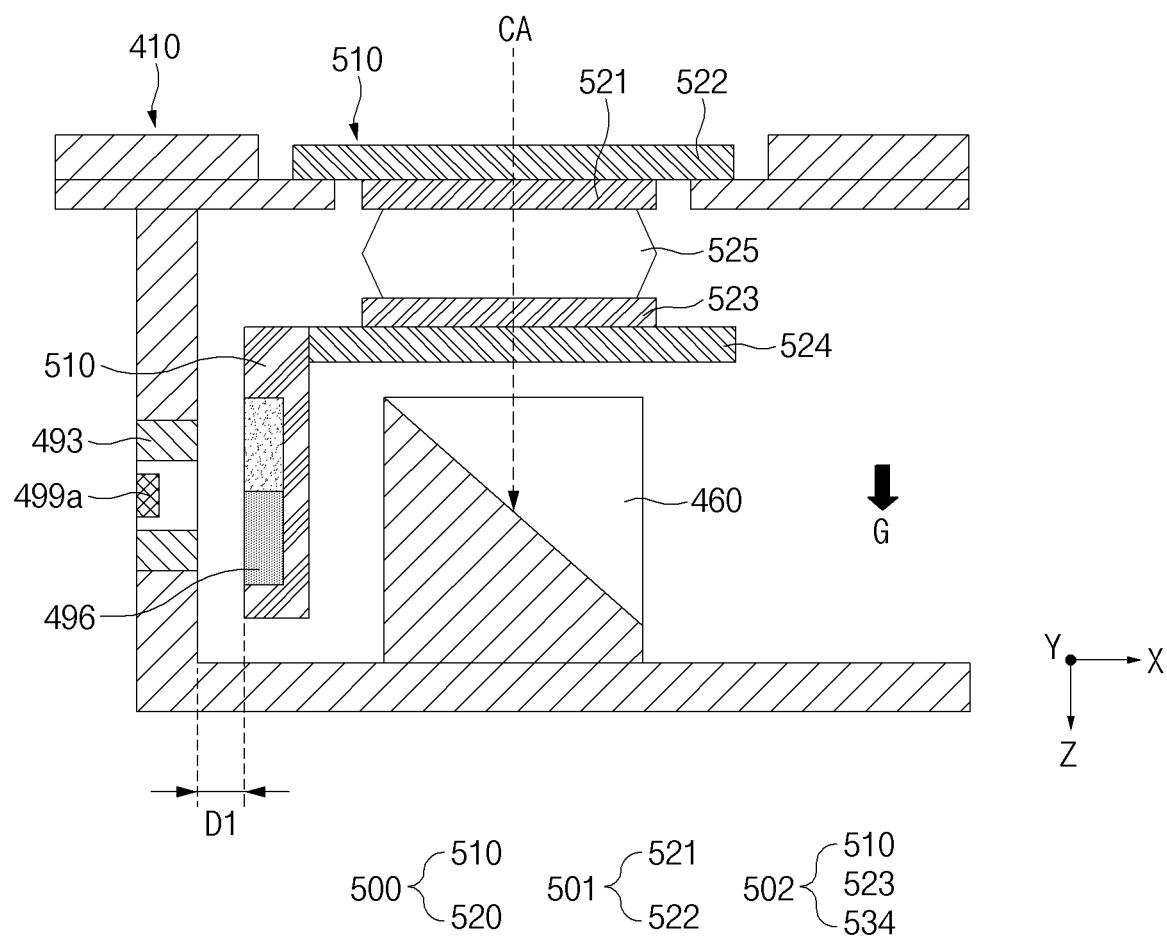
FIG. 15 is a schematic sectional view of the camera module according to an embodiment.
Figure 16:
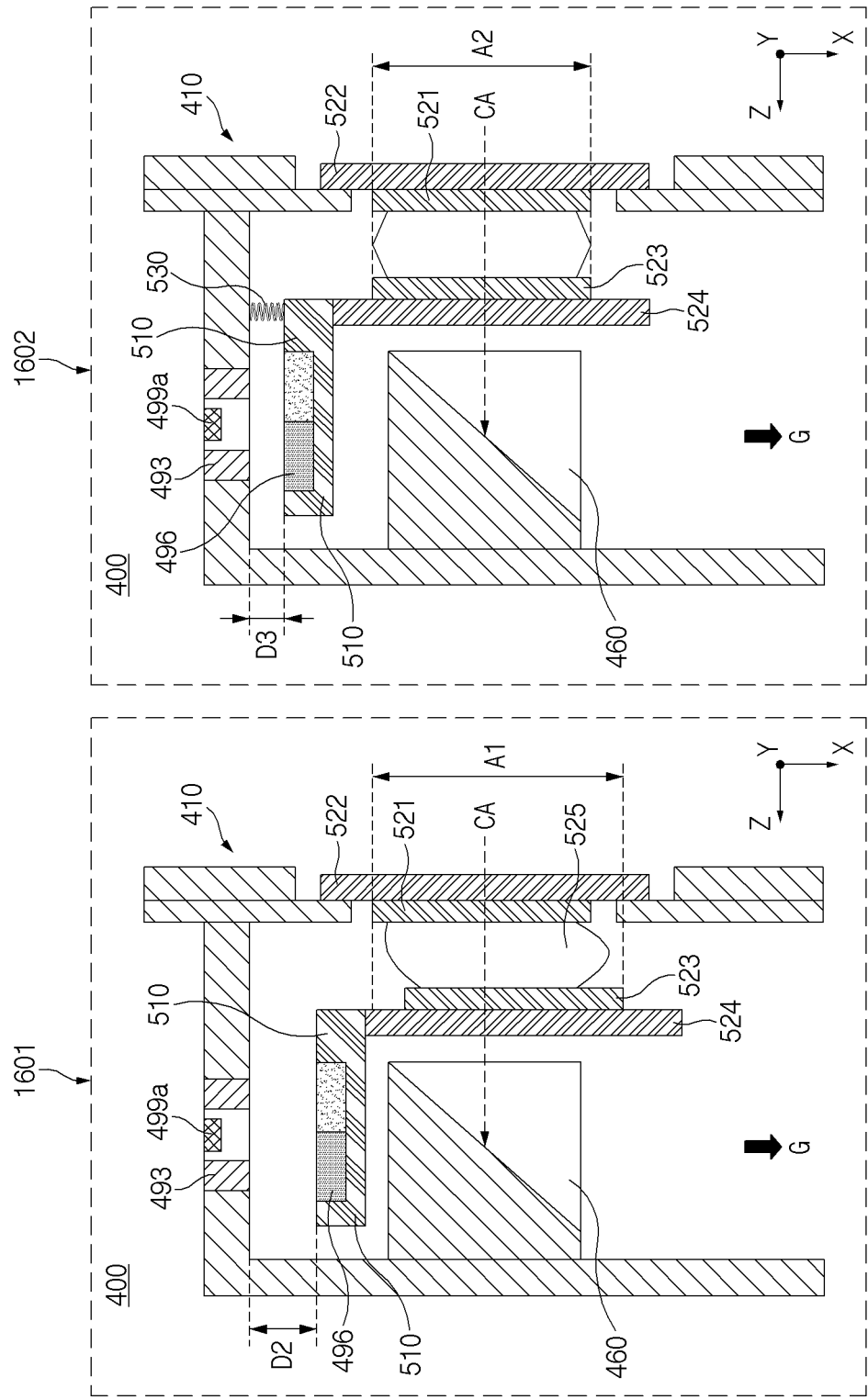
FIG. 16 are schematic sectional views of the camera module according to an embodiment.

FIG. 15 is a schematic sectional view of the camera module according to an embodiment. FIG. 16 is a schematic sectional view of the camera module according to an embodiment.

FIGS. 15 and 16 may be schematic sectional views of the camera module illustrated in FIGS. 13A and 13B.

Referring to FIGS. 15 and 16, the camera module 400 according to an embodiment may include the camera housing 410, the reflective member 460, a drive member (e.g., the first magnet 496 and the first coil 493), and the optical image stabilizer assembly 500.

The camera module 400 of FIG. 15 may have a posture in which the gravity acting on the camera module 400 faces a direction parallel to the central axis CA of the optical member 520, and the camera module 400 of FIG. 16 may have a posture in which the gravity acting on the camera module 400 is not parallel to the central axis CA of the optical member 520. For example, FIG. 15 may be referred to as a state in which the electronic device 300 including the camera module 400 is placed on a flat surface. For example, FIG. 16 may be referred to as a state in which the electronic device 300 including the camera module 400 is in an upright position such that the gravity G acting on the camera module 400 and the central axis CA of the optical member 520 are substantially perpendicular to each other.

In an embodiment, a position change may occur in the optical image stabilizer assembly 500 irrespective of an OIS operation depending on the posture (position) of the camera module 400 (or the electronic device 300 including the camera module 400). For example, the moving part 502 may be elastically connected to the fixed part 501 by the sealing member 525 in the state in which the fixed part 501 is fixed to the camera housing 410, and therefore a position change may occur in the optical image stabilizer assembly 500 while the sealing member 525 is deformed by the gravity G depending on the posture of the camera module 400.

In an embodiment, the moving part 502 may be elastically restrained to the camera housing 410 or the fixed part 501 through the elastic members 530, and thus the optical image stabilizer assembly 500 may limit a change in the relative positions of the moving part 502 and the fixed part 501 due to a change in the posture of the camera module 400 in a predetermined range. For example, 1601 of FIG. 16 illustrates a comparative example not including the elastic members 530, and 1602 of FIG. 16 illustrates an embodiment of the disclosure including the elastic members 530. The elastic members 530 may be understood as including the first elastic members 530 and the second elastic members 540 described above.

When the state in which the central axis CA and the gravity G are parallel to each other as illustrated in FIG. 15 is assumed to be a default state, the sealing member 525 may connect the first transmitting member 521 and the second light transmitting member 523 without sagging or deforming in a direction perpendicular to the central axis CA due to the gravity G in the default state. In the state in which the central axis CA and the gravity G are parallel to each other, the first magnet 496 and the first coil 493 may be spaced apart from each other by a first distance D1.

When the posture of the camera module 400 is changed such that the central axis CA and the gravity G are perpendicular to each other as illustrated in 1601 of FIG. 16, the sealing member 525 may be deformed while sagging in a direction perpendicular to the central axis CA due to the gravity G. As the sealing member 525 sags, the second light transmitting member 523 and the second support member 524 may move relative to the first light transmitting member 521 and the first support member 522 in one direction (e.g., the x-axis direction) perpendicular to the central axis CA. Due to this, the size of the camera module 400 may be increased while the size of an opening A1 for receiving light is also increased. Furthermore, as the sealing member 525 sags, the first magnet 496 and the second coil 493 may be spaced apart from each other by a second distance D2 greater than the first distance D1 irrespective of an OIS operation, and the gap may be changed in an unintended direction. Due to this, the gap between the first sensor 499a and the first magnet 496 may be changed, and an error may occur in sensing.

As illustrated in 1602 of FIG. 16, the moving part 502 may be elastically supported on the camera housing 410 by the elastic members 530, and thus the camera module 400 according to an embodiment of the disclosure may prevent the sealing member 525 from sagging and may limit a change in position between the moving part 502 and the fixed part 501. Accordingly, even when the posture of the camera module 400 is changed from the default state, the first magnet 496 and the first coil 493 may remain spaced apart from each other by a third distance D3 substantially the same as, or similar to, the first distance D1 in the default state, and the size of an opening A2 may be relatively reduced because the first light transmitting member 521 and the second light transmitting member 523 are not out of alignment.

According to an embodiment of the disclosure, precise sensing and/or OIS control may be performed by reducing a position error depending on a posture change. Furthermore, the overall size of the camera module 400 may be reduced by decreasing the size of an opening. Moreover, an external impact may be alleviated or absorbed by the elastic members 530. In addition, by adjusting the spring constant value of the elastic members 530 in consideration of a driving force for an OIS operation and the amount of deflection of the sealing member 525, design suitable for various conditions may be possible.

Figure 17A:
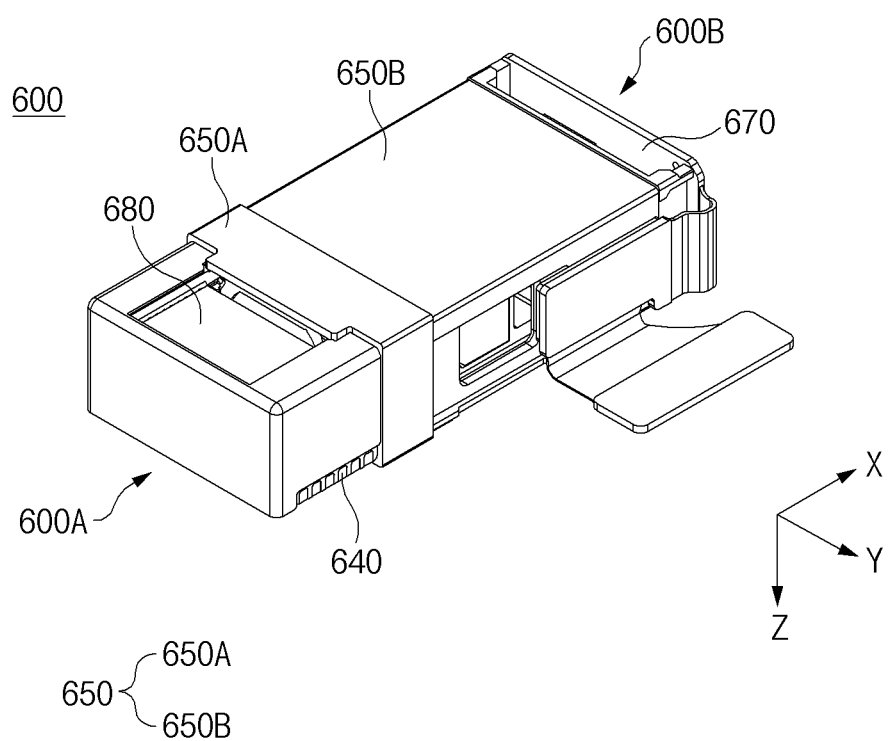
FIG. 17A is a perspective view of a camera module according to an embodiment.
Figure 17B:
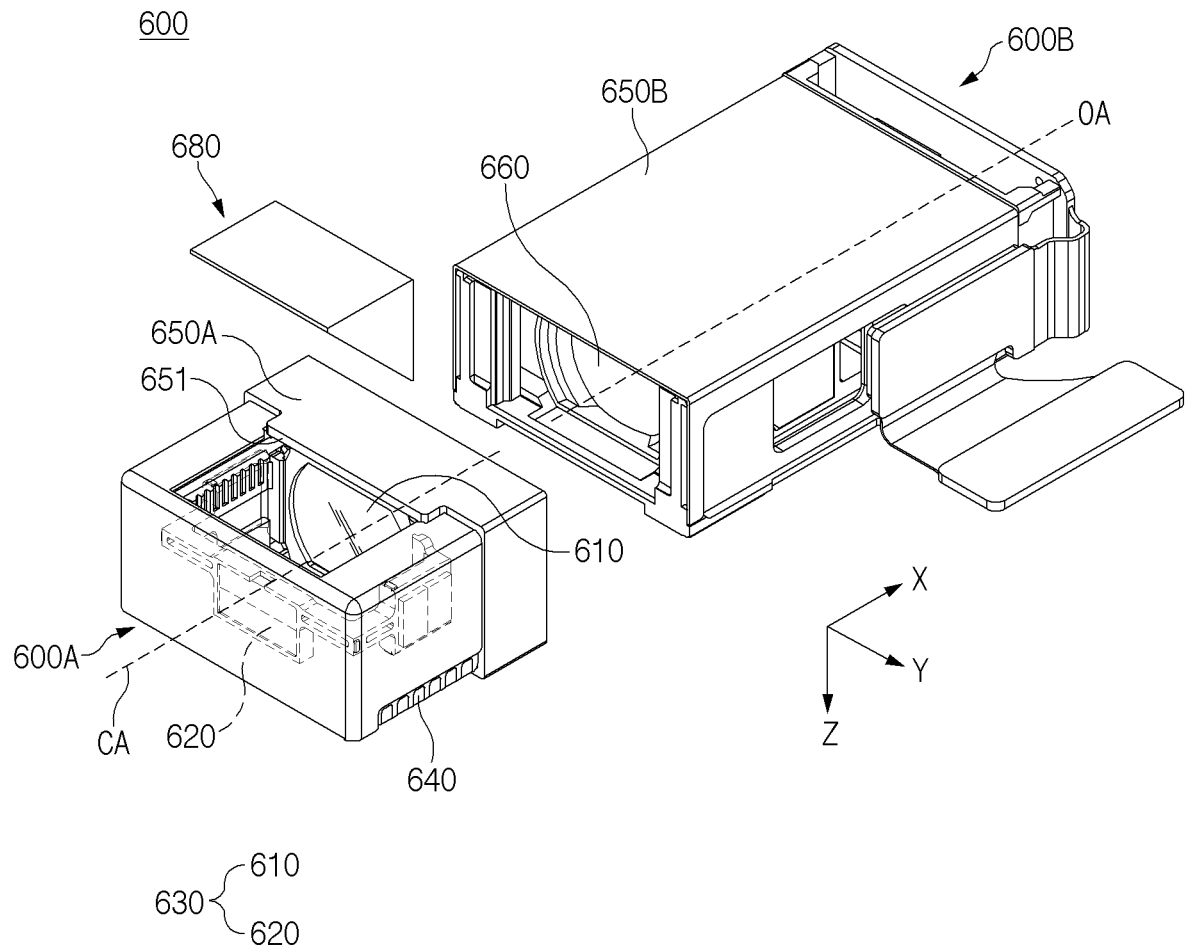
FIG. 17B is an exploded perspective view of the camera module according to an embodiment.
Figure 17C:
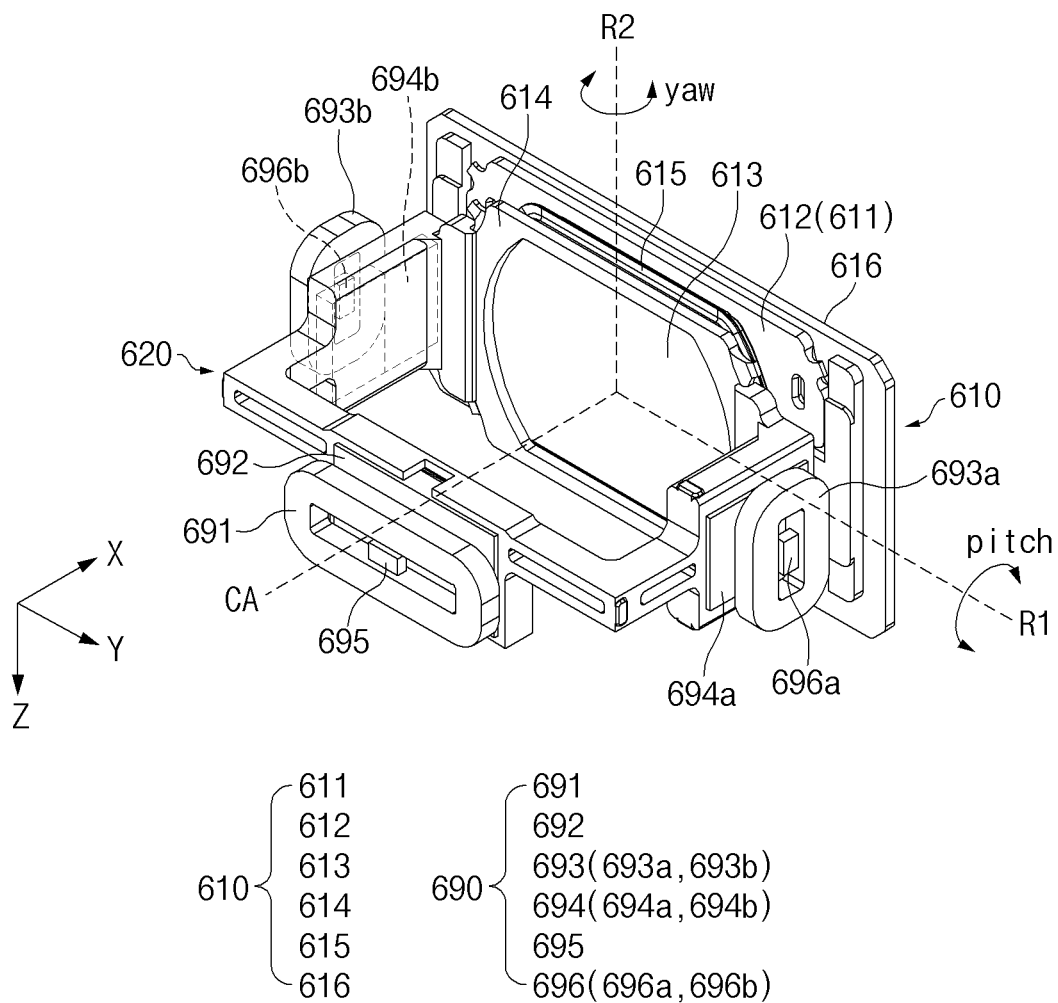
FIG. 17C is a perspective view illustrating an optical image stabilizer assembly of the camera module according to an embodiment.

FIG. 17A is a perspective view of a camera module according to an embodiment. FIG. 17B is an exploded perspective view of the camera module according to an embodiment. FIG. 17C illustrates an optical image stabilizer assembly of the camera module according to an embodiment.

Referring to FIGS. 17A to 17C, the camera module 600 according to an embodiment may include a camera housing 650 (e.g., the camera housing 410 of FIGS. 4 to 6), a lens assembly 660 (e.g., the lens assembly 440 of FIGS. 4 to 6), a reflective member 680 (e.g., the reflective member 460 of FIGS. 4 to 6), a sensor assembly 670 (e.g., the sensor assembly 450 of FIGS. 4 to 6), the optical image stabilizer assembly 630 (e.g., the optical image stabilizer assembly 500 of FIGS. 4 to 6), a drive member 690 (e.g., the first drive member 491 of FIGS. 4 to 6), and a circuit board 640 (e.g., the circuit board 470 of FIGS. 4 to 6).

The camera module 600 of FIGS. 17A to 17C may have a different structure from the camera module 400 described above with reference to FIGS. 4 to 6. For example, the camera module 400 of FIGS. 4 to 6 may be configured to have a path along which external light sequentially passes through the optical image stabilizer assembly 500 (e.g., the optical member 520), the reflective member 460, and the lens assembly 440, whereas the camera module 600 of FIGS. 17A to 17C may be configured to have a path along which external light sequentially passes through the reflective member 680, the optical image stabilizer assembly 630 (e.g., an optical member 610), and the lens assembly 660.

In an embodiment, the camera module 600 may include a first assembly 600A and a second assembly 600B. For example, the camera module 600 may be understood as an assembly in which the first assembly 600A and the second assembly 600B are assembled. The first assembly 600A may include a first housing 650A, the optical image stabilizer assembly 630, the reflective member 680, the drive member 690, and the circuit board 640. The second assembly 600B may include a second housing 650B, the lens assembly 660, and the sensor assembly 670. The first housing 650A and the second housing 650B may be configured to be coupled with each other. For example, the first housing 650A and the second housing 650B may be coupled with each other to form the camera housing 650.

In an embodiment, as the first assembly 600A for optical image stabilization is configured to be coupled with the separate second assembly 600B for optical zoom and/or auto focus, the first assembly 600A of a predetermined type may be applied to the second assembly 600B of various types.

In an embodiment, the first housing 650A may include a light receiving area 651 through which the reflective member 680 receives light. For example, the light receiving area 651 for allowing incidence of light to the reflective member 680 may be formed in the surface facing the −z-axis direction among surfaces of the first housing 650A. The reflective member 680, the optical image stabilizer assembly 630, the circuit board 640, and the drive member 690 may be disposed in the first housing 650A.

In an embodiment, the optical image stabilizer assembly 630 may include the optical member 610 (e.g., the optical member 520 of FIGS. 8A and 8B) configured to refract light and a holder 620 (e.g., the holder 510 of FIGS. 8A and 8B) to which the optical member 610 is coupled. The optical image stabilizer assembly 630 may be configured such that the optical member 610 is located between the reflective member 680 and the lens assembly 660. For example, the optical member 610 may be disposed to face one surface (e.g., the surface facing the +x-axis direction) of the reflective member 680 that faces toward the lens assembly 660. The central axis CA of the optical member 610 and the optical axis OA of a lens may be substantially parallel to each other. For example, the central axis CA and the optical axis OA may overlap each other to be located on substantially the same line. The optical axis OA may pass through the optical member 610 and the reflective member 680.

In an embodiment, the optical image stabilizer assembly 630 may be configured such that a portion of the optical member 610 is fixed to the camera housing 650 and the rest is movable in the camera housing 650. The optical member 610 may include a first light transmitting member 611 (e.g., the first light transmitting member 521 of FIGS. 7A to 7C), a first support member 612 (e.g., the first support member 522 of FIGS. 7A to 7C), a second light transmitting member 613 (e.g., the second light transmitting member 523 of FIGS. 7A to 7C), a second support member 614 (e.g., the second support member 524 of FIGS. 7A to 7C), a sealing member 615 (e.g., the sealing member 525 of FIGS. 7A to 7C), and a third support member 616. The first support member 612 may be fixed to the third support member 616, and the third support member 616 may be fixed to the camera housing 650 (e.g., the first housing 650A). For example, the third support member 616 may be referred to as a fixed bracket. According to various embodiments, the third support member 616 may be integrally formed with the first support member 612, or may be omitted.

In an embodiment, a moving part (e.g., the holder 620, the second light transmitting member 613, and the second support member 614) may be rotated about a first axis of rotation R1 or a second axis of rotation R2 relative to a fixed part (e.g., the first light transmitting member 611, the first support member 612, and the third support member 616) by a driving force of the drive member 690, and thus the optical image stabilizer assembly 630 may change the path of light that is output from the reflective member 680 and travels toward the lens assembly 660.

In an embodiment, the optical image stabilizer assembly 630 may include elastic members (e.g., the elastic members 530 and 540 of FIGS. 9A to 12C) that elastically connect the moving part to the camera housing 650 (e.g., the first housing 650A) or the fixed part. Although not illustrated, the elastic members may provide a function of elastically restraining at least one of the holder 620 or the second support member 614 to at least one of the first housing 650A, the first support member 612, or the third support member 616. For example, the holder 620 or the second support member 614 may be elastically supported on the first housing 650A through first elastic members (e.g., the first elastic members 530 of FIGS. 9A to 11). The holder 620 or the second support member 614 may be elastically supported on the first support member 612 or the third support member 616 through second elastic members (e.g., the second elastic members 540 of FIGS. 12A to 12C). The properties, types, numbers, positions, or connecting structures of the elastic members may be the same as the contents described above with reference to FIGS. 9A to 12C.

In an embodiment, the drive member 690 may be configured to rotate a part of the optical image stabilizer assembly 630 about at least one axis of rotation perpendicular to the central axis CA of the optical member 610 (e.g., an axis parallel to the optical axis OA or the x-axis). The drive member 690 may include a first coil 691, a first magnet 692, second coils 693, and second magnets 694. The first coil 691 and the second coils 693 may be disposed on the circuit board 640 fixed to the first housing 650A. The first magnet 692 and the second magnets 694 may be disposed on the holder 620 movable relative to the first housing 650A. However, this is illustrative, and the positions of the coils 691 and 693 and the positions of the magnets 692 and 694 may be interchanged with each other.

In an embodiment, the first coil 691 and the first magnet 692 may be configured to electromagnetically interact with each other to rotate the holder 620 about the first axis of rotation R1. For example, the first magnet 692 may be coupled to the holder 620, and the holder 620 may rotate (e.g., pitch tilt) about the first axis of rotation R1 together with the second support member 614 (or the second light transmitting member 613) as the first magnet 692 is moved by interaction with the first coil 691.

In an embodiment, the first magnet 692 may be formed to be polarized in a direction perpendicular to the central axis CA. For example, the first magnet 692 may be formed such that an N-pole portion and an S-pole portion are arranged in the direction perpendicular to the central axis CA. For example, the boundary line between the N-pole portion and the S-pole portion of the first magnet 692 may be substantially parallel to the first axis of rotation R1.

In an embodiment, the camera module 600 may include a first sensor 695 for sensing the relative positions of the first magnet 692 and the first coil 691. The first sensor 695 may include a Hall sensor that senses the intensity and/or direction of a magnetic field. The first sensor 695 may be located in the first coil 692 to face the first magnet 692. Although not illustrated, the first sensor 695 may be disposed on the circuit board 640 together with the first coil 691 and may be electrically connected with the circuit board 640.

In an embodiment, the second coils 693 and the second magnets 694 may be configured to electromagnetically interact with each other to rotate the holder 620 about the second axis of rotation R2. For example, the second magnets 694 may be coupled to the holder 620, and the holder 620 may rotate (e.g., yaw tilt) about the second axis of rotation R2 together with the second support member 614 (or the second light transmitting member 613) as the second magnets 694 are moved by interaction with the second coils 693.

In an embodiment, the second magnets 694 may be formed to be polarized in a direction parallel to the central axis CA. For example, each of the second magnets 694 may be formed such that an N-pole portion and an S-pole portion are arranged in the direction of the central axis CA. For example, the boundary line between the N-pole portion and the S-pole portion of the second magnet 694 may be substantially parallel to the second axis of rotation R2.

In an embodiment, the second magnets 694 may include a first sub magnet 694a located on one side (e.g., in the +y-axis direction) with respect to the central axis CA and a second sub magnet 694b located on an opposite side (e.g., in the −y-axis direction) with respect to the central axis CA. The second coils 693 may include a first sub coil 693a facing the first sub magnet 694a and a second sub coil 693b facing the second sub magnet 694b.

In an embodiment, the camera module 600 may include second sensors 696 for sensing the relative positions of the second magnets 694 and the second coils 693. The second sensors 696 may include a Hall sensor that senses the intensity and/or direction of a magnetic field. The second sensors 696 may be located in the second coils 693 to face the second magnets 694. Although not illustrated, the second sensors 696 may be disposed on the circuit board 640 together with the second coils 693 and may be electrically connected with the circuit board 640.

In an embodiment, as many second sensors 696 as the second magnets 694 or the second coils 693 may be provided. The second sensors 696 may include a first sub sensor 696a corresponding to the first sub magnet 694a and the first sub coil 693a and a second sub sensor 696b corresponding to the second sub magnet 694b and the second sub coil 693b. For example, the first sub sensor 696a may sense a change in position between the first sub magnet 694a and the first sub coil 693a, and the second sub sensor 696b may sense a change in position between the second sub magnet 694b and the second sub coil 693b. According to various embodiments, sensing values sensed by the first sub sensor 696a and the second sub sensor 696b may be added up for accurate position detection and/or precise control.

A camera module 400 according to an embodiment of the disclosure may include a camera housing 410, a lens assembly 440 disposed in the camera housing, and an optical image stabilizer assembly 500 that partially changes a path of light travelling toward the lens assembly, at least a portion of the optical image stabilizer assembly being fixed to the camera housing. The optical image stabilizer assembly may include a fixed part 501 that includes a first light transmitting member 521 and that is fixed to the camera housing, a moving part 502 that includes a second light transmitting member 523 and that is disposed to be rotatable relative to the fixed part, a sealing member 525 that is disposed between the first light transmitting member and the second light transmitting member and that elastically connects the second light transmitting member to the first light transmitting member, and an elastic member 530 or 540 that elastically connects the moving part to at least one of the camera housing or the fixed part. The sealing member may have a liquid L accommodated therein and may be configured to be deformed in response to rotation of the moving part relative to the fixed part.

In various embodiments, the moving part may be configured to rotate about a first axis of rotation R1 and a second axis of rotation R2 perpendicular to the first axis of rotation relative to the fixed part, and the first axis of rotation and the second axis of rotation may be perpendicular to a central axis CA of the first light transmitting member.

In various embodiments, the fixed part may further include a first support member 522 that supports the first light transmitting member and that is fixed to the camera housing, and the moving part may further include a second support member 524 that supports the second light transmitting member and a holder 510 coupled to the second support member.

In various embodiments, the elastic member may include a plurality of first elastic members 530 that elastically connect the moving part to the camera housing, and the plurality of first elastic members may be connected, at opposite ends thereof, to the second support member and the camera housing or the holder and the camera housing.

In various embodiments, the plurality of first elastic members may connect the moving part and the camera housing in a direction perpendicular to a central axis of the first light transmitting member.

In various embodiments, the plurality of first elastic members may extend from one side of the camera housing toward the holder or the second support member in the direction perpendicular to the central axis in a state in which the first light transmitting member and the second light transmitting member are disposed parallel to each other.

In various embodiments, the camera housing may include a frame 430 in which at least a portion of the lens assembly and at least a portion of the optical image stabilizer assembly are accommodated. The frame may include a plate 431 and a plurality of sidewalls 432, 433, 434, and 435 that extend from the plate. The optical image stabilizer assembly may be disposed in the frame such that the fixed part is coupled to the plurality of sidewalls and the moving part is surrounded by the plurality of sidewalls.

In various embodiments, the plurality of first elastic members may be disposed between the plurality of sidewalls and the holder or between the plurality of sidewalls and the second support member.

In various embodiments, the plurality of first elastic members may be disposed between the plate and the holder.

In various embodiments, the elastic member may include a plurality of second elastic members 540 that elastically connect the moving part to the fixed part, and the plurality of second elastic members may be connected, at opposite ends thereof, to the first support member and the second support member.

In various embodiments, the first support member may include a plurality of first connecting protrusions 5223, 5224, 5225, and 5226, to each of which one end portion of a corresponding one of the plurality of second elastic members is connected, and the second support member may include a plurality of second connecting protrusions 5243, 5244, 5245, and 5246, to each of which an opposite end portion of a corresponding one of the plurality of second elastic members is connected.

In various embodiments, the plurality of second elastic members may be disposed such that the sum of a plurality of vectors V1, V2, V3, and V4 extending perpendicular to a central axis of the first light transmitting member from one point P on the central axis of the first light transmitting member to center lines of the plurality of second elastic members is 0.

In various embodiments, the elastic member may include a plurality of elastic members, and a vector sum of elastic forces of the plurality of elastic members in directions perpendicular to the central axis may be equal to 0 in a state in which the second light transmitting member is parallel to the first light transmitting member and is placed in a position in which the central axis passes through the center of the second light transmitting member.

In various embodiments, the camera module may further include a reflective member 460 disposed to be at least partially surrounded by the optical image stabilizer assembly and fixed to the camera housing, and at least one surface of the reflective member may partially overlap the first light transmitting member and the second light transmitting member.

In various embodiments, the optical image stabilizer assembly may be configured to change a path of light incident on the reflective member or a path of light output from the reflective member as the second light transmitting member moves relative to the first light transmitting member and the reflective member.

In various embodiments, the camera module may further include a drive member 490 that provides a driving force to rotate the moving part about at least one of the first axis of rotation or the second axis of rotation, and the drive member may include a plurality of coils 493 and 494 disposed on one of the moving part and the camera housing and a plurality of magnets 496 and 497 disposed on the other one of the moving part and the camera housing to face the plurality of coils.

In various embodiments, the moving part may further include a holder 510 that is connected to the second light transmitting member and that has the plurality of magnets disposed thereon. The plurality of magnets may include a first magnet 496 that rotates the holder and the second light transmitting member about the first axis of rotation and a second magnet 497 that rotates the holder and the second light transmitting member about the second axis of rotation. The plurality of coils may include a first coil 493 disposed in the camera housing to face the first magnet and a second coil 494 disposed in the camera housing to face the second magnet.

An electronic device 300 according to an embodiment of the disclosure may include a housing 310 and a camera module 400 that is disposed in the housing and that receives light through a partial area of the housing. The camera module may include a camera housing 410, a lens assembly 440 disposed in the camera housing, and an optical image stabilizer assembly 500 that partially changes a path of light travelling toward the lens assembly, at least a portion of the optical image stabilizer assembly being fixed to the camera housing. The optical image stabilizer assembly may include a fixed part 501 that includes a first light transmitting member 521 and that is fixed to the camera housing, a moving part 502 that includes a second light transmitting member 523 and that is disposed to be rotatable relative to the fixed part, a sealing member 525 that is disposed between the first light transmitting member and the second light transmitting member and that elastically connects the second light transmitting member to the first light transmitting member, and an elastic member 530 or 540 that elastically connects the moving part to at least one of the camera housing or the fixed part. The sealing member may have a liquid L accommodated therein and may be configured to be deformed in response to rotation of the moving part relative to the fixed part. The moving part may be configured to rotate about a first axis of rotation R1 and a second axis of rotation R2 perpendicular to the first axis of rotation relative to the fixed part. The first axis of rotation and the second axis of rotation may be perpendicular to a central axis CA of the first light transmitting member.

In various embodiments, the fixed part may further include a first support member 522 that supports the first light transmitting member and that is fixed to the camera housing. The moving part may further include a second support member 524 that supports the second light transmitting member and a holder 510 coupled to the second support member. The elastic member may include at least one of a plurality of first elastic members 530 that connect the moving part and the camera housing and a plurality of second elastic members 540 that connect the moving part and the fixed part. The plurality of first elastic members may be connected, at opposite ends thereof, to the second support member and the camera housing or the holder and the camera housing. The plurality of second elastic members may be connected, at opposite ends thereof, to the first support member and the second support member.

In various embodiments, the plurality of first elastic members may connect the moving part and the camera housing in a direction perpendicular to the central axis of the first light transmitting member.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A camera module, comprising:
a camera housing;
a lens assembly disposed in the camera housing; and
an optical image stabilizer assembly configured to partially change a path of light travelling toward the lens assembly, at least a portion of the optical image stabilizer assembly being fixed to the camera housing,
wherein the optical image stabilizer assembly includes:
a fixed part fixed to the camera housing and including a first light transmitting member;
a moving part disposed to be rotatable relative to the fixed part and including a second light transmitting member;
a sealing member disposed between the first light transmitting member and the second light transmitting member and configured to elastically connect the second light transmitting member to the first light transmitting member; and
an elastic member configured to elastically connect the moving part to at least one of the camera housing or the fixed part, and
wherein the sealing member has a liquid accommodated therein and is configured to be deformed in response to rotation of the moving part relative to the fixed part,
wherein the fixed part further includes a first support member configured to support the first light transmitting member and fixed to the camera housing.

2. The camera module of claim 1, wherein the moving part is rotatable relative to the fixed part about perpendicular first and second axes, and
wherein the first and second axes are perpendicular to a central axis of the first light transmitting member.

3. The camera module of claim 2, wherein the elastic member includes a plurality of elastic members, and
wherein a vector sum of elastic forces of the plurality of elastic members in directions perpendicular to the central axis is 0 in a state in which the second light transmitting member is parallel to the first light transmitting member and is placed in a position in which the central axis passes through a center of the second light transmitting member.

4. The camera module of claim 2, further comprising:
a drive member configured to rotate the moving part about at least one of the first axis of rotation or the second axis of rotation,
wherein the drive member includes a plurality of coils disposed on one of the moving part and the camera housing and a plurality of magnets disposed on the other one of the moving part and the camera housing to face the plurality of coils.

5. The camera module of claim 4, wherein the moving part further includes a holder connected to the second light transmitting member and having the plurality of magnets disposed thereon,
wherein the plurality of magnets includes a first magnet configured to rotate the holder and the second light transmitting member about the first axis and a second magnet configured to rotate the holder and the second light transmitting member about the second axis, and
wherein the plurality of coils include a first coil disposed in the camera housing to face the first magnet and a second coil disposed in the camera housing to face the second magnet.

6. The camera module of claim 1,
wherein the moving part further includes a second support member configured to support the second light transmitting member and a holder coupled to the second support member.

7. The camera module of claim 6, wherein the elastic member includes a plurality of first elastic members, each of which is configured to elastically connect the moving part to the camera housing, and
wherein the plurality of first elastic members are each connected, at opposite ends thereof, to the second support member and the camera housing or to the holder and the camera housing.

8. The camera module of claim 7, wherein the plurality of first elastic members each connect the moving part and the camera housing in a direction perpendicular to a central axis of the first light transmitting member.

9. The camera module of claim 8, wherein the plurality of first elastic members each extend from one side of the camera housing toward the holder or the second support member in the direction perpendicular to the central axis in a state in which the first light transmitting member and the second light transmitting member are parallel.

10. The camera module of claim 7, wherein the camera housing includes a frame in which at least a portion of the lens assembly and at least a portion of the optical image stabilizer assembly are accommodated,
wherein the frame includes a plate and a plurality of sidewalls configured to extend from the plate, and
wherein the optical image stabilizer assembly is disposed in the frame such that the fixed part is coupled to the plurality of sidewalls and the moving part is surrounded by the plurality of sidewalls.

11. The camera module of claim 10, wherein the plurality of first elastic members are each disposed between the plurality of sidewalls and the holder or between the plurality of sidewalls and the second support member.

12. The camera module of claim 10, wherein the plurality of first elastic members are each disposed between the plate and the holder.

13. The camera module of claim 6, wherein the elastic member includes a plurality of second elastic members, each of which is configured to elastically connect the moving part to the fixed part, and
wherein the plurality of second elastic members are each connected, at opposite ends thereof, to the first support member and the second support member.

14. The camera module of claim 13, wherein the first support member includes a plurality of first connecting protrusions, to each of which one end portion of a corresponding one of the plurality of second elastic members is connected, and
wherein the second support member includes a plurality of second connecting protrusions, to each of which an opposite end portion of a corresponding one of the plurality of second elastic members is connected.

15. The camera module of claim 13, wherein the plurality of second elastic members are each disposed such that a sum of a plurality of vectors extending perpendicularly to a central axis of the first light transmitting member from one point thereon to center lines of the plurality of second elastic members is 0.

16. The camera module of claim 1, further comprising:
a reflective member disposed to be at least partially surrounded by the optical image stabilizer assembly and fixed to the camera housing;
wherein at least one surface of the reflective member partially overlaps the first light transmitting member and the second light transmitting member,
wherein the optical image stabilizer assembly is configured to change a path of light incident on the reflective member or a path of light output from the reflective member as the second light transmitting member moves relative to the first light transmitting member and the reflective member.

17. An electronic device comprising:
a housing; and
a camera module disposed in the housing and configured to receive light through a partial area of the housing,
wherein the camera module includes:
a camera housing;
a lens assembly disposed in the camera housing; and
an optical image stabilizer assembly configured to partially change a path of light travelling toward the lens assembly, at least a portion of the optical image stabilizer assembly being fixed to the camera housing,
wherein the optical image stabilizer assembly includes:
a fixed part fixed to the camera housing and including a first light transmitting member;
a moving part disposed to be rotatable relative to the fixed part and including a second light transmitting member;
a sealing member disposed between the first light transmitting member and the second light transmitting member and configured to elastically connect the second light transmitting member to the first light transmitting member; and
an elastic member configured to elastically connect the moving part to at least one of the camera housing or the fixed part,
wherein the sealing member has a liquid accommodated therein and is configured to be deformed in response to rotation of the moving part relative to the fixed part,
wherein the moving part is rotatable relative to the fixed part about perpendicular first and second axes,
wherein the first and second axes are perpendicular to a central axis of the first light transmitting member, and wherein the fixed part further includes a first support member configured to support the first light transmitting member and fixed to the camera housing.

18. The electronic device of claim 17,
wherein the moving part further includes a second support member configured to support the second light transmitting member and a holder coupled to the second support member,
wherein the elastic member includes at least one of a plurality of first elastic members configured to connect the moving part and the camera housing and a plurality of second elastic members configured to connect the moving part and the fixed part,
wherein the plurality of first elastic members are each connected, at opposite ends thereof, to the second support member and the camera housing or to the holder and the camera housing, and
wherein the plurality of second elastic members are each connected, at opposite ends thereof, to the first support member and the second support member.

19. The electronic device of claim 18, wherein the plurality of first elastic members connect the moving part and the camera housing in a direction perpendicular to the central axis of the first light transmitting member.

20. A camera module, comprising:
a camera housing;
a lens assembly disposed in the camera housing; and
an optical image stabilizer assembly partially fixed to the camera housing to change a path of light travelling toward the lens assembly, and comprising:
a fixed part fixed to the camera housing and including a first light transmitting member;
a moving part rotatable relative to the fixed part and including a second light transmitting member;
a seal disposed between the first and second light transmitting members to connect the first and second light transmitting members; and
an elastic member to elastically connect the moving part the camera housing or the fixed part, and
wherein the seal accommodates a liquid therein and is deformable responsive to moving part rotation,
wherein the fixed part further includes a first support member configured to support the first light transmitting member and fixed to the camera housing, and
wherein the moving part further includes a second support member configured to support the second light transmitting member and a holder coupled to the second support member.

* * * * *